May 24, 1966     E. E. BRINNING     3,252,653
OPERATION CONTROL MECHANISM FOR ACCOUNTING MACHINES
Original Filed Aug. 5, 1959     31 Sheets-Sheet 1

INVENTOR
EARL E. BRINNING
BY
ATTORNEY

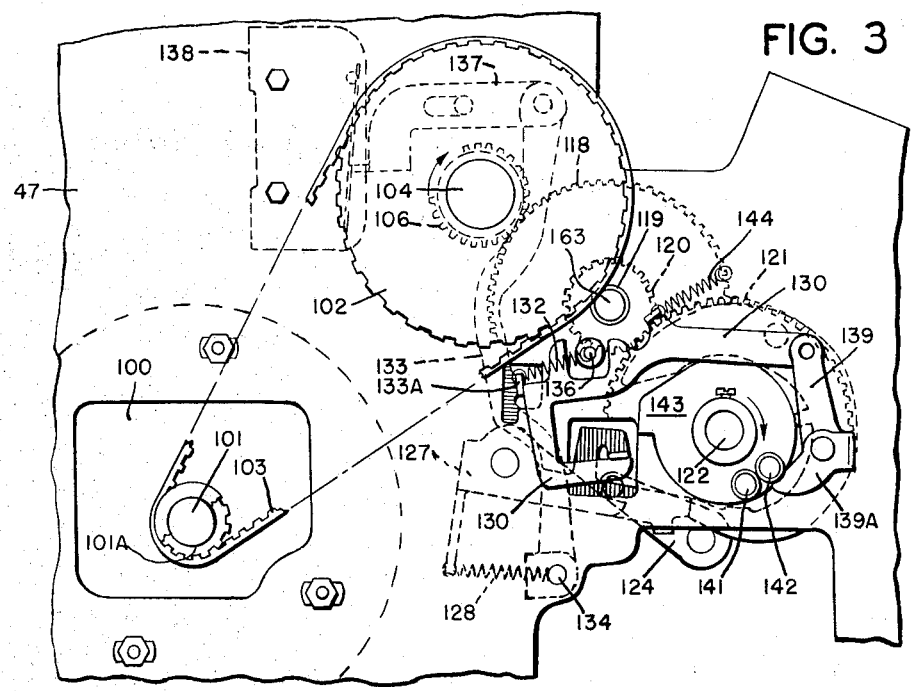
FIG. 3
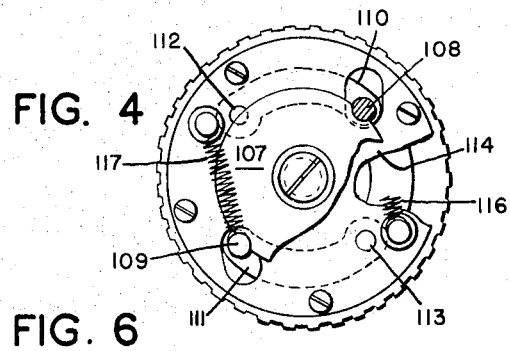
FIG. 4
FIG. 6
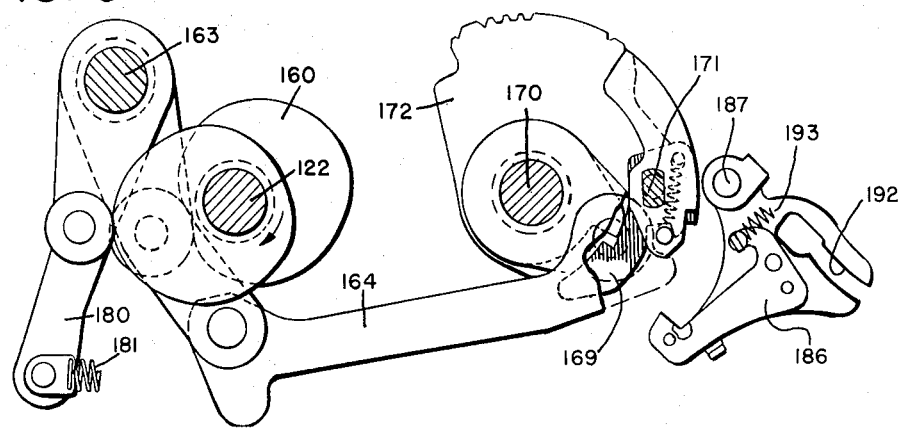

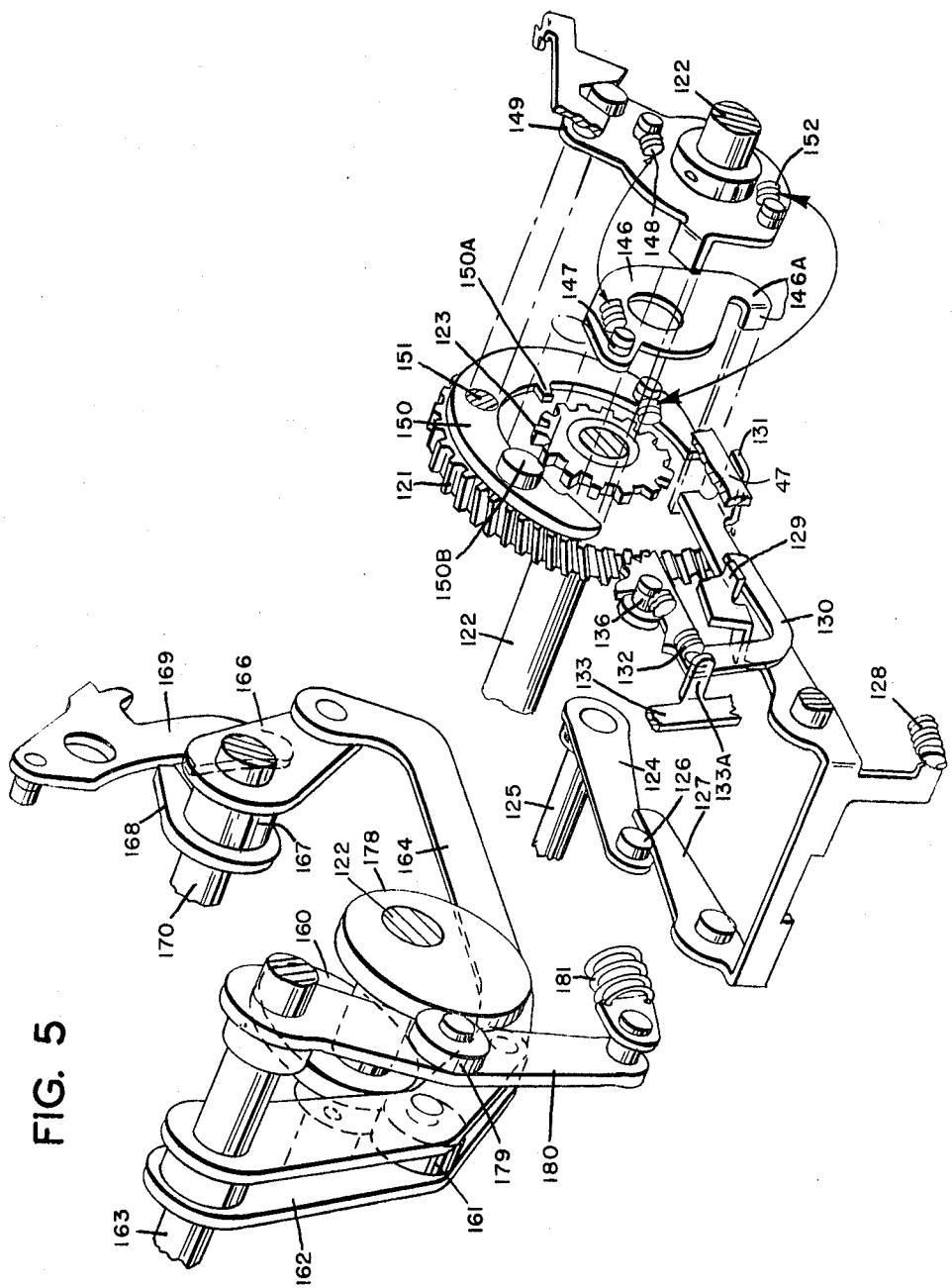

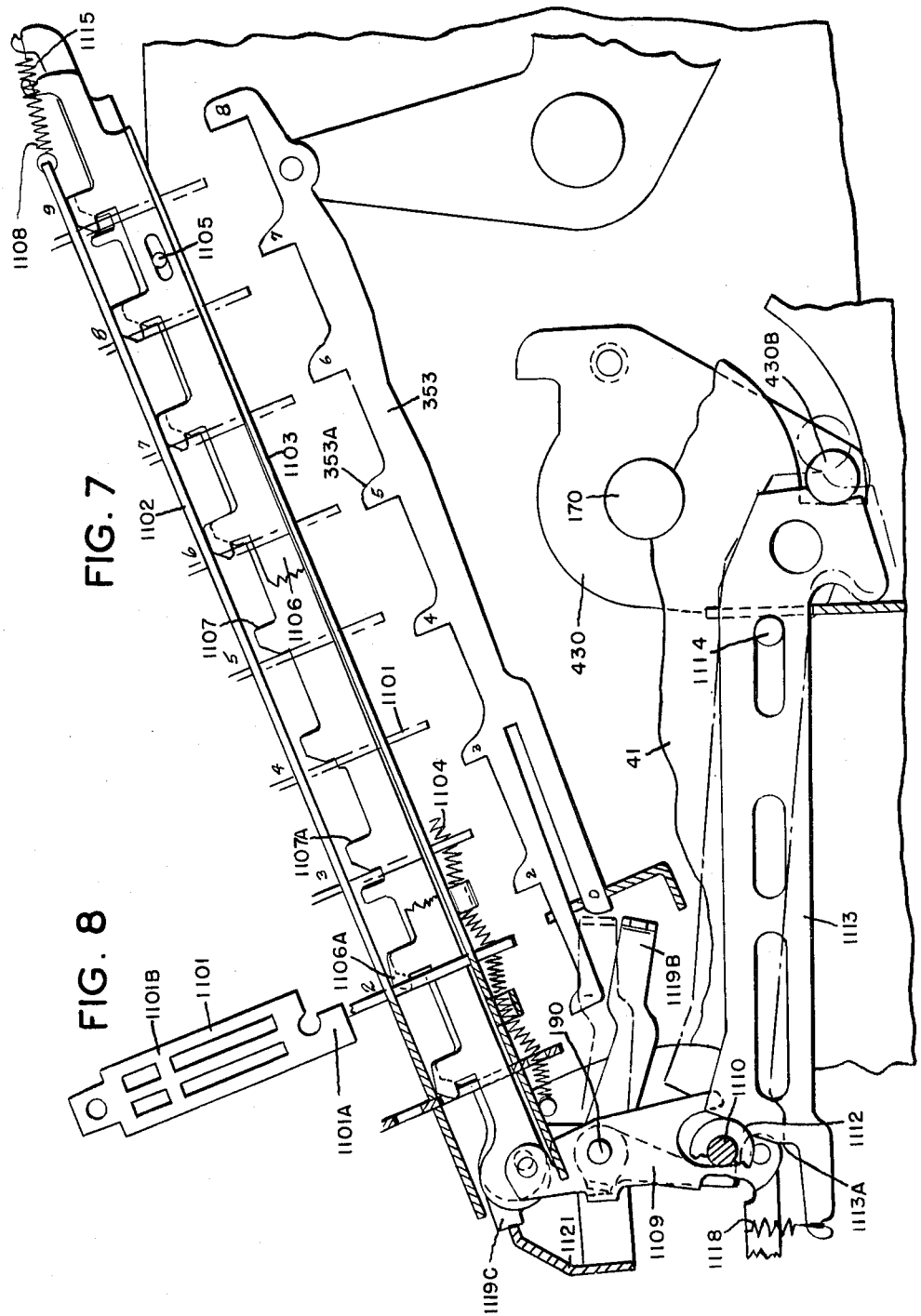

May 24, 1966  E. E. BRINNING  3,252,653
OPERATION CONTROL MECHANISM FOR ACCOUNTING MACHINES
Original Filed Aug. 5, 1959  31 Sheets-Sheet 6
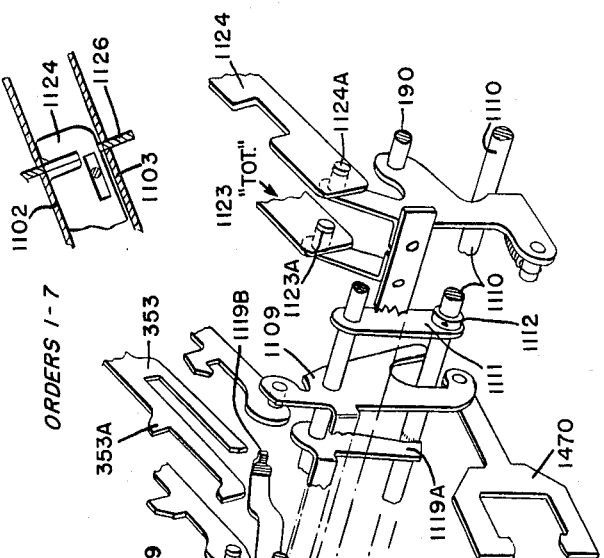
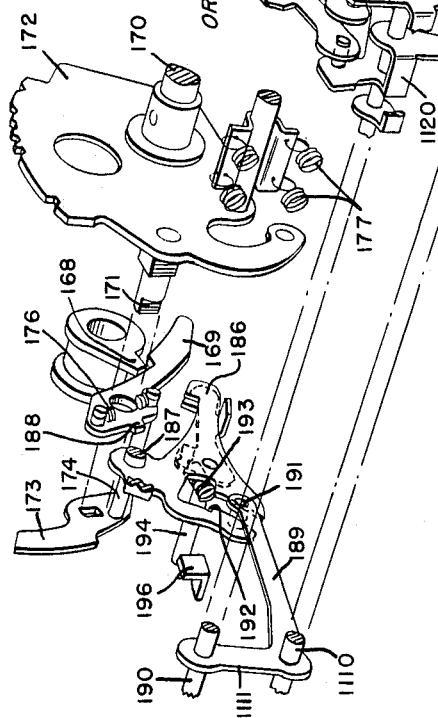

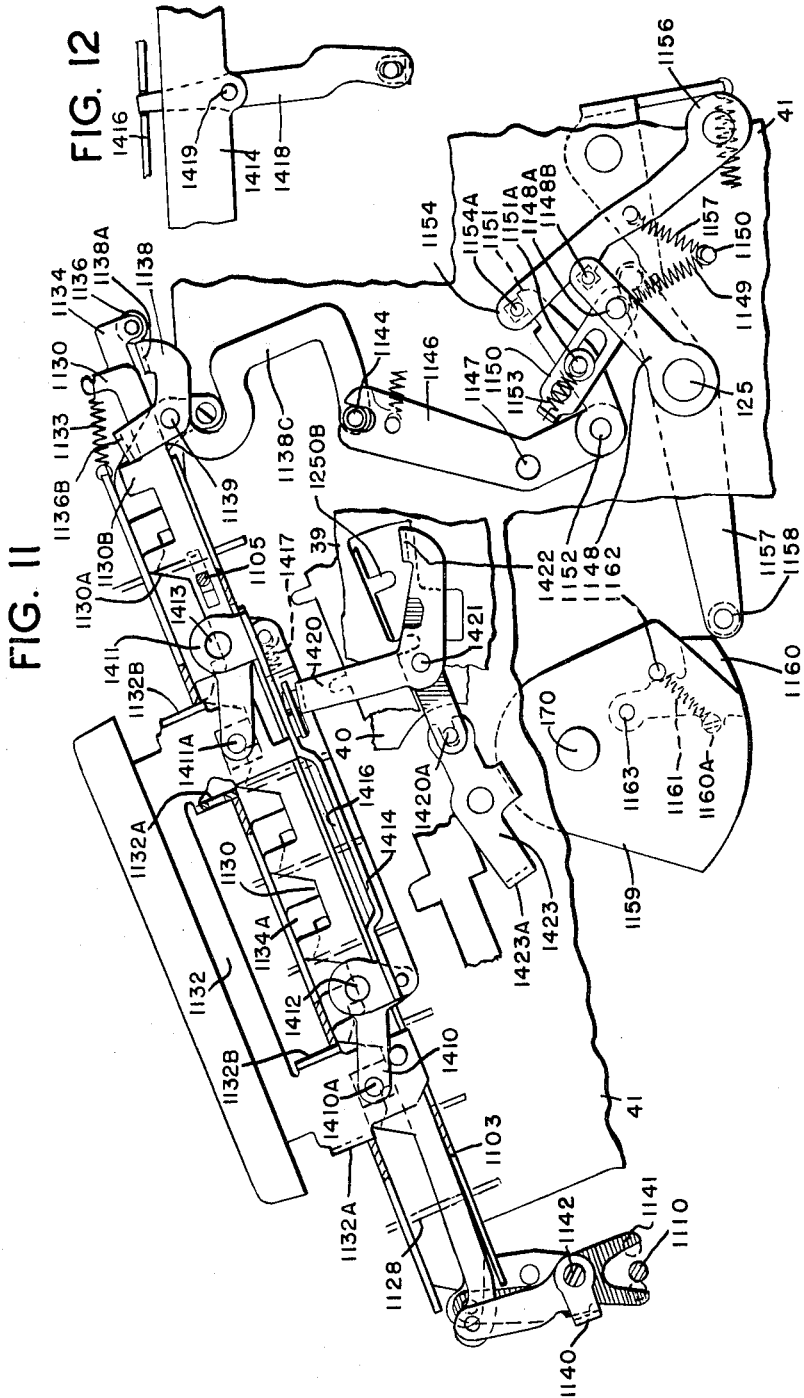

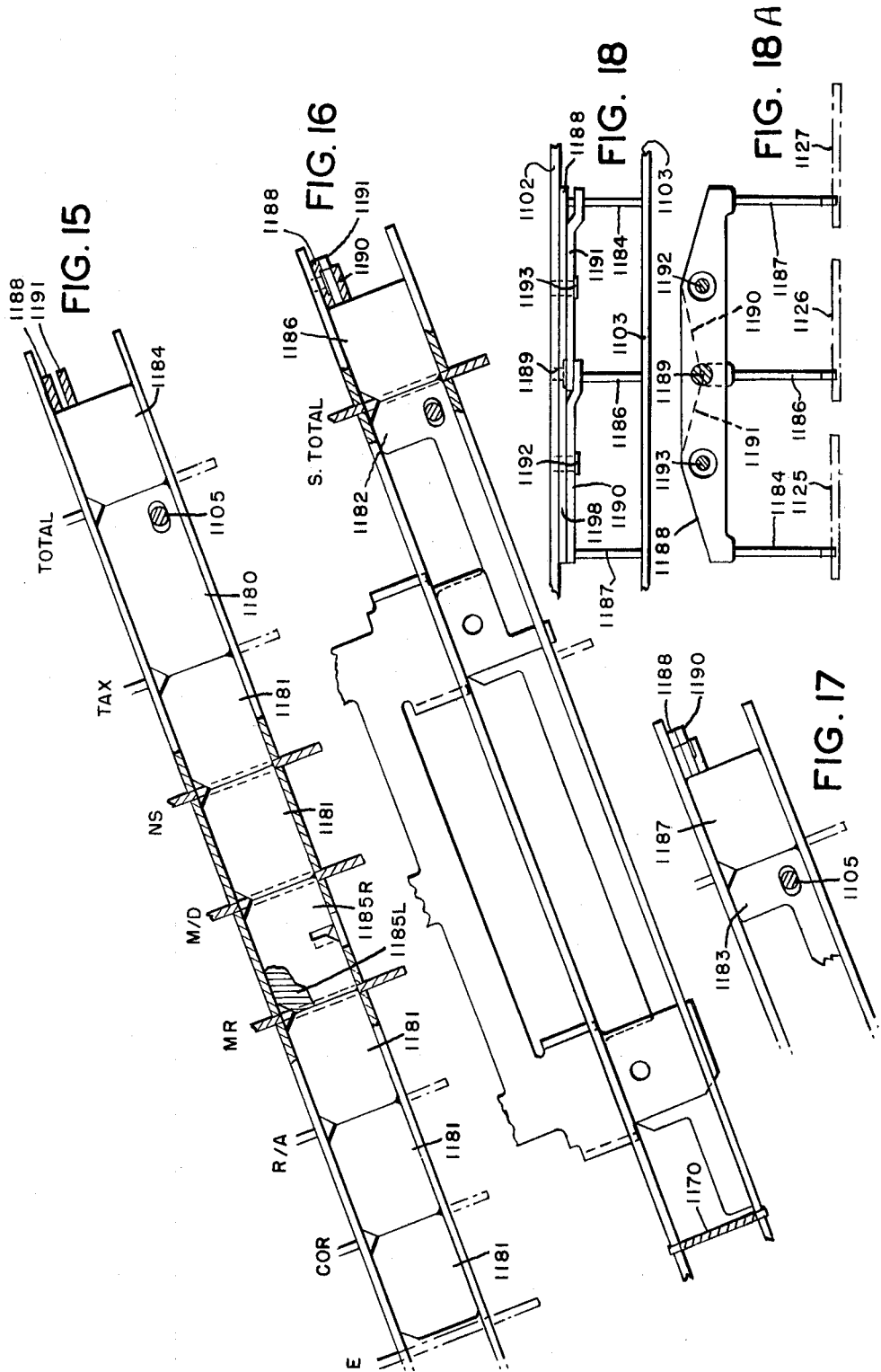

May 24, 1966 E. E. BRINNING 3,252,653
OPERATION CONTROL MECHANISM FOR ACCOUNTING MACHINES
Original Filed Aug. 5, 1959 31 Sheets-Sheet 13
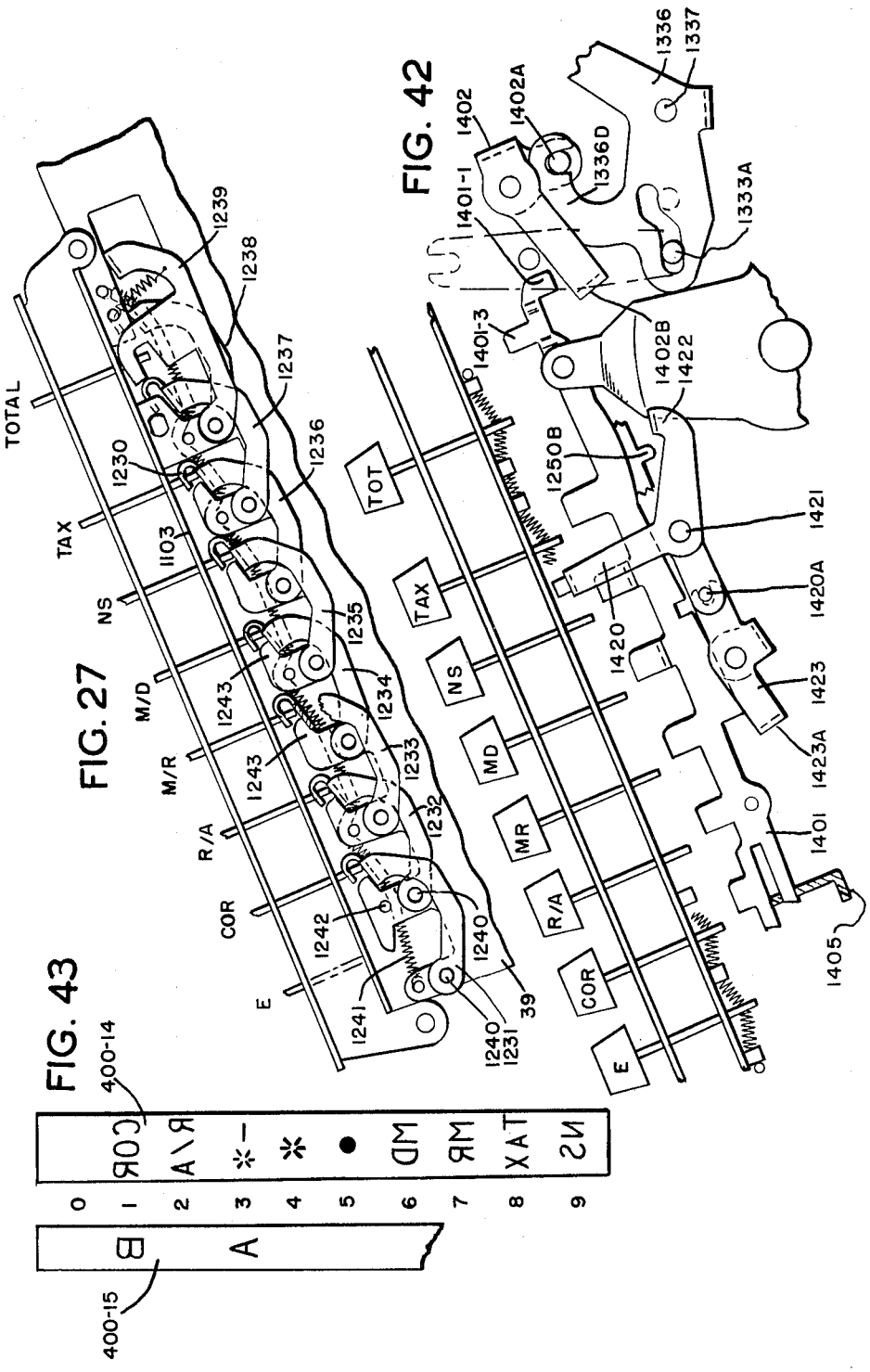

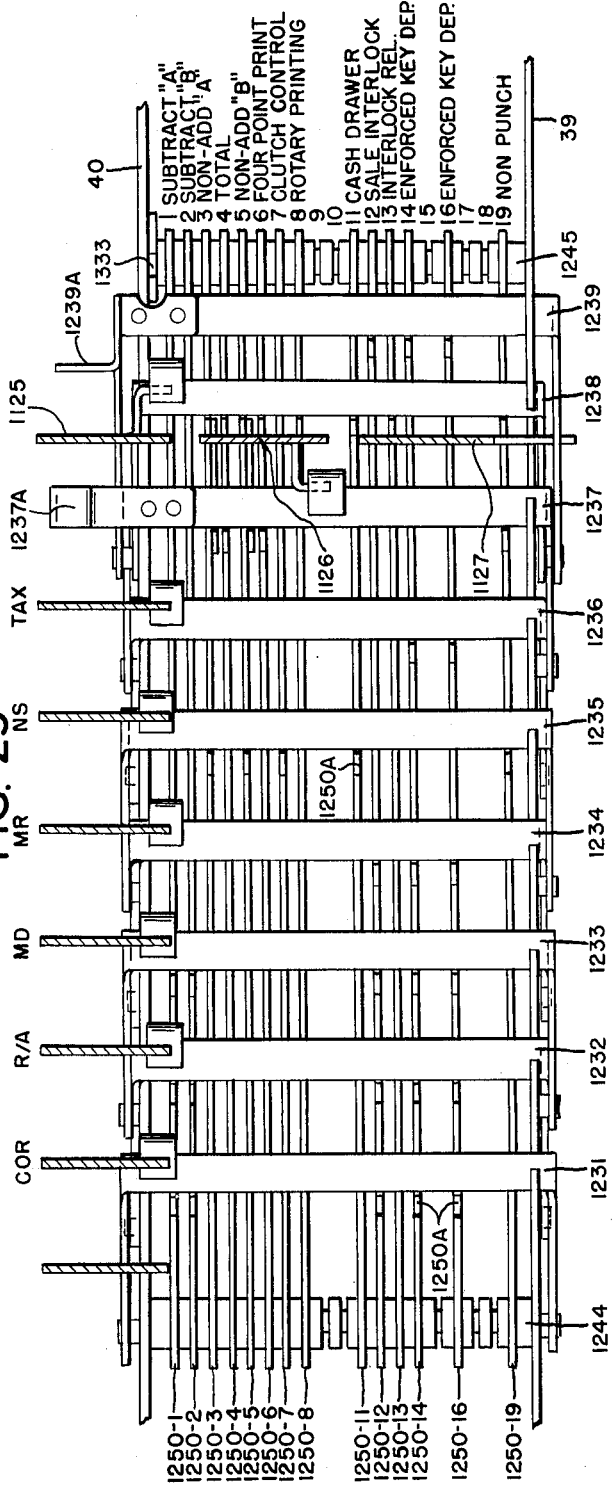

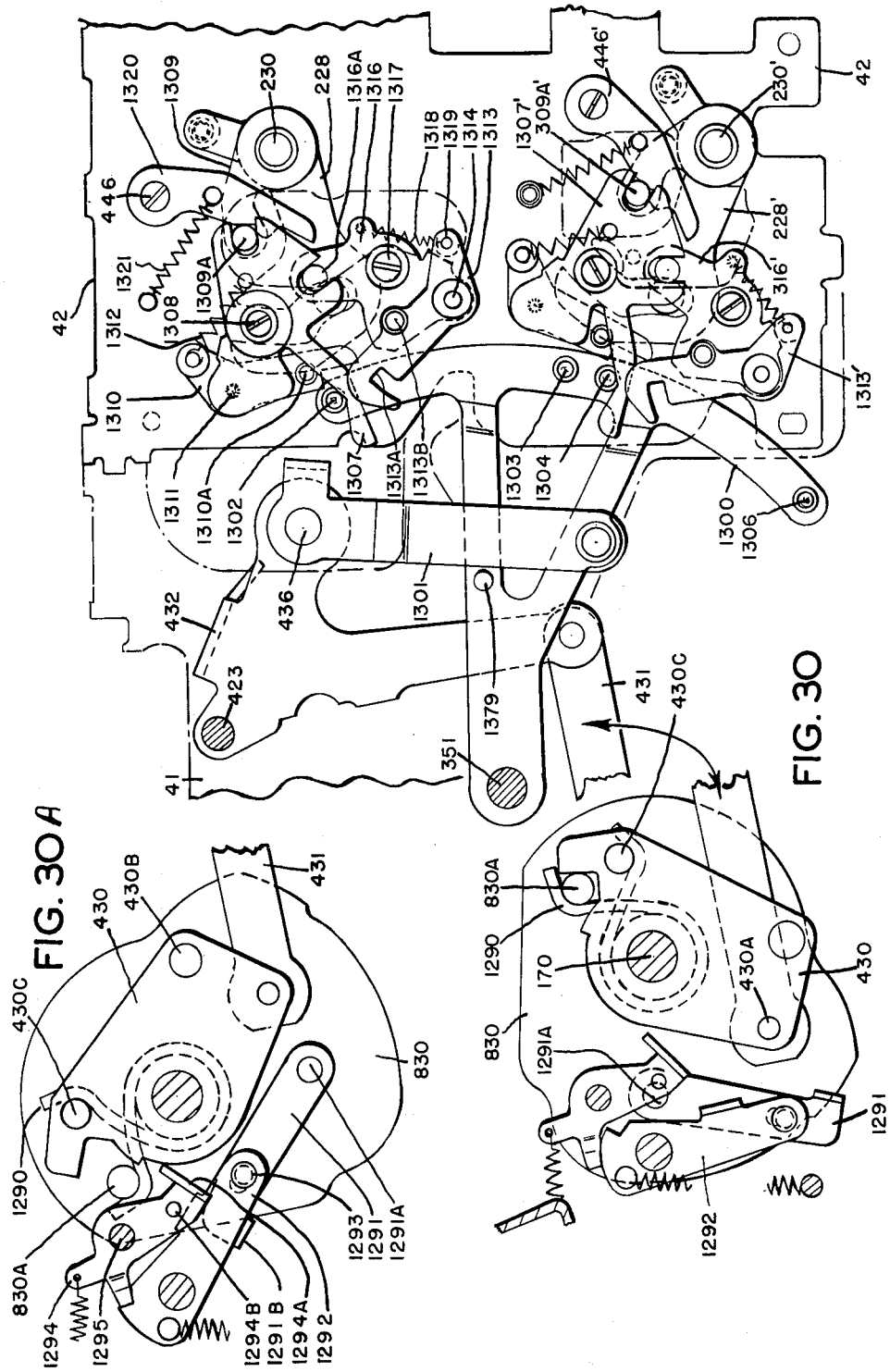

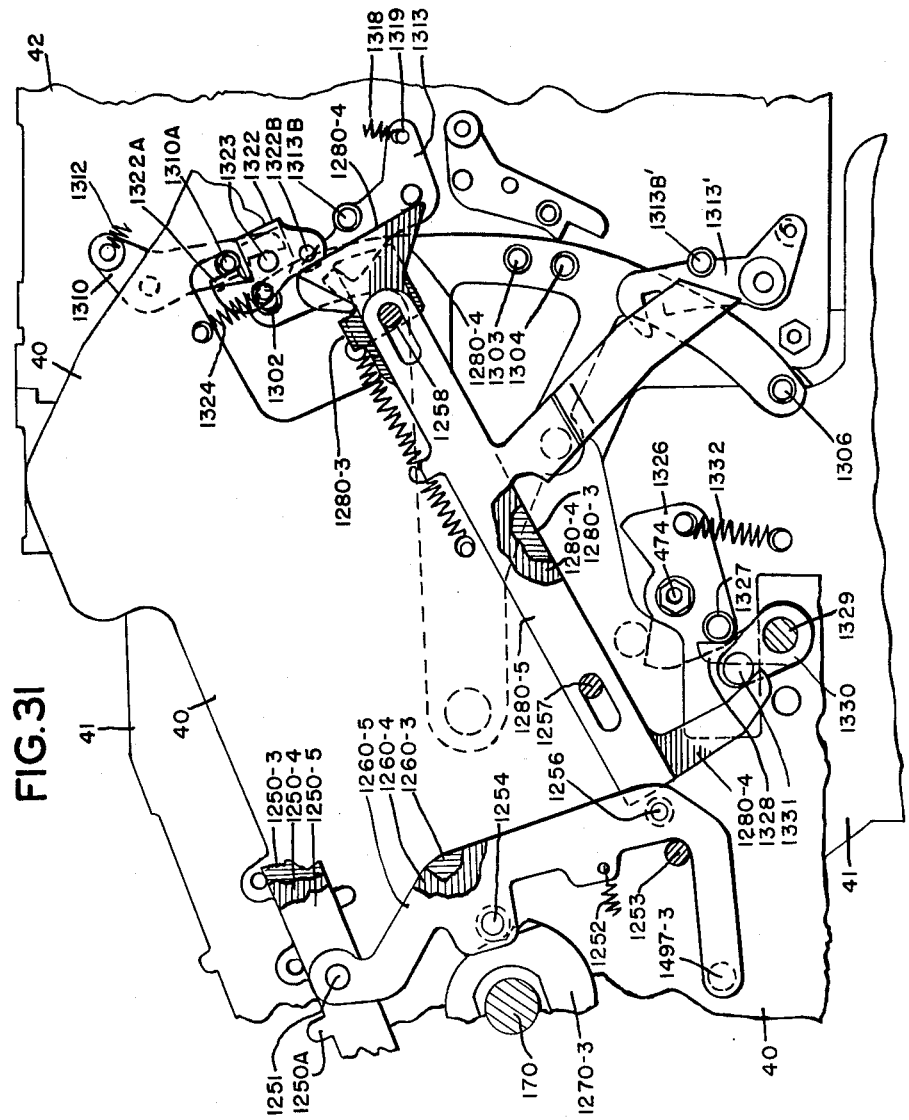

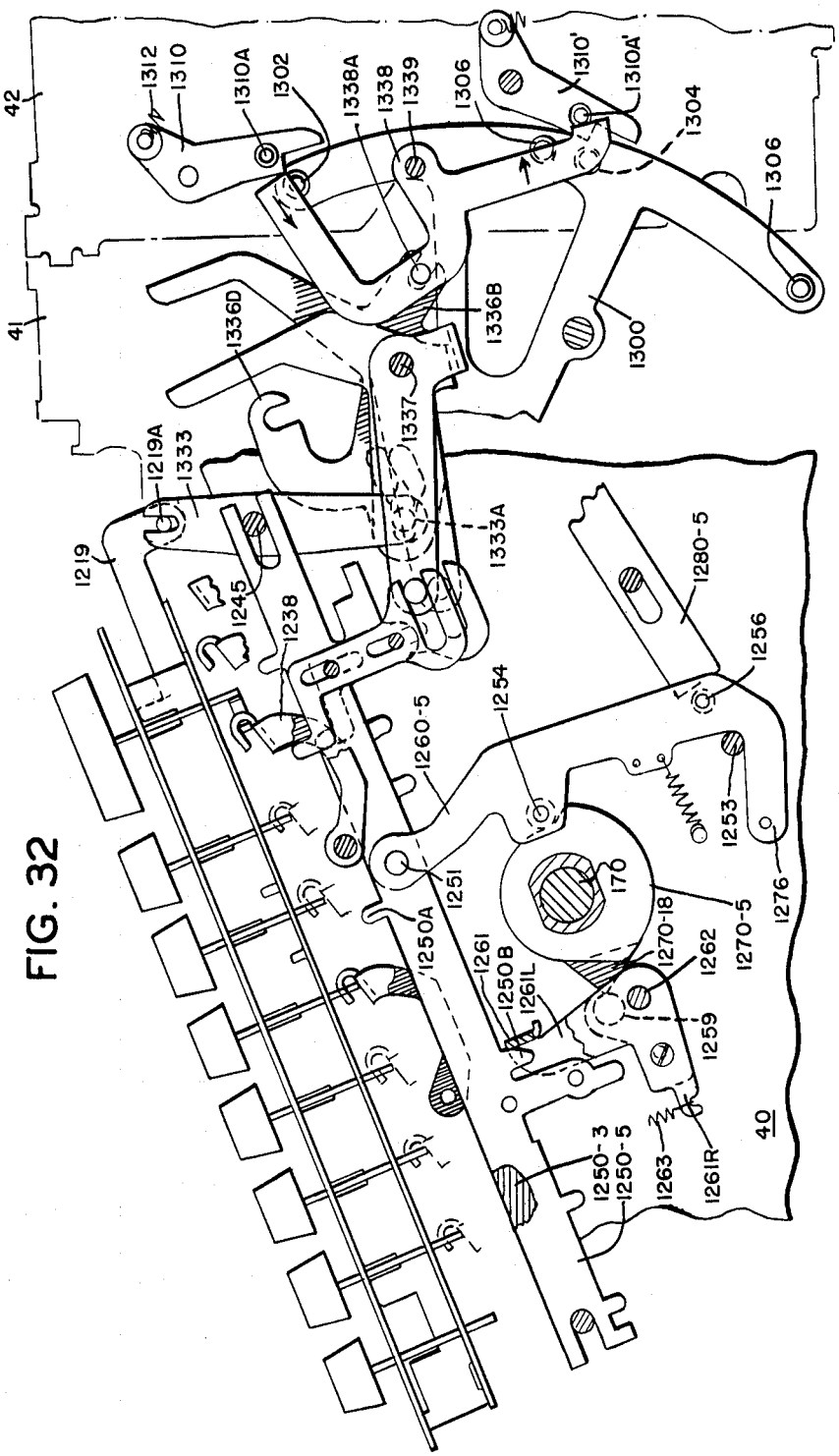

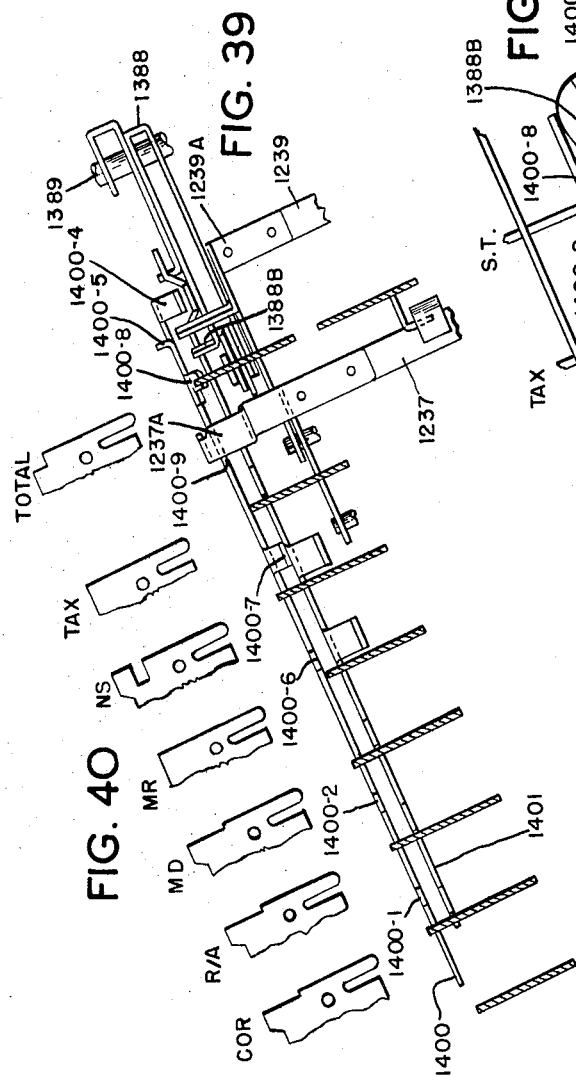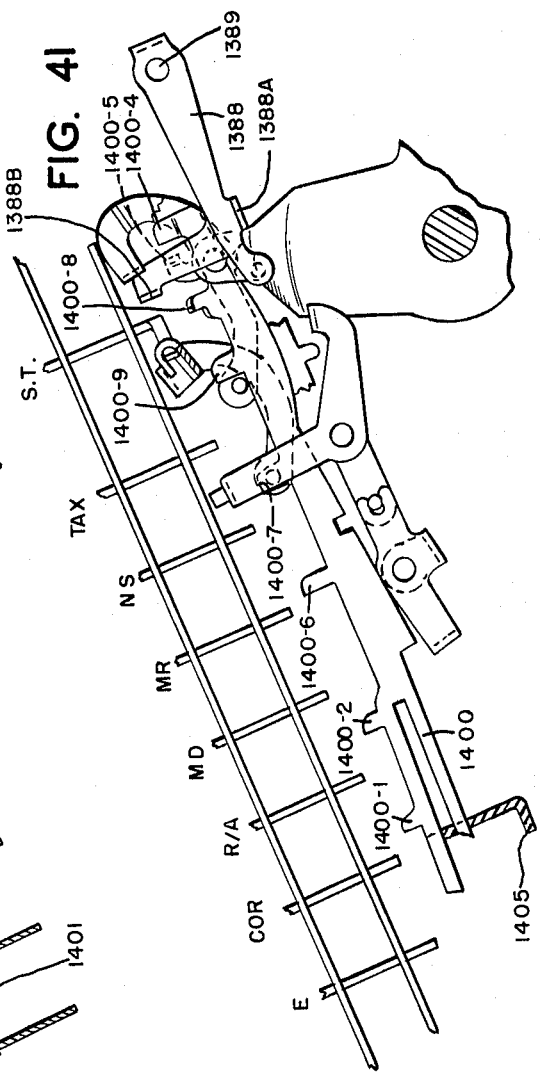

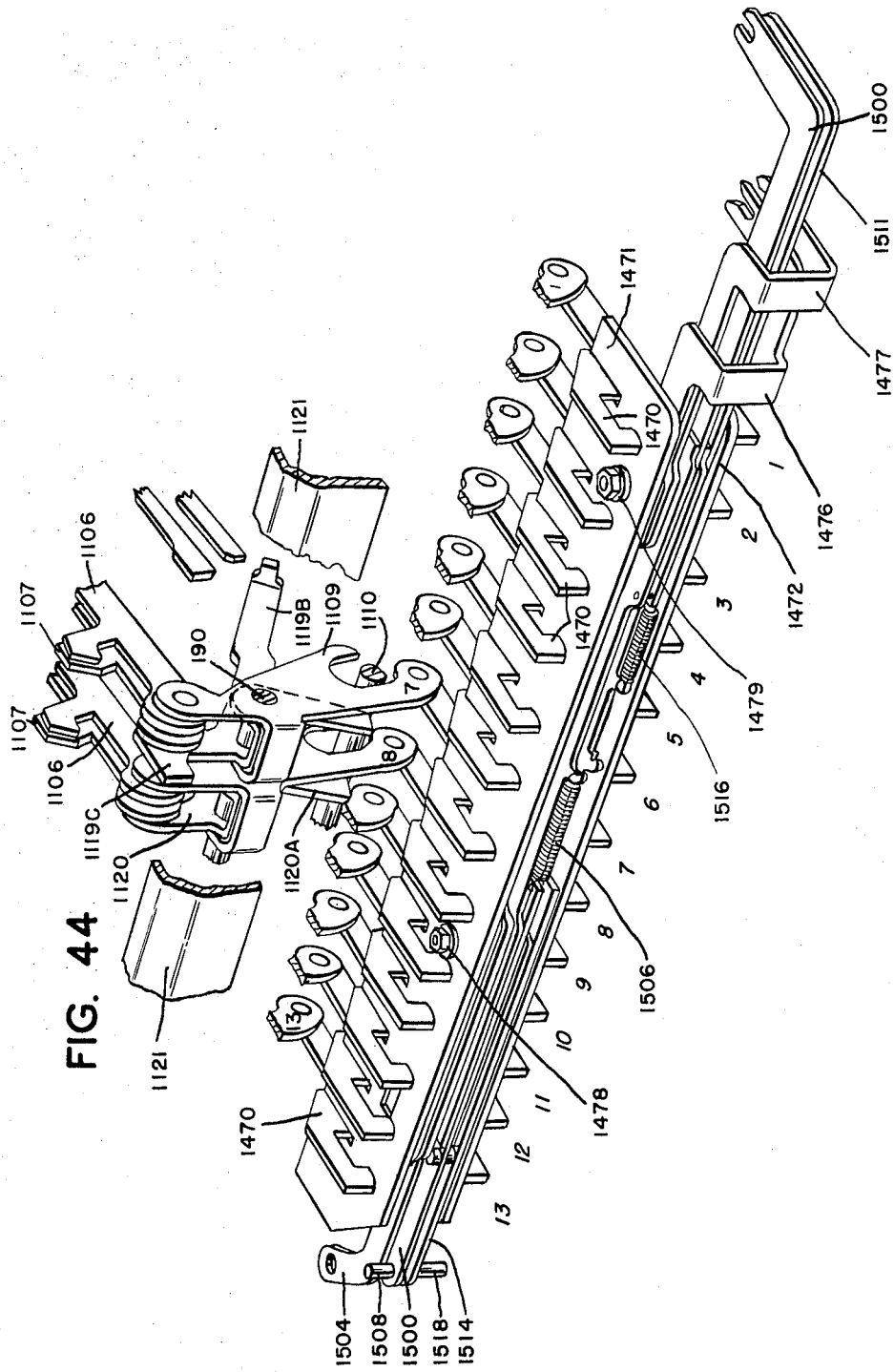

May 24, 1966  E. E. BRINNING  3,252,653
OPERATION CONTROL MECHANISM FOR ACCOUNTING MACHINES
Original Filed Aug. 5, 1959  31 Sheets-Sheet 25

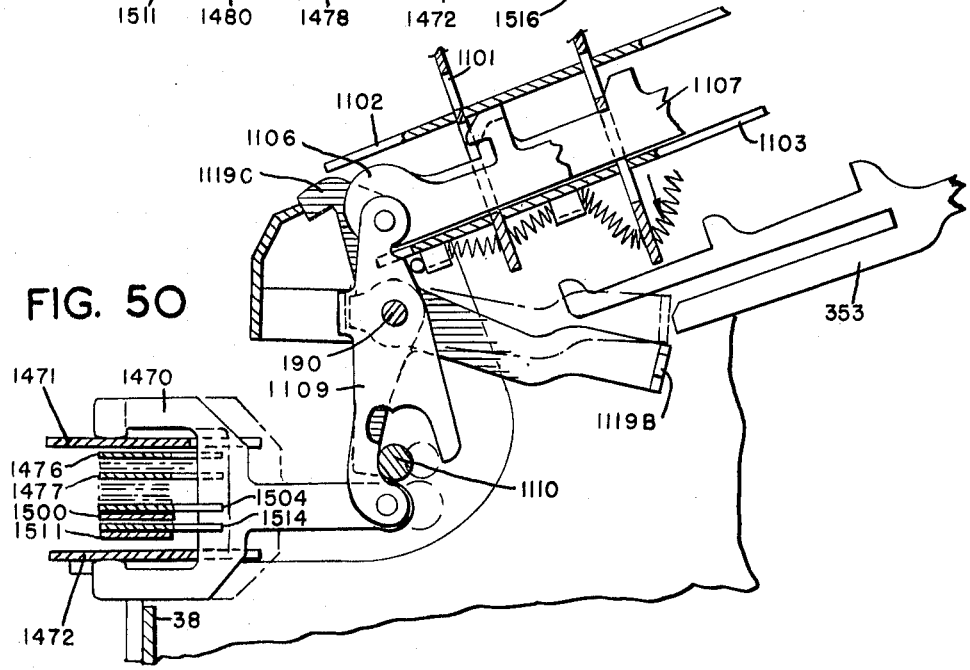

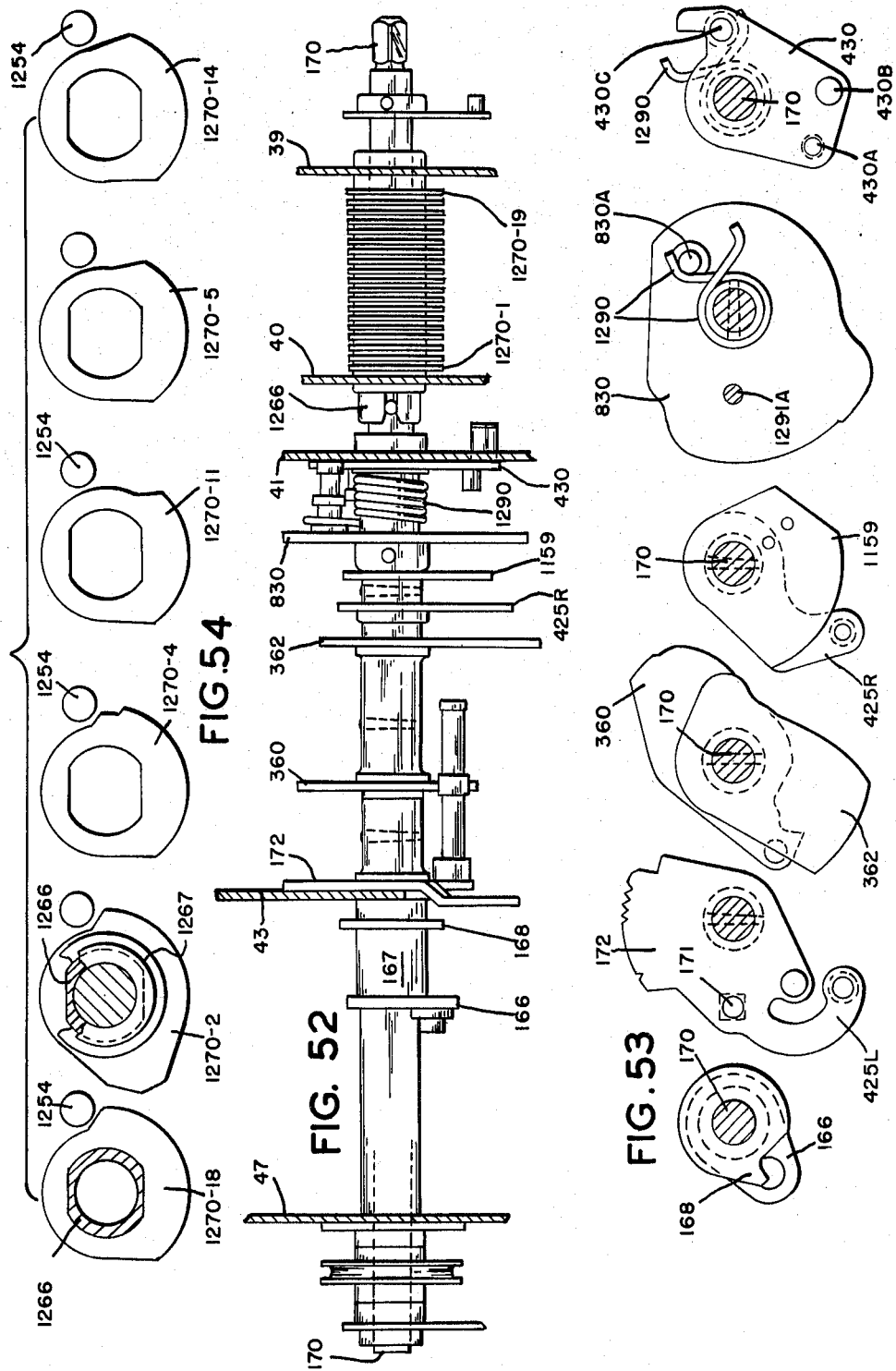

May 24, 1966 E. E. BRINNING 3,252,653
OPERATION CONTROL MECHANISM FOR ACCOUNTING MACHINES
Original Filed Aug. 5, 1959 31 Sheets-Sheet 31

United States Patent Office 3,252,653
Patented May 24, 1966

3,252,653
OPERATION CONTROL MECHANISM FOR
ACCOUNTING MACHINES
Earl E. Brinning, Detroit, Mich., assignor to Burroughs
Corporation, Detroit, Mich., a corporation of Michigan
Original application Aug. 5, 1959, Ser. No. 831,737, now
Patent No. 3,117,720, dated Jan. 14, 1964. Divided
and this application Sept. 10, 1962, Ser. No. 222,512
13 Claims. (Cl. 235—62)

Index:                                                Column
    A. Machine Drive Mechanism _____  6
    B. Operation Control Keys _____ 12
    C. Operation Control Mechanism _____ 17
    D. Subtraction _____ 27
    E. Ribbon Lift _____ 29
    F. Negative Totals _____ 30
    G. Symbol Printing _____ 32
    H. Enforced Key Depression _____ 35
    I. Sale Key Interlock _____ 39
    J. Modifications _____ 40

The present invention relates to calculating and accounting machines and more particularly to an improved operation control mechanism for such machines.

This application is a division of the copending application Serial No. 831,737 of Bogan et al. which was filed on August 5, 1959, now U.S. Patent 3,117,720. The present application is directed to the operation control mechanism which is disclosed in said copending parent application which is entitled, "Combination Calculating and Punching Machine."

It is known in the art that power-driven operation control devices can be provided for accounting machines so that the amount of effort expended by an operator in causing the performance of selected functions is reduced. However, in connection with the manufacture of such machines it is advantageous to have an operation control mechanism which can be readily changed to meet the specific program requirements of a large number of different machine users. Thus it is desirable to be able to manufacture a given type of machine having a control system which requires a small amount of time and effort to program the machine in a manner such that selected control keys will cause the performance of selected functions in accordance with the customer's requirements. It is also desirable to be able to provide a machine in which the operator of the machine must perform certain operations, such as for example the depression of selected numerical keys, before a machine cycle of operation can be initiated by a given operation control key.

Therefore it is an object of the present invention to provide an improved operation control mechanism for a calculating or similar type machine. Another object of the present invention is to provide a control system for an accounting machine in which a plurality of operation control keys are each operative to cause a large number of selectable machine operations and yet provide a substantially uniform key depression for each of the control keys regardless of the number of functions being controlled by the key. Another object of the present invention is to provide a power-driven operation control mechanism in which a large number of operation control keys can be utilized to cause selected machine functions and in which the functions caused by a given key are easily programmed. Another object of the present invention is the provision of a control mechanism operable to prevent machine operation unless designated keys on the machine keyboard have been depressed prior to initiation of the machine cycle. Another object of this invention is to provide a new control mechanism operative to prevent a total or subtotal operation when any key in the amount section of the keyboard is depressed. Still another object of this invention is to provide a novel interlock arrangement for the operation control keys of a calculating machine or the like in which specified operation control keys must be operated in order to enable other designated operation control keys.

These and other objects of the present invention are set forth in the appended claims, but the invention itself will be more clearly understood from the following description when read with reference to the accompanying drawings in which, FIG. 1 is a perspective view of the complete machine;

FIG. 3 is a left end view of the power drive mechanism;

FIG. 4 is a detail elevation of the left end of the overload clutch mechanism shown in FIG. 4;

FIG. 5 is a perspective view from the left rear corner of the machine showing the mechanism for initiating a machine cycle;

FIG. 6 is a left elevation of the connection between the motor driven shaft and main driveshaft of the machine;

FIG. 7 is a right elevation of one numerical order on the keyboard showing the parts disposed beneath a row of the amount entering keys and including the power mechanism for controlling the keys;

FIG. 8 is an enlarged view of a numerical keystem;

FIG. 9 is a perspective view of the clutch mechanism which controls the transfer of power from the motor to the main driveshaft and prevents a complete machine cycle in response to predetermined conditions existing in the machine;

FIG. 10 is an enlarged right elevation of one of the slides illustrated in FIG. 9 showing the manner of control of the slide by an operation control key;

FIG. 11 is a right elevation of the scale key and the motor trip mechanism;

FIG. 12 is a detail plan view of parts of FIG. 11;

FIG. 15 is a right elevation of the pendants in the left-hand column of operation control keys used to prevent depression of more than one operation control key;

FIG. 16 is a right elevation of the pendants beneath the keys in the middle column of operation control keys;

FIG. 17 is a right elevation of the pendants in the right-hand column of operation control keys which includes the item key;

FIG. 18 is a rear view of the mechanism for interconnecting the pendants in the three columns of operation control keys;

FIG. 18A is a top view of the mechanism of FIG. 18;

FIG. 27 is a right elevation of the bails controlled by the operation control keys;

FIG. 29 is a plan view of the operation control bails and function sensing slides disposed therebeneath;

FIG. 30 is a right elevation of the power mechanism for causing engagement and disengagement of the two accumulators with the amount actuators;

FIG. 30A is a right elevation of the toggle mechanism of FIG. 30 in the half cycle position;

FIG. 31 is a right elevation of the operation control mechanism for the non-adding and totaling of the accumulators;

FIG. 31A is a top view of the function control slides disposed beneath the function sensing slides;

FIG. 32 is a right elevation showing the operation control mechanism for providing totals from one or the other of the two registers in response to depression of the single total key;

FIG. 39 is a top view of the index strips which control the symbol printing mechanism and the positions of the operation control keys with respect thereto;

FIG. 40 is a plan view of the lower ends of the keystems in the left-hand column of operation control keys illustrating the relationship of the bottoms of the keystems with respect to the lugs on the index strips of FIG. 39;

FIG. 41 is a right elevation of the parts shown in FIGS. 39 and 40 and including the mechanism controlled by the sale key;

FIG. 42 is a right elevation of the mechanism which controls the index strip for the #15 order symbol print bar;

FIG. 43 is a detail view of the printing surfaces of the symbol print bars;

FIG. 44 is a perspective from the upper right front of the slides controlled by the numerical keys in the enforced key depression mechanism;

FIG. 46 is a detail plan view of the first enforced key depression slide illustrated in FIGS. 44 and 45 showing the relationship of the slide to the slots in the supporting plates;

FIG. 47 is a detail view of the second enforced key depression sensing slide showing the relationship of the lugs to the slots;

FIG. 48 is a detail drawing of one of the slides shown in the perspective of FIG. 44 which is used to cause a disengagement of the motor drive from the main driveshaft if there is an amount key depressed during a total or subtotal operation;

FIG. 49 is a detail drawing of the slide used to prevent a machine cycle if there are numerical keys depressed when a no sale operation is performed;

FIG. 50 is a right elevation showing the manner in which the numerical keys serve to control the movement of the slides of FIGS. 46 through 49;

FIG. 52 is a front view of the main driveshaft with the various cams disposed thereon;

FIG. 53 is a detail drawing of each of the cams on the main driveshaft illustrated in FIG. 52 showing which cams and sleeves are pinned to the shaft;

FIG. 54 is a detail drawing of each of the types of cams on the right end of the main driveshaft for driving the operation control mechanism;

Figure 1:
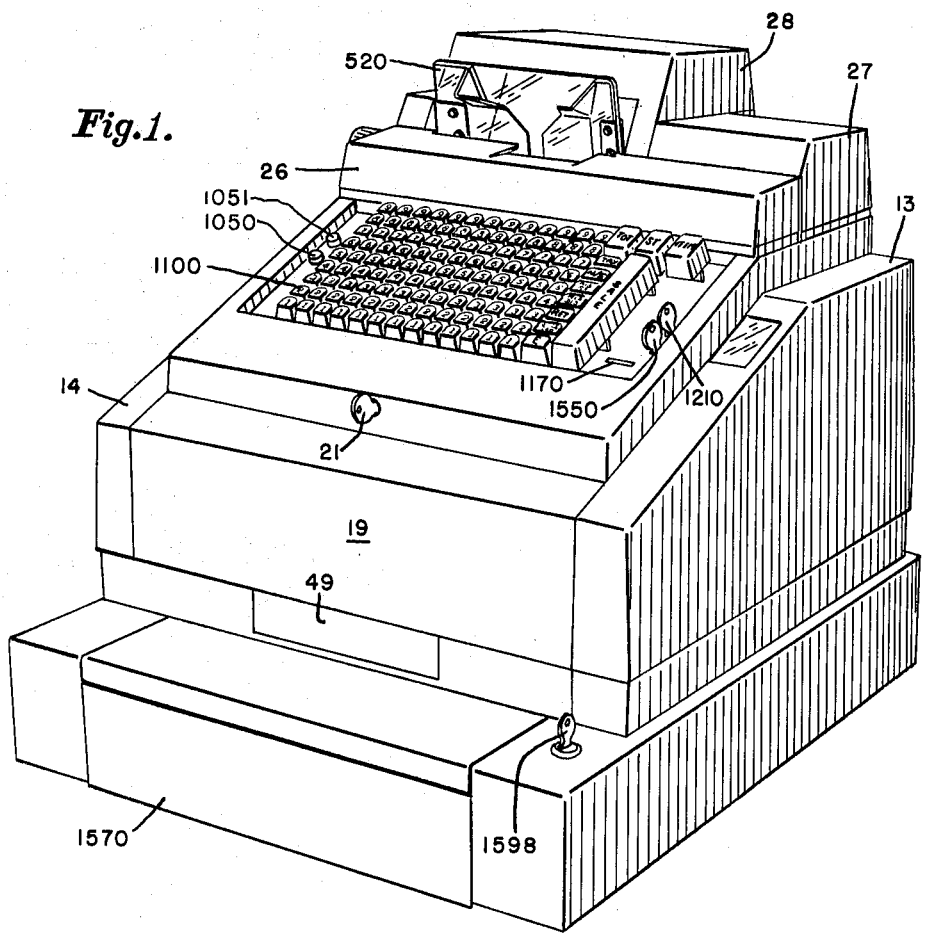

The machine chosen for purpose of illustrating the present invention is the same as that disclosed and claimed in the above-identified parent application and includes a calculating section and a punching section which is operative to simultaneously punch a large number of columns of information.

Three columns of operation control keys positioned on the right section of the keyboard serve to control the various functions performed by the machine through their control of a plurality of function sensing slides disposed beneath the operation control keys. The function sensing slides are urged from one position to another during each machine cycle and serve to control the movements of a plurality of power bars or function control slides disposed beneath the sensing slides in accordance with the movement or nonmovement of the sensing slides. There is a swingable bail associated with each operation control key which is responsive to key depression to engage studs selectively positioned on the sensing slides to hold selected slides stationary and cause the desired machine functions. A power yoke pivotally connected to each sensing slide and extending downwardly therefrom is engageable by an individual cam during a machine cycle and as a result of such engagement the yoke urges the associated sensing slide from its normal home position toward a second position. The lower end of each yoke is associated with one of the operation control slides which is operative upon movement from its home position to a second position to cause a selected machine function. The engagement of the cam with the yoke is so arranged that the control slide is moved to its second position only if the function sensing slide associated with the corresponding yoke is held in its first or home position. If the associated sensing slide is not held in its home position by one of the operation control bails the yoke pivots about its lower end and therefore the power-driven cam serves only to move the sensing slide from its home position to a second position without imparting power to the function control slide. Thus by providing a separate sensing slide, yoke, cam and control slide for each desired machine function the machine is easily programmed to perform selected machine operations in response to depression of a given control key merely by providing a lug on the selected sensing slide in the vicinity of the bail associated with the selected control key.

Each of the control keys except for the error key is operative upon depression to cause energization of an electric motor which through a gear train serves to drive the machine through a single cycle. A mechanism intermediate the output shaft of the motor driven shaft and the machine driveshaft of the machine proper is operative in response to specified conditions to disconnect the main driveshaft of the machine from the motor drive and therefore prevent a machine cycle. This mechanism thus operates as a clutch since it serves to disengage the motor drive from the main driveshaft of the machine in response to conditions in the machine which would tend to cause a malfunction if the machine cycle were permitted. The clutch itself is substantially the same as that shown in U.S. Patent No. 1,853,050 to Horton, but the mechanism for controlling the clutch is materially different in the present machine from that shown in said Horton patent. A first plurality of clutch control slides are disposed transversely to the columns of amount keys on the keyboard and are operative in response to depression of selected operation control keys to be urged from a home position toward a second position during the machine cycle. Means responsive to the depression of numerical keys in selected columns serves to hold the slides against such movement, said slides being so coupled with the clutch mechanism that if the slides are allowed to undergo movement from their home position the clutch will disengage the motor drive from the main driveshaft. Therefore an enforced key depression mechanism is provided. Other enforced key depression clutch control slides are coupled with the clutch mechanism in a manner such that when the total or subtotal key is depressed the clutch will disengage the motor drive from the main driveshaft of the machine if there is a key depressed in the numerical section of the keyboard. Therefore a correct total or subtotal is provided by the active accumulator.

To facilitate the understanding of the various figures in the drawings which will now be described the terms right and rightwardly; left and leftwardly; top, upward, upwardly, and above; bottom, down, downwardly, and below; front, forwardly, and forward; back, rear, and rearwardly; and clockwise and counterclockwise will be used with reference to the machine as viewed from the front, above, or the right-hand side.

Figure 2:
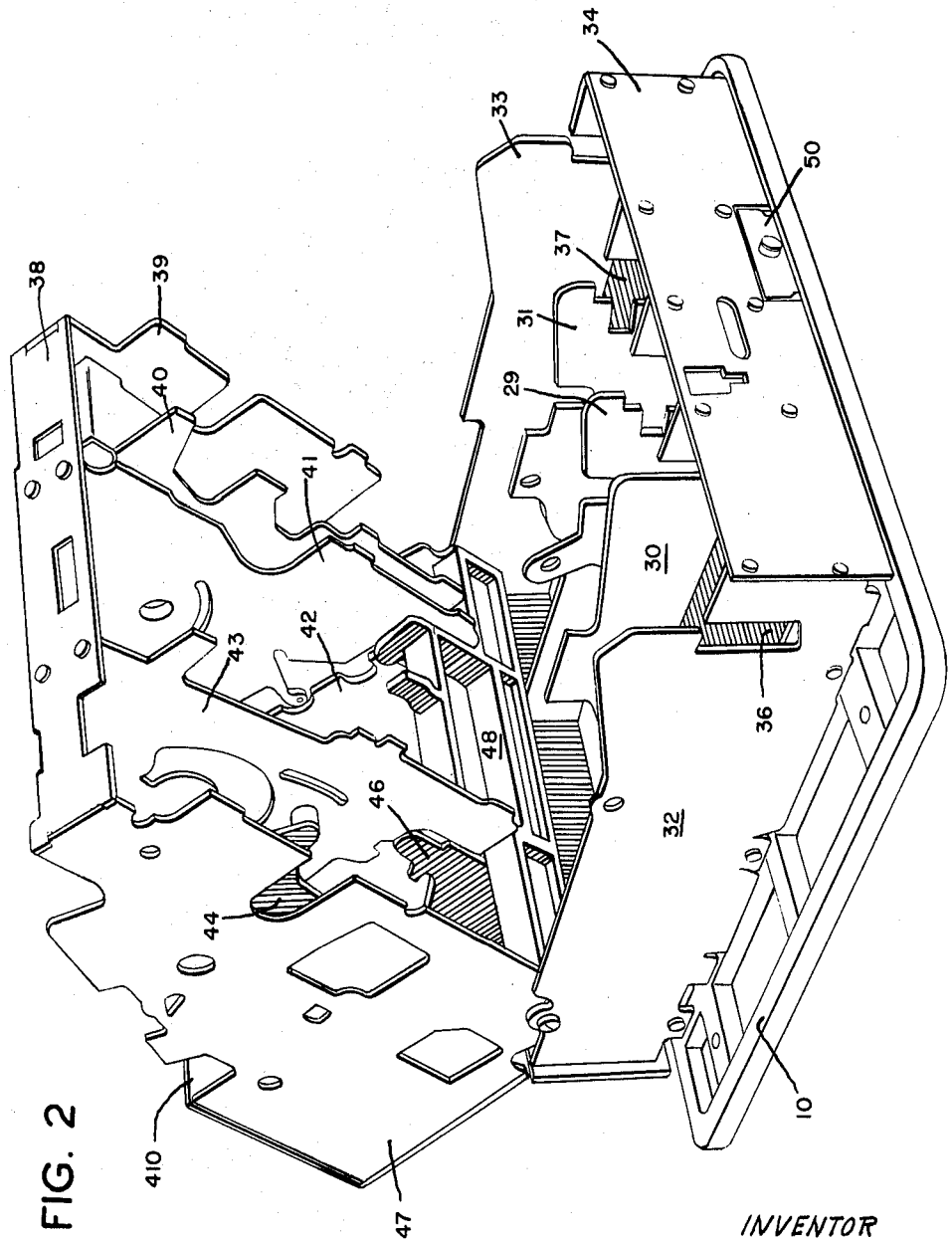
FIG. 2 is a view from the left front corner showing the main frames in the machine which support the various parts.

To simplify any reference which might be had to the Bogan et al. application Serial No. 831,737, the same reference numerals are used in the present application as were used in the parent application. Referring now to the drawings and in particularly to FIG. 1 there is illustrated the same machine as is disclosed in the Bogan et al. application. The machine is a combination calculating and perforating machine which is adapted to simultaneously record 22 columns of information on a strip of record material. As seen in FIG. 1, the machine has right and left side casings 13 and 14, a front casing 19, a panel cover 26, and a journal cover 28, said various panels and covers serving to enclose the operating mechanism of the machine. A cylinder lock controlled by a key 21 serves to prevent unauthorized access to the interior of the machine. A hinged plate 49 is provided in the front casing 19 so that access can be had to the chad box 50 (FIG. 2). The machine further has a validating chute 520 which is adapted to receive customers' receipts as well as a cash drawer 1570 access to which is controlled by a second cylinder lock and associated key 1598. The machine is provided with thirteen columns of numerical keys 1100.

The present invention relates specifically to the operation control apparatus which is disclosed in the above-identified Bogan et al. application, and therefore further details of the perforating apparatus and the manner in which it cooperates with the accounting section of the combination machine are not included in this application. Furthermore, since the accumulators described in detail in said parent application form no part of the present invention the details of the accumulators are not included herein although portions thereof as used in cooperation with the operation control mechanism are included. As seen in FIG. 2 the frames which support the various parts of the combination calculating and perforating machine are shown in perspective in order that the location of various parts to be described will be made more clear. The frames 39–47 support the main portion of the calculating section of the machine and are pivoted about a pair of bolts which connect the upper casting 48 to the lower frames 32 and 33. The frames 29–37 which support various parts of the perforating mechanism are secured to a heavy cast base 60, and thus it will be seen that a rigid set of frames is provided for the various parts. As set forth in the Bogan et al. application the pivoting of the upper calculating section of the machine with respect to the lower perforating section permits ready access to the perforating apparatus for machine servicing.

In FIG. 2 the frames which support the various parts of the machine are shown in perspective with the frames 39–47 which support the main portion of the calculation section shown as pivoted clockwise about a pair of bolts which connect the upper casting 48 to the lower frames 32 and 33. The frames 29–37 support the various parts of the punching mechanism, and therefore by having the upper section of the machine pivotally supported on the frames 32 and 33 access can be had to the punching mechanism.

A. *Machine drive mechanism*

The machine is normally driven through cycles of operation by an electric motor, but is also provided with an arrangement whereby a manually operable handle can be connected to the right end of the main driveshaft of the machine to permit manual machine operation in the event of an electrical failure. The drive mechanism utilized in this machine is similar to that shown and described in U.S. Patent No. 2,988,272, to James Stephen.

As seen in FIGS. 3–5 the drive mechanism includes a motor 100 supported on the right side and lower left corner of frame 47 having an output shaft 101 extending to the left through an opening in frame 47 and operative to drive a toothed pulley or gear 102 through the belt 103 and toothed pulley or gear 101A on the motor shaft. Pulley 102 is supported by a sleeve on the left side of frame 47 on the end of a shaft 104 in a manner to permit rotation thereof independently of the shaft. An overload clutch arrangement is adapted to couple the pulley 102 with a gear 106 which is pinned to shaft 104 on the right side of frame 47, the clutch drive serving to permit a disengagement of the pulley 102 from gear 106 in the event of an overload in the machine proper. The clutch arrangement as seen in FIG. 4 includes a cam plate 107 secured to the end of shaft 104 and normally engaged by two diametrically opposed studs 108 and 109 on arms 110 and 111 which are pivoted at 112 and 113 to a plate 114 which is screwed to the left side of the pulley 102. Springs 116 and 117 urge the arms 110 and 111 counterclockwise and therefore serve to maintain the studs 108 and 109 in engagement with the small dwells in the cam plate 107. The arrangement is such that if the shaft 104 and hence gear 106 is prevented from rotating the springs will yield and permit rotation of the pulley 102, studs 108 and 109, and plate 114 independently of the cam plate 107 and shaft 104. Gear 106 engages a third gear 118 (FIG. 3) on a sleeve 119 carried by shaft 163 extending to the right from frame 47 with a smaller diameter gear 120 being connected to sleeve 119. This smaller gear 120 engages a gear 121 supported by a sleeve free on a power shaft 122, said sleeve further carrying a main drive gear 123 (FIG. 5). It is thus seen that operation of the motor 100 causes rotation of the main drive gear 123 but does not cause rotation of the power shaft 122.

The motor is energized in response to the depression of a number of operation control keys seen on the right end of the keyboard in FIG. 1 and which are to be described later. Each of these keys through the mechanism seen in FIG. 11 serves to rock a shaft 125 and hence an arm 124 (FIG. 5) on the left end thereof clockwise from its normal position and thus by means of a leftwardly extending stud 126 to rock bellcrank 127 counterclockwise against the clockwise urge of a restoring spring 128. The left arm of bellcrank 127 is disposed on the right side of frame 47 and has a first leftwardly extending ear 129 which passes to the left through an opening in frame 47 and overlies a portion of a trip latch 130 on the left side of frame 47. A second leftwardly extending ear 131 lies beneath the edge of an opening in frame 47 to thereby serve as a limit for the home position of the bellcrank 127. The trip latch 130 is normally in front of a leftwardly extending lug 133A on a motor control lever 133 pivoted at 134 to the right side of frame 47 and urged counterclockwise by the spring 132 which interconnects the lug 133A with a stationary stud 136. The upper end of the lever 133 is pinned to the front end of a link 137 slidably carried on the right side of frame 47 and which normally holds an electrical switch 138 open when the link is in its rearward position. Upon forward movement of the upper end of lever 133 the electrical switch 138 is closed and thereby energy is provided to the motor 100.

The trip latch 130 is pinned at its front end to a bellcrank 139 supported on the left side of frame 47 and having a lower arm 139A which is engageable with a pair of leftwardly extending rollers 141 and 142 on a control plate 143. The control plate 143 is pinned to the left end of power shaft 122 and in its normal position serves to hold the bellcrank 139 in its most clockwise position against the urge of a spring 144 connected to a stud on the frame 47 and to trip latch 130. The arrangement is such that following an initial rotation of the power shaft 122 (to be presently described) the rollers 141 and 142 are moved away from the lower arm 139A on bellcrank 139 to permit spring 144 to rotate the bellcrank 139 counterclockwise. Lowering of the trip latch 130 by the ear 129 on bellcrank 127 moves the latch 130 out of its holding position to thereby permit movement of the motor control lever 133 and thus energization of motor 100. Following such lowering of the latch 130 the lug 133A on lever 133 will be positioned over the top of the latch and therefore the latch 130 must be moved forwardly and upwardly to be positioned in front of the lug 133A to restore the lever 133 to its home position at the end of a cycle of operation. This is accomplished by the counterclockwise rotation of bellcrank 139 by spring 144 following the initial movement of power shaft 122. The spring 144 not only moves the latch 130 forwardly but also upwardly so that is is positioned in front of the lug 133A on lever 133 and held upwardly until near the end of a complete rotation of shaft 122 at which time the rollers 141 and 142 engage the lower arm 139A on bellcrank 139 to cause clockwise rotation of bellcrank 139 and thus rearward movement of trip latch 130. Such rearward movement of trip latch 130 moves the upper end of control lever 133 rearwardly and thus opens the switch 138 causing de-energization of the motor. An upstanding stud on the latch 130 engages the stationary stud 136 and hence serves as the limiting position for the latch.

Counterclockwise rotation of bellcrank 127 in response to depression of an operation control key further serves to lower the forward end of the left arm of bellcrank 127 to a position where it lies out of the path of a rightwardly extending arm 146A of a clutch latch 146 rotatably supported on the power shaft 122 (FIG. 5) on the right side of frame 47. A spring 148 connected to the latch 146 and to a detent plate 149 pinned to shaft 122 urges the latch 147 counterclockwise about the shaft 122 with its rightwardly extending arm 146A being normally in engagement with the forward end of the left arm on bellcrank 127. A crescent-shaped clutch plate 150 is rotatably secured to the detent plate 149 by a pin 151 and is urged by a spring 152 counterclockwise, such counterclockwise rotation being prevented however by the abutment of the lower tail piece on the clutch plate with the forward surface of lug 146A. Upon release of the latch 146 by lowering of the forward end of bellcrank 127 the latch 146 moves counterclockwise and allows the plate 150 to undergo a small counterclockwise rotation and thus its rearwardly extending tooth 150A comes into engagement with the power-driven gear 123. The counterclockwise movement of latch 146 further serves through the engagement of its top surface with the stud 150B to help rock plate 150 and maintain the tooth 150A engaged with the gear 123 for the complete cycle. The continued rotation of gear 123 by the above-described gear train and motor 100 carries the crescent-shaped plate 150 and hence the power shaft 122 counterclockwise. By means to be described later the bellcrank 127 is permitted to be returned to its home position by spring 128 during the early portion of a machine cycle and thus by the time power shaft 122 is nearing the end of one complete rotation the bellcrank 127 has been rocked back to its home position with the forward end of its left arm again positioned in the path of the rightwardly extending lug 146A on latch 146. Latch 146 rotates with the shaft 122 by means of the engagement of a leftwardly extending stud 147 to which the spring 148 is connected and thus as the shaft 122 returns to its initial position the tail piece on the crescent-shaped clutch plate 150 is contacted by the rightwardly extending lug 146A causing the tooth 150A to be driven out of engagement from the main power gear 123. In this way the power shaft 122 is given one complete revolution in response to clockwise movement of the trip arm 124 caused by depression of an operation control key.

A main drive cam 160 (FIGS. 5, 6) on the power shaft 122 engages a roller 161 on a power arm 162 which is supported by a cross shaft 163 extending to the right from frame 47, the shape of the cam 160 being such that the arm 162 is driven rearwardly as shaft 122 moves counterclockwise. A pitman 164 pinned to the arm 162 and to the lower end of an arm 166 on the left end of a sleeve 167 free on the main driveshaft 170 of the machine serves to pull the sleeve 167 counterclockwise by approximately 102° in response to the rotation of cam 160. The sleeve 167 has a power lug 168 secured to its right end which is engageable with a power hook 169 rotatably supported on a leftwardly extending stud 171 connected to a cam arm 172 pinned to the main driveshaft 170 (FIG. 9). An end plate 173 (FIG. 9) fixed to the stud 171 has a rightwardly extending stud 174 to which a spring 176 connected to the power hook 169 is attached to thereby urge the hook 169 counterclockwise into the path of the power lug 168.

As set forth in Horton Patent No. 1,853,050 the cam 160 serves primarily to drive the machine through one-half of its cycle of operation by rocking shaft 170 counterclockwise while a plurality of base power springs 177 serve to drive the machine through the last half cycle by acting through cam 172 to pull shaft 170 clockwise to home position. A second cam 178 (FIG. 5) on power shaft 122 engages a roller 179 on a second arm 180 supported by the cross shaft 163, the lower end of arm 180 being connected to an auxiliary spring 181 which receives energy from and delivers energy to the shaft 122.

A mechanism (FIG. 9) including a latch 186 pivoted on a stud 187 extending to the left from frame 43 serves to disconnect the power hook 169 from the power stud 168 in the event of the misoperation of the keys on the machine keyboard or in the event that specified conditions to be described hereinafter do not exist in the machine. This mechanism thus operates as a clutch to disconnect the motor drive from the machine driveshaft 170 under certain conditions. The rear end of the latch 186 is so shaped as to be compatible with a forwardly extending lug 188 on the power hook 169 in a manner such that if the latch 186 is positioned in the path of rotation of the lug 188 on power hook 169 during a machine cycle it will engage the lug 188 and cause clockwise rotation of the hook 169 about shaft 171 as the power lug 168 continues its counterclockwise drive. Thus the shaft 170 will not be driven through its cycle while the power lug 168 is free to move through its normal counterclockwise and then clockwise movement. A bail 189 rotatably carried on a cross shaft 190 has a leftwardly extending stud 191 which rides in an upwardly and downwardly extending slot 192 defined in the latch 186 and serves to control the position of the latch 186. By means to be described hereinafter the bail 189 is normally positioned in the lower portion of the slot 192 and therefore serves to place the latch 186 in the path of the hook 169, but is operated during each machine cycle if the keys on the keyboard have been properly depressed and other conditions satisfied to rock counterclockwise to a position where the stud 191 is in the enlarged portion of the slot 192 thereby permitting a spring 193 to rotate the latch 186 clockwise out of the path of the lug 188 on hook 169 and hence allow a normal machine cycle to take place. A leftwardly extending stud 194 on the latch 186 is engageable by a clutch control bar 196 which is movable forwardly and rearwardly by mechanism to be described hereinafter to selectively rock the latch 186 to its hook engaging position even though the stud 191 has been moved up into the enlarged portion of the slot 192. This clutch or "handle break" mechanism is substantially the same as that in Horton Patent No. 1,853,050 although the mechanism for controlling the latch 186 is materially different.

As described in detail in the parent Bogan et al. application the machine includes two accumulators or registers each having a pair of sets of intermeshed cross-slidable pinions each of which is selectively engageable with the amount actuators for the entering of amounts and for providing totals. The pinions or wheels within each accumulator are always intermeshed and are moved laterally with respect to each other to provide an arrangement in which one or the other of the sets is engageable with the amount actuators to thereby provide add and subtract operations during the same time of a machine cycle. The amount entering operations take place during the last half of a machine cycle since the amount actuators are moved to amount representing positions during the first half of a machine cycle, while totaling, both positive and negative, is accomplished during the first half of a machine cycle as a result of the pinions controlling the positions of the amount actuators. The algebraic sign of the total taken depends upon which one of the sets of intermeshed pinions in the active accumulator is engaged with the amount actutators during a totaling operation. The upper set of pinions in each accumulator carries the true amount when the total is positive, and the lower set in each accumulator the true amount when the total is a negative quantity, with means responsive to the algebraic condition of the accumulator controlling which set of pinions will serve to limit the actuators during a total operation.

As seen in FIG. 1 the machine has 13 columns of numerical keys disposed to the left of the three columns of operation control keys. Each of the numerical keys 1100 has a downwardly extending keystem 1101 (FIG. 7) which passes through the keyboard plates 1102 and 1103 and is supported by a longitudinal spring 1104 extending through the openings provided in the lower ends of the keystems and supported by means of the usual support rods carried beneath the plate 1103 at the front and rear of the keyboard. Each of the keystems 1101 has a downwardly extending portion 1101A which is disposed either to the left or the right of the center of the keystem for engagement with one of the vertical lugs 353A on the index strips 353 in a manner common in the art as for example in Horton Patent No. 1,853,050. That is, the number 1–5, 7 and 9 keystems have the portion 1101A on the right and numbers 6 and 8 on the left. As seen in FIG. 7 the index strips 353 have only eight lugs 353A since when a "9" is indexed the strip is allowed to move to its extreme forward position. Each keystem is further provided with a pair of large rectangular openings through which a pair of slides 1106 and 1107 pass, said slides being supported at their rear ends by the usual cross rod 1105 and at their forward ends by means of the small yokes as seen in FIGS. 7 and 9. Each lockdown slide 1106 has vertical lock-down lugs 1106A extending upwardly therefrom with the nose-piece of each lug being disposed beneath the section 1101B of each keystem in a manner such that depression of any numerical key in the associated column serves to cam the slide 1106 rearwardly against the forward urge of a small spring 1108 connected to the rear end of the slide and to the rear edge of keyboard plate 1102. The complete depression of a numerical key brings a smaller rectangular opening in the keystem into alignment with the forwardly extending nose on the lugs 1106A and hence the spring 1108 is effective to urge the slide 1106 forward to allow a lug 1106A to latch down the depressed key. Each slide 1106 is pinned at its forward end to the upper end of a small yoke 1109 carried by the cross shaft 190 which is in turn supported by means of brackets extending downwardly from the keyboard plates. The lower end of each yoke 1109 is forked (FIG. 9) and straddles a a bail shaft 1110 carried by the arms 1111 which are likewise rotatably supported by the cross shaft 190. The bail shaft 1110 carries a roller 1112 near its right end which is adaptable to the forward end of a slide 1113 carried on a stud 1114 extending rightwardly from the machine frame 41. A rightwardly extending stud 430B on the cam 430 on the main driveshaft 170 engages a rear cam surface on the slide 1113 and serves when the machine is in its home position to hold the slide 1113 forward and counterclockwise about the stud 1114 as seen in FIG. 7.

The urge provided by springs 1108 acting through the slides 1106 together with various other springs maintains the yokes 1109 counterclockwise about the shaft 190 with the forward arm of their lower forked ends engaged with the bail shaft 1110 thereby limiting the forward movement of the slides 1106. With the bail shaft 1110 in its normal home position as seen in FIG. 7 the slides 1106 are maintained slightly rearward of their most forward position and hence following the depression of any numerical key a different key in the same column can be depressed, such depression of a second key serving first to move the slide 1106 rearward to release the previously depressed key and then permit forward movement of the slide 1106 to latch down the subsequently depressed numerical key. As the main driveshaft 170 moves counterclockwise during the first half of each machine cycle the bail shaft 1110 moves rearwardly under the urge of springs and hence the slides 1106 are permitted to move to their extreme forward positions with the flat surfaces of the lugs 1106A being disposed beneath the section 1101B on the keystems to thereby prevent depression of a key once the machine cycle has been initiated. If a key has been depressed in a column the lug 1106A through its latching engagement with the keystem holds the slide 1106 from moving its full extent forwardly, while if no key has been depressed the slide is allowed to move a greater distance forward. During the last half of each machine cycle the stud 430B on the cam 430 returns to engagement with the slide 1113 which has been moved rearwardly by the bail shaft 1110, such engagement of the stud 430B with the rear cam surface on the slide 1113 serving to rock the slide 1113 clockwise about stud 1114 as it is moving said slide forwardly. A spring 1118 connected to the forward end of slide 1113 further serves to bring the slide to its clockwise position in which a surface 1113A on the forward end thereof which extends slightly forward of the normal front surface on the slide is engaged with the roller 1112. As the stud 430B continues its forward movement the extended surface 1113A on the slide 1113 moves the bail shaft 1110 to an extreme forward position which serves to rock the yokes 1109 clockwise and release the lugs 1106A from their latching engagement with the keystems. This permits the spring 1104 to return the depressed key to its normal position. The final movement of the stud 430B at the end of the machine cycle rocks slide 1113 counterclockwise to bring the roller 1112 and slide 1113 to their FIG. 7 positions and hence permit a slight rearward movement of the bail shaft 1110. Thus the bail shaft 1110 moves rearward, forward, and then rearward during each cycle, with the yokes 1109 associated with a column having a key depressed therein being held against movement to the extreme counterclockwise position assumed by the yokes associated with a column having no key depressed.

The slides 1107 in the 13 numerical orders are identical but the slides 1107 in orders #1–#7 are pinned at their forward ends to bellcranks 1119 (FIGS. 9 and 44) while the slides 1107 in orders #8–#13 are pinned to the bellcranks 1120. The bellcranks 1119 and 1120 are pivoted on cross shaft 190 and have downwardly extending arms 1119A–1120A respectively which engage the forward edge of the bail shaft 1110 to control the position of slides 1107 in a manner similar to that in which the slides 1106 are controlled, said slides 1107 being urged forwardly by springs 1115 connected to their rear ends and to the keyboard plate 1102. As the bail shaft 1110 moves rearwardly during the first half of each machine cycle the slides 1107 are normally free to more forward with the vertical lugs 1107A thereon passing through the left rectangular opening in the keystems. Such forward movement of the slides 1107 rocks the respective bellcranks 1119 and 1120 counterclockwise and hence the cipher stops 1119B–1120B which are integral with the bellcranks 1119 and 1120 are moved upwardly to their positions illustrated in dashed lines in FIG. 7 to engage a lower forward surface on the index strips 353 and thereby prevent forward travel of said index strips. If a key has been depressed in the column the portion 1101B on the depressed keystem will engage a lug 1107A and hold the slide 1107 against forward movement and thereby maintain the associated cipher stop 1119B or 1120B in its normal lowered position out of the path of the index strip 353 thereby permitting the lower end 1101A of the depressed key to limit the travel of the index strip as previously described. It is thus seen that only those index strips 353 associated with a column having a key depressed therein are permitted to move forward during a machine cycle.

Figure 13:
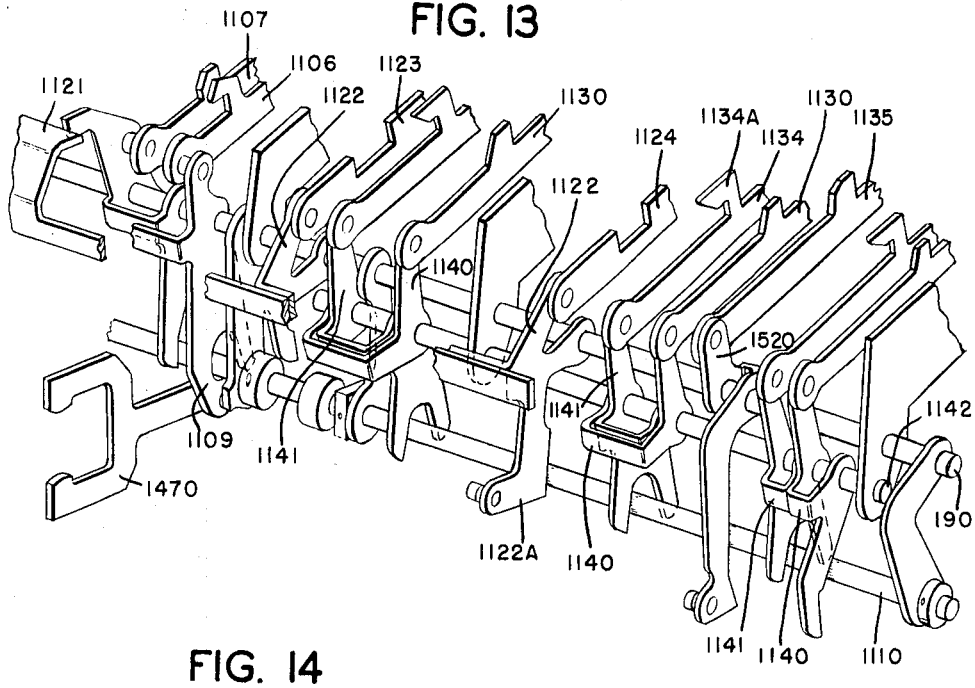
FIG. 13 is a perspective from the right front of the slides and bails associated with the operation control keys and the first column of numerical keys.

The bellcranks 1119 and 1120 are substantially identical with the exception of the forwardly extending tails 1119C on the bellcranks 1119 in the first seven keyboard orders. These tails 1119C are normally engaged by the upper rear surface of a bail 1121 extending across the front of the keyboard and carried at its ends on the cross shaft 190. A small yoke 1122 is welded to the rear surface of the bail 1121 at its right end and downwardly extending arm 1122A (FIGS. 9 and 13) which engages the bail shaft 1110 and hence the bail 1121 follows the movement of the bail shaft 1110 during each machine cycle. During listing operations the bail 1121 is free to move in accordance with the movement of the bail shaft 1110 and hence does not impede the counterclockwise rocking of the bellcranks 1119 which brings the cipher stops 1119B into the path of the index strips. The yoke 1122 is connected by means of pins 1123A and 1124A to the forward ends of a first total slide 1123 and a first subtotal slide 1124 which are normally free to move forward during each listing operation. As seen in FIG. 10 the slide 1124 is engageable by the keystem of the subtotal key in response to depression thereof and in like manner the slide 1123 is engaged by the total keystem in a manner such that upon depression of either the total or the subtotal key the slides 1123 and 1124 are held against any forward travel. Accordingly, the bail 1121 during a total or subtotal operation is prevented from following the bail shaft 1110 and hence holds the bellcranks 1119 in their FIG. 7 positions to prevent engagement of the cipher stops 1119B with the index strips. Therefore the index strips in the first seven numerical orders are free to move forward and be limited by the accumulator pinions during a total or subtotal operation.

Although the bail 1121 extends across the front of the keyboard it controls only those cipher stops in the first seven orders during a total or subtotal operation and does not affect the cipher stops in the orders #8–#13. The reason for this is that the machine illustrated in the present embodiment and disclosed in more detail in Serial No. 831,737 is adapted to have a seven digit total capacity and hence only the keys in the first seven orders would interfere with the index strips during a total operation. The bellcranks 1120 in the orders #8–#13 could obviously be replaced by bellcranks 1119 having the forwardly extending tail 1119C if the machine were provided with an accumulator having a greater number of pinions therein or if there was no need to print in orders #8–#13 during a total or subtotal. In the present machine the actuators 350 and index strips 353 in orders #8–#13 control only the print bars and punch code disks and therefore do not interfere with a total taking operation.

As described in connection with the main power section of the machine a bail 189 (FIG. 9) carried by the cross shaft 190 and controlled by the bail shaft 1110 has a leftwardly extending stud 191 which controls the position of the latch 186. If a numerical key in one of the keyboard orders #1–#13 is only partially depressed the slide 1106 associated therewith will be merely cammed rearwardly and not permitted to return to its forward position with the nose of the lug 1106A disposed over the section 1101B on the keystem and therefore the yoke 1109 associated with that slide will be held in a clockwise position as the bail shaft 1110 starts its rearward travel during the machine cycle. The bail shaft 1110 will then engage the rear arm of the forked end of the yoke being held clockwise and hence be held against further rearward travel. Since the bail 189 is connected to the bail shaft 1110 as seen in FIG. 9 the stud 191 will not be elevated to the enlarged opening in the latch 186 and hence the spring 193 will be unable to rock the latch 186 clockwise out of the path of the forward lug 188 on the power hook. Therefore a complete machine cycle will be prevented. As a result the motor 100 will complete its cycle while the springs 177 return the main driveshaft 170 to its home position. The main shaft 170 will have undergone a slight counterclockwise rotation prior to engagement of the latch 186 with the power hook and therefore as the shaft 170 is rocked clockwise back to its home position the bail shaft 1110 will execute its normal forward movement as previously described to release any depressed keys.

B. *Operation control keys*

Figure 14:
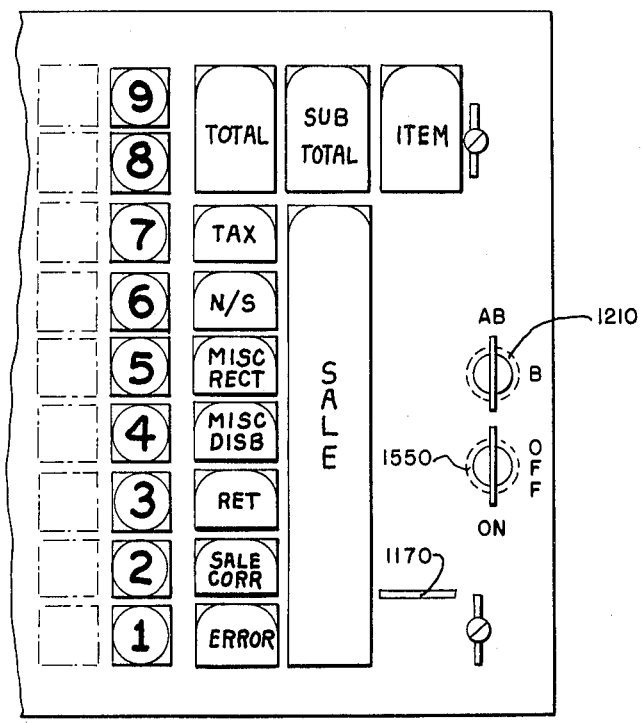
FIG. 14 is a plan view of the right end of the keyboard showing the operation control keys which control the slides and bails of FIG. 13.
Figure 19:
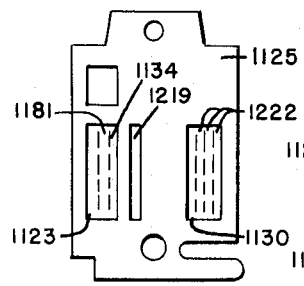
FIG. 19 is a detail elevation of the total keystem.
Figure 20:
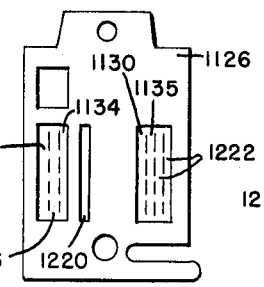
FIG. 20 is a detail elevation of the subtotal keystem.
Figure 21:
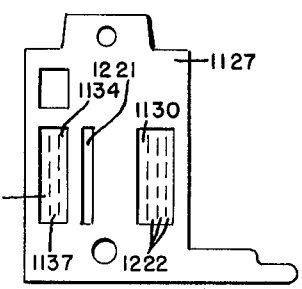
FIG. 21 is a detail elevation of the item keystem.

As seen in FIGS. 1 and 14 there are eight operation control keys in column #14, two keys in column #15, and one key in column #16 with the error, sale correction, return, miscellaneous disbursement, miscellaneous receipts, no sale, tax, and total keys being in column #14; the sale and subtotal keys in column #15; and the item key in column #16. Each of these keys except the error key is operative upon depression to initiate a machine cycle and therefore will be referred to as an operation control key. Each of the operation control keys is provided with a keystem having one or more rectangular openings therein to permit the passage of slides therethrough in the manner illustrated in FIGS. 19–23. Each of the operation control keystems in the #14 order except the error keystem is of the general configuration of the total keystem 1125 illustrated in FIG. 19. The subtotal keystem 1126 is shown in FIG. 20, the item keystem 1127 in FIG. 21, the error keystem 1128 in FIG. 22, and the sale keystem 1132 in FIG. 23.

Figure 26:
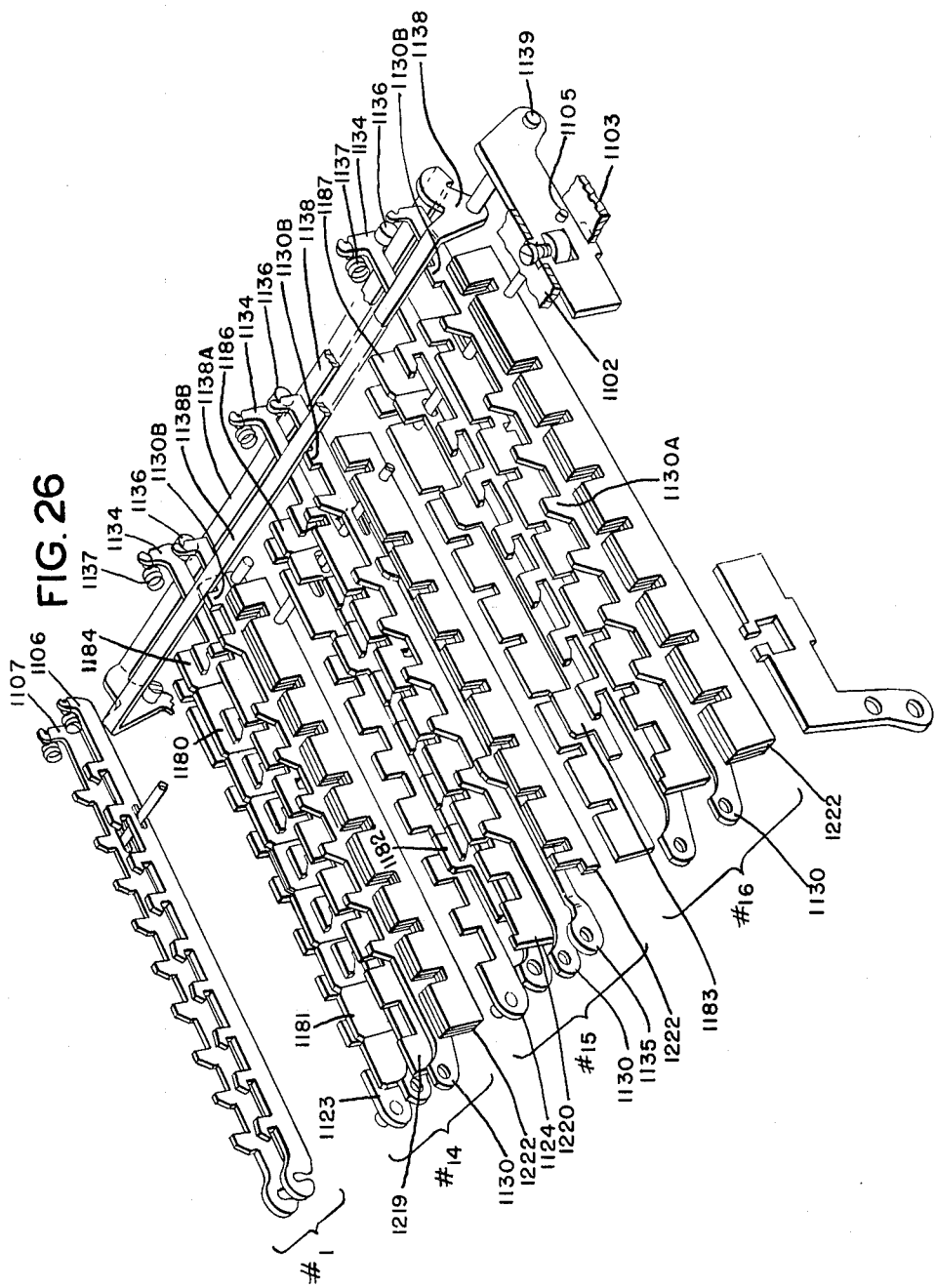
FIG. 26 is a perspective view of the slides disposed beneath the operation control keys and the numerical keys arranged in their respective positions but slightly spread to more clearly show their shapes.

As seen in FIGS. 11 and 26 there are three cycle initiating slides 1130 disposed beneath the operation control keys and passing through the rectangular openings in the right portions of the various keystems. Each of the three slides 1130 has a plurality of upwardly extending lugs 1130A which have cam surfaces on the forward edge thereof engageable by a keystem upon depression of an operation control key to cam the slide 1130 rearwardly against the forward urge thereon provided by springs 1133 connected to the rear end of the slides and to the rear edge of the top keyboard plate 1102. Three lockdown slides 1134 also are each associated with the operation control columns and each carry a roller 1136 at their rear ends. Slides 1134 have a plurality of latching lugs 1134A extending upwardly and forwardly in a manner such that the noses on the lugs 1134A are in line with the small rectangular openings in the upper left portion of the keystems but are normally held to the rear of the keystems. It is to be noted that there is neither a lug 1130A nor a lug 1134A associated with the error keystems 1128 although the slides 1130 and 1134 do pass therethrough. Hence the error key is not latched down by the slide 1134 nor is it operative upon depression to urge slide 1130 to the rear. The slides 1134 are urged forward by springs 1137 in order to latch a depressed operation control key in its depressed position and to prevent depression of additional keys in the associated column, but are held in a rearward position as seen in FIGS. 11 and 26 through the engagement of the roller 1136 with the rear edge of a horizontal arm 1138A on a bail 1138 pivoted at 1139 to the spacing plates which serve to hold the keyboard plates 1102 and 1103 in fixed space relationship. The bail 1138 has a second horizontal arm 1138B which extends across the tops of slides 1130 and 1134 and is engaged at its forward edge by rectangular lugs 1130B near the upper rear edge of each of the three cycle initiating slides 1130. Upon depression of an operation control key the slide 1130 associated with the column containing the depressed key is cammed rearwardly and hence rocks the bail 1138 clockwise to lower the arm 1138A beneath the center point of the three rollers 1136 on the slides 1134 and therefore the springs 1137 are able to pull the three slides 1134 forwardly to latch the depressed key and to prevent depression of the additional operation control keys. Slides 1134 also serve to rock the bail 1138 to its clockwise position and hold it in such clockwise position until the end of the machine cycle. The noses of the lugs 1134A on the slides 1134 each have a cam surface which is so shaped that if the slide moves forwardly in response to the initial rocking of the bail 1138 the depressed key which caused the rocking of bail 1138 is actually pulled downward to a completely depressed position thereby preventing and partial depression of an operation control key and reducing the amount of pressure required for key depression. The slides 1130 and 1134 are supported on the small cross rod 1105 at their rear ends and at their forward ends by bails 1140 and 1141 respectively.

Each of the slides 1130 is pinned to the upper end of a bail 1140 merely to prevent riding of the slide on the lower keyboard plate 1103, said bails 1140 being pivoted on a small shaft 1142 carried by downwardly extending portions of the separating plates previously referred to which hold the keyboard plates 1102 and 1103 apart. The shaft 1142 is seen to be stationary (FIG. 13) and extends only from the right edge of the keyboard to the #1 order and in addition to supporting the bails 1140 further serves to support the bails 1141 pinned to the forward ends of the lock-down slides 1134. The bails 1141 have forked lower ends which straddle the bail shaft 1110 and hence in a manner identical to that described in connection with the numerical keys the slides 1134 are rocked rearwardly upon the completion of each machine cycle by the bail shaft 1110 to release the depressed operation control key.

The control bail 1138 has a downwardly extending arm 1138C (FIG. 11) at its left end which carries a rightwardly extending roller 1144 at its lower end engaged in the upper forked end of a lever 1146 pivoted at 1147 to the machine frame 41. The right end of the previously mentioned shaft 125 seen in FIG. 5 has pinned thereto a rearwardly extending arm 1148 which is urged clockwise by a spring 1149 connected to a stud 1150 protruding to the right from the frame 41 and to a leftwardly extending stud 1148A on the arm 1148 which further carries a small slide 1150. The lever 1146 has a small arm 1151 pinned to its lower end at 1152 with the arm 1151 having a rightwardly extending stud 1151A which passes through a slot provided in the slide 1150 and by means of a spring 1153 connected to said stud 1151A and the upper end of said slide 1150 is held in its most counterclockwise position on the lever 1146. The small arm 1151 has a notched surface which is engageable with a square stud 1154A extending to the left from the upper end of a latching arm 1154 pivoted at 1156 to the machine frame 41, said latching arm 1154 having a ledge thereon which is engageable with a square stud 1148B extending to the left from the end of the arm 1148. A spring 1157 urges the latching arm 1154 counterclockwise into engagement with the square stud 1148B and therefore the latching arm 1154 normally holds the shaft 125 in its counterclockwise position shown in FIG. 11 against the urge of spring 1149.

Rocking of the bail 1138 by depression of an operation control key moves the small arm 1151 rearwardly and as a result the latching arm 1154 is rocked clockwise out of latching engagement with the square stud 1148B on the arm 1148 permitting spring 1149 to rock the shaft 125 clockwise and through the control arm 124 at the left end of said shaft 125 initiate a machine cycle. At the arm 1148 and shaft 125 move clockwise the small arm 1151 is carried therewith by means of the slide 1150 and spring 1153 and hence the latching arm 1154 and the arm 1148 must be reset to their initial positions seen in FIG. 11. Such resetting is accomplished by means of a forwardly extending arm 1157 pinned to the shaft 125 which carries a roller 1158 at its forward end which is engageable by a cam 1159 on the main driveshaft 170 as the shaft 170 rocks counterclockwise during the first half of the machine cycle. This engagement of the cam 1159 with the roller 1158 rocks shaft 125 counterclockwise to reset the latching arm 1154 and the small arm 1151 to their FIG. 11 positions. The cam 1159 carries a small plate 1160 on its left side which is engageable with the roller 1158 as the cam moves counterclockwise but due to a spring 1161 connected to a stud 1162 on the cam 1159 and to a stud 1160A on the plate 1160, such engagement of the plate with the roller 1158 merely rocks the plate clockwise about its pivot point 1163 on the cam 1159. As the cam 1159 returns clockwise to its home position the plate 1160 lies over the top of the roller 1158 and due to the position of the pivot point 1163 clockwise rotation of the shaft 125 to initiate a second cycle is prevented until the cam 1159 and plate 1160 have completely returned to their home position at which point the plate 1160 clears the forward edge of the roller 1158. After the plate clears the roller it permits movement of the shaft 125 in response to a subsequent depression of another operation control key. In this way the machine is provided with a safety feature which prevents a second machine cycle until the previous machine cycle has been completed.

Figure 22:
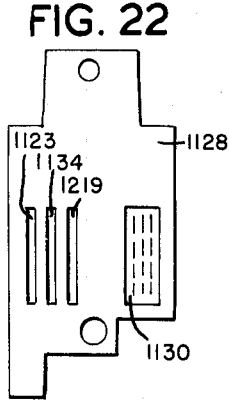
FIG. 22 is a detail elevation of the error keystem.
Figure 23:
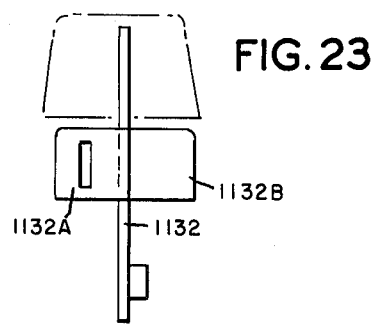
FIG. 23 is a front view of the sale keystem.

To prevent simultaneous depression of more than one operation control key each of the keyboard orders #14, #15 and #16 is provided with an interconnected pendant system which permits depression of only one operation control key. As seen in FIG. 15 there is a small pendant 1180 disposed between the plates 1102 and 1103 which has chamfered surfaces at its upper corners which are adaptable to the lower left rectangular opening in the total and tax keystems. Similar pendants 1181 or 1185 are disposed between the other operation control keys in order #14 and are likewise adaptable to the openings in each of the operation control keys in order #14 except the error keystem 1128 which as seen in FIG. 22 has a solid portion which is in line with the pendants and hence the error key operates independently of the remaining operation control keys. The pendant 1180 has a slot which receives the small rod 1105 with the length of said slot being exactly long enough to permit movement of the pendants beneath the keys in the #14 column for receiving only one keystem. After one operation control key has been depressed the pendants in the #14 column are no longer movable to receive an additional keystem between adjacent pendants and hence it is impossible to depress more than one operation control key in the #14 column at any one time. In a similar manner there is a pendant 1182 beneath the sale and subtotal keys which has chamfered surfaces engageable by the sale and subtotal keystems to control the position of the pendant and permit depression of only one of the keys in the #15 column. There is also a pendant 1183 disposed beneath the item key in the #16 order which is carried by the rod 1105 in a manner identical to that of the pendants 1180 and 1182 and hence is movable in response to depression of the item key. Since the #15 and #16 orders do not have a key such as the error key associated therewith, a dummy keystem 1170 is disposed at the front of the #15 order and also one in the #16 order. These dummy keystems are stationary and have configurations similar to that of the error keystem seen in FIG. 22 for limiting the movement of the pendants and to support the various slides.

To interconnect the pendants in the three operation control columns there are additional pendants 1184, 1186 and 1187 disposed in line with and to the rear of the respective pendants 1180, 1182 and 1183 with the pendants 1184 and 1187 having their rear edges engageable with a first lever 1188 pivoted at 1189 to the underside of keyboard plate 1102 to provide a connection between the pendants in the #14 and #16 orders as seen in the rear view of FIG. 18 and top view of FIG. 18A. The arrangement is such that upon depression of any key in the #14 order the pendant 1184 will be moved rearwardly to pivot the arm 1188 clockwise and thereby urge the pendant 1187 in the #16 order forward to a position beneath the item key and thereby prevent depression not only of the item key but also the remaining keys in the #14 order. In like manner the depression of the item key cams the pendant 1187 rearwardly to pivot lever 1188 counterclockwise and hence drive the row of pendants in the #14 order forwardly to a limiting position against the error keystem and prevent depression of any key in the #14 order.

Second and third levers 1190 and 1191 pinned respectively at 1192 and 1193 beneath the plate 1102 serve to interconnect the #15 column pendants with the #16 and #14 column pendants. The lever 1190 is engaged with the pendants 1187 and 1186 and hence depression of an operation control key in one of the columns #15 or #16 rocks the lever 1190 about its pivot point 1192 to prevent depression of a key in the other one of columns #15 or #16. In like manner the lever 1191 is engaged with the pendants 1186 and 1184 and hence depression of a key in one of the two orders #14 or #15 will rock the lever 1191 about its pivot point 1193 to prevent depression of a key in the other column. The space between adjacent pendants and between the levers 1188, 1190 and 1191 with respect to the pendants 1184, 1186 and 1187 is such that the depression of any operation control key takes up the entire free space between adjacent pendants in each of the columns and therefore depression of more than one operation control key is impossible.

Figure 24:
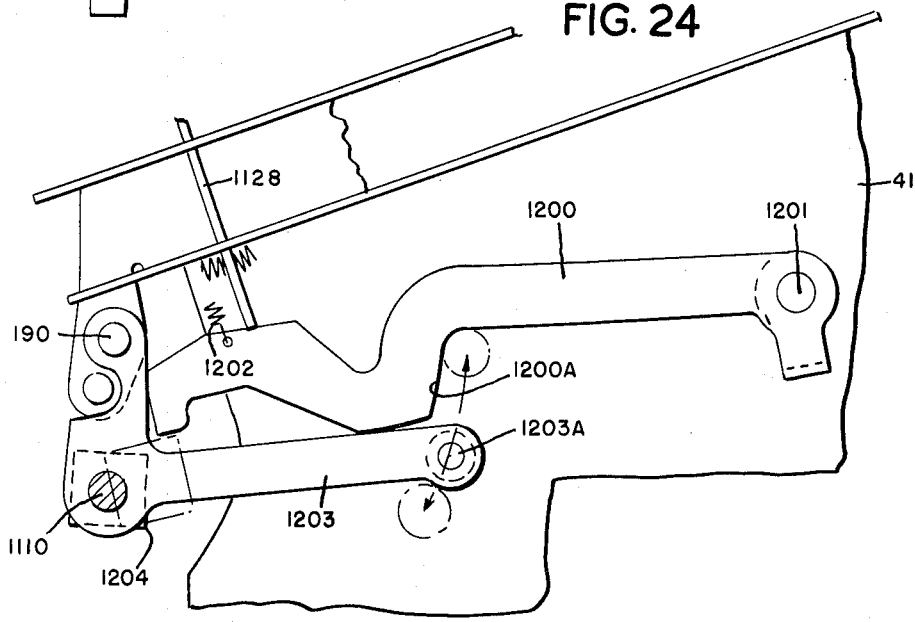
FIG. 24 is a right elevation of the mechanism for preventing depression of the error key after a machine cycle has been initiated.

As previously mentioned the error key is not controlled by the latching slide 1134 in the #14 column nor is it controlled by the pendants in columns #14 and hence it is normally free to be depressed for release of the numerical keys as well as the operation control keys which may have been depressed. As seen in FIG. 24 the error keystem 1128 is positioned with its lower end on top of a lever 1200 pivoted on a stud 1201 extending rightwardly from the frame 41 and urged by a spring 1202 clockwise into engagement with the error keystem. This lever 1200 has a cam surface 1200A which is engageable with a leftwardly extending roller 1203A on a bail 1203 carried by the cross bail 1110 and pivoted on the cross shaft 190. The arrangement between the cam surface 1200A and the roller 1203A is such that depression of the error key rocks the bail 1203 clockwise to bring the cross bail 1110 to its extreme forward position and thereby release any depressed key on the keyboard in the manner previously described. To prevent depression of the error key after a machine cycle has been initiated the shaft 1110 carries a rectangular nut 1204 immediately adjacent and on the left of the bail 1203 which is normally positioned forward of the nose of lever 1200 and hence out of the path of the lever 1200 as it is rocked counterclockwise by the error key. However, as soon as the cross bail 1110 moves slightly to the rear during the early part of each machine cycle the upper surface of the nut 1204 is positioned beneath the forward nose of lever 1200 and hence the error key is blocked against depression.

As was previously mentioned the depression of the error key is not controlled by the lock-down slide 1134 nor by the pendants 1181 and hence it would be possible to depress an operation control key while the error key is depressed. If this were done the cross bail 1110 would merely be held in its forward position causing a disengagement of the motor drive from the main driveshaft in the same manner as does a partially depressed key. This independence of the error key from the other operation control keys has an advantage in that if the depression of an operation control key should occur while the machine is not being supplied with electric energy the depressed key can be released through the depression of the error key.

In the embodiment of the machine illustrated the program is such that the lower register identified in Serial No. 831,737 as the "B" register contains a continuous running total of the various transactions performed by the operators throughout the day and therefore it is desirable to prevent totaling or subtotaling of the lower register by anyone other than authorized personnel. The upper "A" register serves as a cross-footer and hence by means to be described hereinafter is normally operative in response to depression of a total or subtotal key to provide a total or a subtotal while the lower register normally remains inactive during a total or subtotal operation. The means for changing the total and subtotal keys from their control of the "A" register to control of the "B" register includes a cylinder lock 1210 which when in its most counterclockwise position referred to as the "A–B" position and shown in FIG. 1 maintains the "A" register operative upon depression of a total or a subtotal key and when in its clockwise or "B" position causes control of the "B" register by the total and subtotal keys. The mechanism responsive to rotation of the cylinder lock for controlling such total and subtotal operations is described hereinafter but it should be mentioned at this time that since the purpose of the "B" register is to provide an accurate running total means must be provided to permit the depression of only the total and subtotal keys when the cylinder lock is in its "B" position.

As seen in FIG. 5 the lower end of cylinder lock 1210 carries a small cam 1211 which is disposed beneath the bottom keyboard plate 1203 and lies in the "U" shaped end of a slide 1212 supported beneath the bottom keyboard plate 1103 for leftward and rightward movement. A detent arm 1213 pinned to the bottom keyboard plate and urged counterclockwise by a spring 1214 serves to yieldingly hold the cam 1211 and hence the lock 1210 in one of two positions. Slide 1212 has three openings in its rear surface which are engaged respectively with the forward arms of bellcranks 1216, 1217 and 1218 pivoted beneath the keyboard plate 1103. Bellcrank 1216 has a vertical lug 1216A which passes upward through an opening in the bottom plate 1103 and is engaged in a lower slot of a first cylinder lock slide 1219 which passes through the central openings in each of the keystems in #14 order as seen in FIGS. 19 and 22. Slide 1219 has a plurality of vertical slots therein which are in alignment with the keystems when the slide is in its rearmost position which corresponds to the slide 1212 being in its leftward position as a result of the cylinder lock 1210 being in its counterclockwise "A–B" position. When the cylinder lock is rotated 90 degrees clockwise to its "B" position the cam 1211 pulls slide 1212 to the right and hence bellcrank 1216 moves slide 1219 to its forward position in which all of the keys in column #14 are blocked against depression except the total and error keys. In a similar manner the bellcrank 1217 through its vertical lug 1217A which passes upwardly through an opening in the bottom plate 1103 to engage a slot in the bottom edge of a second cylinder lock slide 1220 serves to control the position of the slide 1220 which is so slotted that when in its rearward position its vertical slots are aligned with the subtotal keystem and the leftwardly extending lugs 1232A on the sale keystem to permit depression thereof. When the cylinder lock is rotated to its clockwise "B" position the bellcrank 1217 moves slide 1220 to its forward position where it serves to block the sale key against depression but permit depression of the subtotal key. The bellcrank 1218 in like manner has a vertical lug 1218A which controls a third cylinder lock slide 1221 in #16 keyboard order and hence controls the item key. When the slide 1221 is in its rear position the item key can be depressed but upon rotation of the cylinder lock to its "B" position the slide 1221 through bellcrank 1218 is moved forward to block the item key against depression. It is thus seen that the cylinder lock slides 1219, 1220 and 1221 are controlled by the position of the cylinder lock 1210 in a manner such that when the cylinder lock is in its most counterclockwise or "A–B" position each of the operation control keys is depressible but upon rotation of the cylinder lock to its clockwise or "B" position all of the keys in columns #14, #15 and #16 are blocked against depression except for the total, subtotal and error keys. To hold the various slides which pass through the keystems in their proper positions in the keystem openings additional spacing slides 1222 (FIGS. 19–23 and 26) are disposed between the plates 1102–1103 within the keystem openings. Each of these spacing slides is held stationary and hence is provided with vertical slots which are in alignment with the various keystems to serve as guides and to permit depression of the various keys.

C. *Operation control mechanism*

Figure 28:
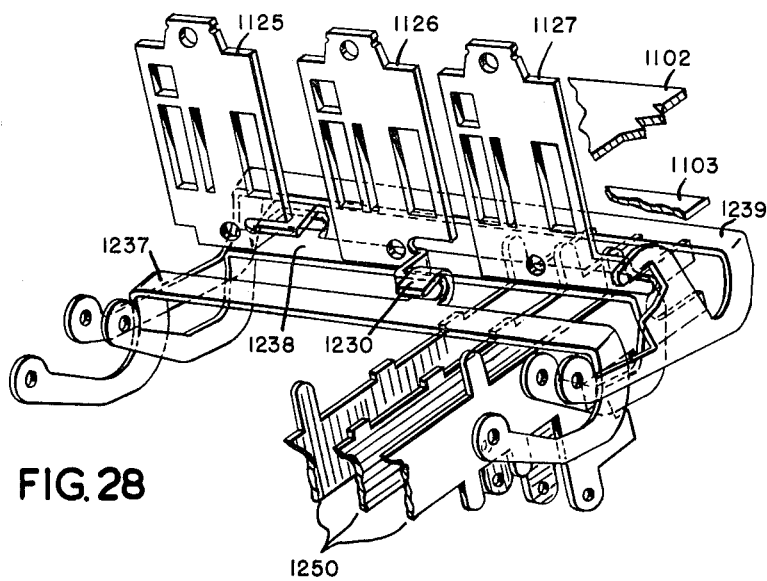
FIG. 28 is a perspective view illustrating the manner in which the total, subtotal and item keys control their respective operation control bails.

Each of the operation control keystems except the error and sale keystems has a horizontal slot in its lower right section to provide rightwardly extending lugs which are each engaged with U-shaped coupling elements 1230 integral with one of nine control bails 1231–1239 seen in FIGS. 27 and 29 as being pivoted by studs 1240 to the frames 39 and 40. A spring 1241 extending from front to rear along the left top edge of the frame 39 passes alternatively over leftwardly extending studs 1242 on the frame and under the bails 1231–1239 to thereby provide an upward urge on each of the bails to hold them in their most counterclockwise positions where they are limited against the rearwardly extending lugs 1243 formed as an integral part of the frame 39. The coupling between the keystems and the bails 1231–1239 is such that upon depression of an operation control key one of the bails is rocked clockwise and held in such clockwise position by means of the previously described lock-down slides 1134. As seen in FIGS. 27, 28 and 29 the sale correction key controls bail 1231, the return key controls bail 1232, the miscellaneous disbursement key controls bail 1233, the miscellaneous receipts key controls bail 1234, the no sale key controls bail 1235, the tax key controls bail 1236, the subtotal key controls bail 1237, the total key controls bail 1238, and the item key controls bail 1239.

Disposed beneath the bails 1231–1239 are a plurality of function sensing slides 1250–1 to 1250–19 (FIG. 29) each of which has a plurality of upstanding lugs 1250A selectively positioned along the upper surface thereof and extending upwardly by a distance which is so measured that when the respective operation control bails are in their elevated or counterclockwise positions the slides are free to move forwardly and rearwardly on their supporting shafts 1244 and 1245 which interconnect the frames 39 and 40. However, when one of the bails is rocked clockwise its horizontal section is disposed in the path of the lugs 1250A and hence those slides which have lugs associated with the depressed operation control bails are held against rearward movement. By means to be described hereinafter the sensing slides are normally held in their forward positions with the lugs 1250A being disposed forward of the control bails but are each urged through a yielding connection toward their rearmost positions during each machine cycle to bring the lugs 1250A into engagement with the control bail 1231–1239 which has been depressed. The shafts 1244 and 1245 each have 19 annular grooves for receiving the slides, and therefore the slides will be numbered as 1250–1 through 1250–19 to correspond to the grooves in the shafts, with 1250–1 being the leftmost slide and 1250–19 the rightmost. As seen in FIG. 29 all 19 positions on the shafts 1244 and 1245 are not utilized in the present embodiment to illustrate that the machine is adapted to accommodate additional slides for various other functions desired.

As illustrated in FIG. 31 each of the sensing slides 1250–1 through 1250–19 has a power yoke 1260–1 through 1260–19 respectively pinned thereto by a stud 1251 in a manner such that the power yokes 1260 each hang downwardly from one of the sensing slides. Each power yoke 1260 has a spring 1252 connected to its forward surface which serves to pull the yokes forwardly to a position limited by the engagement of the lower ends of the yokes with a limiting shaft 1253 extending between the frames 39 and 40. Each of the power yokes carries a leftwardly extending stud roller 1254 which is engageable by an individual cam 1270 numbered as 1270–1 through 1270–19. These cams are stationary on a sleeve supported between frames 39 and 40 and which is in turn pinned at its left end to the main driveshaft 170. Therefore the cams 1270 are rotated first counterclockwise and then clockwise during each machine cycle. When the main driveshaft 170 is in its normal home position each of the rollers 1254 is positioned on the low spot of the corresponding one of the function cams 1270 and hence the springs 1252 are operative to hold the sensing slides 1250 in their forward positions on the shafts 1244 and 1245. During each machine cycle as the main driveshaft 170 begins its counterclockwise rotation the function cams 1270 each engage a stud roller on one of the power yokes 1260 to thereby move said stud roller 1254 rearwardly. If the operation control bail which was moved clockwise in response to the depression of an operation control key engages a lug 1250A, the slide 1250 carrying that lug will be prevented from moving rearwardly and hence the power yoke 1260 pinned to such sensing slide 1250 pivots about the stud 1251 which connects the yoke to the slide. Therefore that yoke 1260 rotates counterclockwise around the stud 1251 and hence the lower end of the power yoke moves rearwardly. However, if there is no lug 1250A on a given slide in the vicinity of the depressed operation control bail then the power yoke 1260 associated therewith will be rotated clockwise about its lower end as the cam 1270 moves the stud roller 1254 rearward. It is therefore seen that if a sensing slide carries a lug which engages a given bail that the lower end of the power yoke 1260 moves rearwardly but if the slide does not have a lug to engage the bail then the upper end of the power yoke moves rearwardly while the lower end remains in its forward position of engagement with the limiting shaft 1253. Each of the power yokes 1260 carries near its lower rear end a stud 1256 which is positioned in front of the forward end of a corresponding function control slide 1280–1 to 1280–19 having a pair of slots and carried by said slots on the small cross shafts 1257 and 1258 extending between the frames 39 and 40. There are a plurality of the function control slides for controlling specific machine functions and they are numbered 1280–1 through 1280–19 to facilitate association of the correct function control slide with the proper power yoke and sensing slide. These function control slides are normally maintained in their forward positions with their forward ends immediately adjacent one of the studs 1256 carried by a power yoke and thus it is seen that if a function sensing slide is held in its forward position by a bail during a machine cycle that the control slide 1280 associated therewith will be driven rearwardly during the first half of the machine cycle. Since the fuction control slides are power-driven rearwardly they may be termed power slides or power bars which serve to control specified machine functions.

The function cams 1270–2 and 1270–18 are identical and as seen in FIGS. 32 and 54 each has in addition to its rear cam surfaces a forward cam surface which is adaptable to the rollers 1259 (FIG. 32) carried by arms 1261L and 1261R on a shaft 1262 between frames 39 and 40 in front of the main driveshaft. The arms 1261R and 1261L are the outer ends of a small bail 1261 which extends beneath each of the function sensing slides 1250 and is engageable with a downwardly extending lug 1250B on each of the function sensing slides. This bail 1261 is urged clockwise about shaft 1262 by a spring 1263 but is held in its FIG. 32 counterclockwise position of engagement with the sensing slides by the function cams 1270–2 and 1270–18. During the first half of each machine cycle as the function cams move counterclockwise the bail 1261 is allowed to move clockwise to permit rearward travel of the function sensing slides but during the last half of each machine cycle the cams 1270–2 and 1270–18 through their engagement with rollers 1259 rock the bail 1261 counterclockwise to restore all of the sensing slides to their home positions. The springs 1252 connected to the lower ends of the power yokes 1260 maintain the rollers 1254 in engagement with the function cams and hence the springs 1252 also serve to return the function sensing slides to their home positions during the last half of each machine cycle.

The sale key as previously mentioned is not coupled with one of the bails 1231–1239 but is instead provided with the mechanism seen in FIG. 11 for controlling the function sensing slides 1250. As seen in FIG. 11 the sale key is provided with leftwardly and rightwardly extending lugs 1132A and 1132B for guiding the sale bar through the keyboard plates 1102 and 1103 and also as previously described the lugs 1132A and 1132B ride in the spacing slides illustrated in FIG. 26. The sale key or bar is supported by means of two small cranks 1410 and 1411 having leftwardly extending studs 1410A and 1411A respectively which are connected to the lower ends of the sale keystem. The cranks 1410 and 1411 are pivoted at 1412 and 1413 respectively to a small plate 1414 secured to the bottom of the keyboard plate 1103 and provided with vertical arms which extend upwardly through slots in the lower keyboard plate 1103. The cranks 1410 and 1411 have downwardly extending arms which pass through the lower keyboard plate and are interconnected by a link 1416 disposed beneath the keyboard plate 1103 to provide a parallel motion for the sale bar as it is depressed and released. A spring 1417 connected to the rear of link 1416 and to the bottom of the keyboard plate urges the link forward and hence the sale bar upward. As previously described the sale bar is locked down by a lockdown slide 1134 and also initiates a machine cycle through a motor trip slide 1130.

The link 1416 is coupled with the left end of a lever 1418 (FIG. 12) pivoted at 1419 to the plate 1414 and coupled by means of its right forked end with the upper end of a bell crank 1420 pivoted at 1421 on the right side of frame 39. The bellcrank 1420 is provided with a cross bail 1422 at its rear end which extends between plates 39 and 40 beneath each of the function sensing slides 1250 with the left end of the bail 1422 being pivoted on the frame 40. The function sensing slides 1250 are provided with downwardly extending lugs 1250B which are engageable by the cross bail 1422 in a manner analogous to engagement of the function control bails 1231–1239 with the upper lugs 1250A and thus the sale key is operable upon depression to hold selected slides 1250 stationary. As will be described in connection with the programming of the machine the lugs 1250B are present only on selected slides in the area of the cross bail 1422 and hence the sale bar controls the selected machine functions in a manner substantially the same as that in which the previously referred to operation control keys do through their engagement with the operation control bails 1231–1239. As seen in FIG. 11 the cross bail 1422 is normally disposed below the lugs 1250B when the sale key is in its elevated position but upon depression of the sale key link 1416 is moved rearwardly, lever 1418 is pivoted clockwise, bellcrank 1420 is pivoted counterclockwise and cross bail 1422 is elevated to blocking engagement with the lugs 1250B on the function sensing slides. It is thus seen that by providing the function sensing slides with downwardly extending lugs 1250B that additional operation control keys and control bails can be added to the machine to increase its versatility.

Each of the sensing slides are urged rearwardly during the early part of each machine cycle by the function cams and power yokes and hence there would tend to be a relatively heavy load on the machine during the initial engagement of the function cams with the power yokes. To reduce such load the function cams have their main cam surfaces at their rear edges staggered as seen in FIG. 54. In this way the various power yokes are engaged at slightly different times by their respective function cams rather than simultaneously. Each of the function cams is provided with a pair of diametrically opposed flat surfaces on its inner surface for positioning of the cams on the sleeve 1266 pinned to the main driveshaft 170. The cams are held fixed distances apart by spacers 1267 on the sleeve 1266 to provide a compact unit between the frames 39 and 40 with the cams being held against any lateral movement. As seen in FIG. 54 there are six differently shaped cams with cams 1270–1, 1270–6, 1270–8 and 1270–19 being identical; cams 1270–2 and 1270–18 identical; cams 1270–7, 1270–14 and 1270–16 identical; cams 1270–3 and 1270–5 identical; and cams 1270–11, 1270–12 and 1270–13 identical.

As described with reference to FIGS. 10–15 of the Bogan et al. application the upper and lower accumulators are engaged and disengaged with the amount actuators by the counterclockwise and clockwise rotation of the shafts 230 and 230′ seen in FIG. 30 of the present application. The means for engaging the accumulators with the amount actuators is shown in FIG. 30 and includes a power sector 1300 pivoted on the cross shaft 351 and having rightwardly extending studs 1302, 1303, 1304 and 1306 which serve to provide the necessary power for control of the accumulator shafts 230 and 230′. The power sector 1300 is connected by means of a link 1301 connected at 436 to the rear end of the yoke 432 pivoted on shaft 423. The yoke 432 is connected by a link 431 to a cam 430 free on the shaft 170 and thus, as described below, is reciprocated during each machine cycle.

The cam 430 which drives the yoke 432 is (as seen in FIG. 53) rotatably carried on the main driveshaft 170 but is provided with a leftwardly extending stud 430C which is engaged by one end of a coil spring 1290 (FIG. 30) which encompasses the main driveshaft and has its other end engaged with the rightwardly extending stud 830A on the cam 830 which is pinned to the main driveshaft. As the main driveshaft 170 moves counterclockwise the stiff spring 1290 being pulled by cam 830 causes the cam 430 to rotate therewith. Such counterclockwise movement of the cam 830 also moves a toggle mechanism which includes the arm 1291 pinned at 1291A to the cam 830 and the arm 1292 supported on a stud extending to the left from frame 41 to their FIG. 30A positions where the pin 1293 connecting the two arms is above the line connecting the pivot points for the arms, with the lug 1291B engaging the arm 1292 to hold the parts in the FIG. 30A position. When the arms 1291 and 1292 reach their FIG. 30A positions at the end of the first half cycle of drive they lock the cam 830 and hence the main driveshaft 170 against clockwise rotation until the arm 1292 is moved a small distance clockwise and the arm 1291 counterclockwise to move the pin 1293 which connects the two arms to a position below the line connecting the points of rotation for the two arms. Thus if for some reason the main operating portions of the machine hold the cam 430 against its normal movement with the cam 830 the spring 1290 will yield and allow the main driveshaft to advance to its half cycle position where it will wait until the cam 430 which drives an oil-filled dash pot catches up. When the cam 430 resumes its normal relationship with respect to cam 830 a small lug on the upper end of cam 430 will engage a rightwardly extending lug 1294A on a latch 1294 pivoted on a stud 1295 and having a tail which moves to latching position with respect to the arm 1292 to hold the arms in their FIG. 30A positions. When the forward edge of the cam 430 engages the lug 1294A a leftwardly extending pin 1294B engages the top surface of the arm 1292 and therefore drives the pin 1293 connecting the two arms downwardly and hence releases the toggle. This mechanism is substantially the same as that shown in Horton Patent No. 1,853,050.

The mechanism for engaging and disengaging the accumulators in response to reciprocation of the power sector 1300 is seen in FIG. 30 to be on the right side of the frame 42 and since the mechanism which controls the engagement and disengagement of the lower accumulator is identical to that for the upper accumulator only the mechanism of the upper accumulator will be described, it being understood that the lower mechanism operates in substantially the same manner.

When the driveshaft 170 is in its home position both accumulators are disengaged from the amount actuators and the upper stud 1302 (FIG. 30) on the power sector 1300 lies over the top of a lever 1307 pivoted on the shaft 1308 extending to the right from frame 42 and is coupled by means of a slot in its rear edge with a stud 1309A extending to the right through the frame 42 carried by an arm 1309 secured to the accumulator shaft 230. With the lever 1307 in its counterclockwise position of FIG. 30 the shaft 230 is maintained clockwise and hence the accumulator pinions held out of engagement from the actuators. The lever 1307 has a forwardly extending portion which carries a total pawl 1310 pinned thereto at 1311 and urged clockwise about point 1311 by a spring 1312 connected to the upper end thereof and to the rear end of lever 1307. Said total pawl 1310 is normally held by means subsequently described counterclockwise in its FIG. 30 position where the notch in its lower surface remains in the rear of the stud 1302.

As the power sector 1300 moves counterclockwise during the first half of each machine cycle the second stud 1303 thereon moves up into the pocket 1313A of an add pawl 1313 pivoted at 1314 to the right side of a lever 1316 pivoted on a shaft 1317 extending to the right from the frame 42 and carrying a rightwardly extending stud 1316A which is engaged in a second slot in the first lever 1307. A small spring 1318 connected to the rear tail of the add pawl 1313 and to the lever 1316 maintains the add pawl in a counterclockwise position with a leftwardly extending stud 1319 carried by the rear tail of said total pawl in engagement with the rear surface of the lever 1316. As the stud 1303 moves upwardly it first engages the lower surface of the add pawl 1313, cams said pawl clockwise and then is positioned in the rear of the pocket 1313A. During this first half cycle of machine operation the amount actuators are being moved counterclockwise to differential positions as determined by the depressed numerical keys and the accumulator shaft 230 is maintained clockwise to hold the pinions out of engagement with the actuators. During the second half cycle as the stud 1303 moves downwardly it carries the add pawl 1313 counterclockwise and hence drives lever 1316 counterclockwise which through the stud 1316A, lever 1307, stud 1309A and lever 1309 rocks the shaft 230 counterclockwise to bring the accumulator into mesh with the add racks as described in connection with the accumulating section. This engagement of the accumulator with the amount actuators occurs early during the second half of a machine cycle and as a result of such engagement a detent 1320 pivoted on the previously mentioned shaft 446 and urged clockwise by a spring 1321 into engagement with the stud 1309A serves to hold the arm 1309 in its counterclockwise position and hence maintain the accumulator engaged with the amount actuators after the stud 1303 has moved downwardly by a distance sufficient to release the add pawl 1313. The counterclockwise rocking of lever 1316 during the engagement of the accumulator with the amount actuators rocks lever 1307 clockwise and therefore near the end of the second half of the machine cycle the upper stud 1302 engages the forward end of the lever 1307 and thereby provides the necessary power to rock lever 1307 counterclockwise to cause disengagement of the accumulator from the actuators through the stud and slot connection between arm 1309 and lever 1307. Since the present machine performs addition and subtraction during the second half of machine cycles but with the totalizer pinions shifted laterally during a subtract operation it is seen that the add pawl 1313 is operative to engage the accumulator with the pinions during addition and subtraction operations and the stud 1302 acting on the lever 1307 is operative near the end of each machine cycle to bring the accumulator out of engagement from the amount actuators. Identical mechanism is provided for the lower accumulator and hence it is seen that normally both accumulators would be engaged with the amount actuators during the second half of every machine cycle if additional means to be described hereinafter were not provided for selectively disabling one of the add pawls.

The add pawl 1313 for the upper accumulator is normally disposed in the path of the stud 1303 and hence tends to cause engagement of the upper accumulator with the amount actuators during the second half of each machine cycle. Therefore during a non-add machine cycle the pawl must be rocked clockwise out of the path of the stud 1303 and the means for providing such rocking of said pawls 1313 includes the function control slide 1280–3 seen in FIGS. 31 and 32A (on the same sheet as FIG. 29) which is controlled by the non-add sensing slide 1250–3 disposed beneath the operation control keys. The non-add control slide 1280–3 has a yoke integral therewith at its rear end which extends over the top of function control slides to its left (FIG. 31A), through frame 40, and is bent downwardly to present a vertical surface for engagement with stud 1313B on add pawl 1313.

Figure 51:
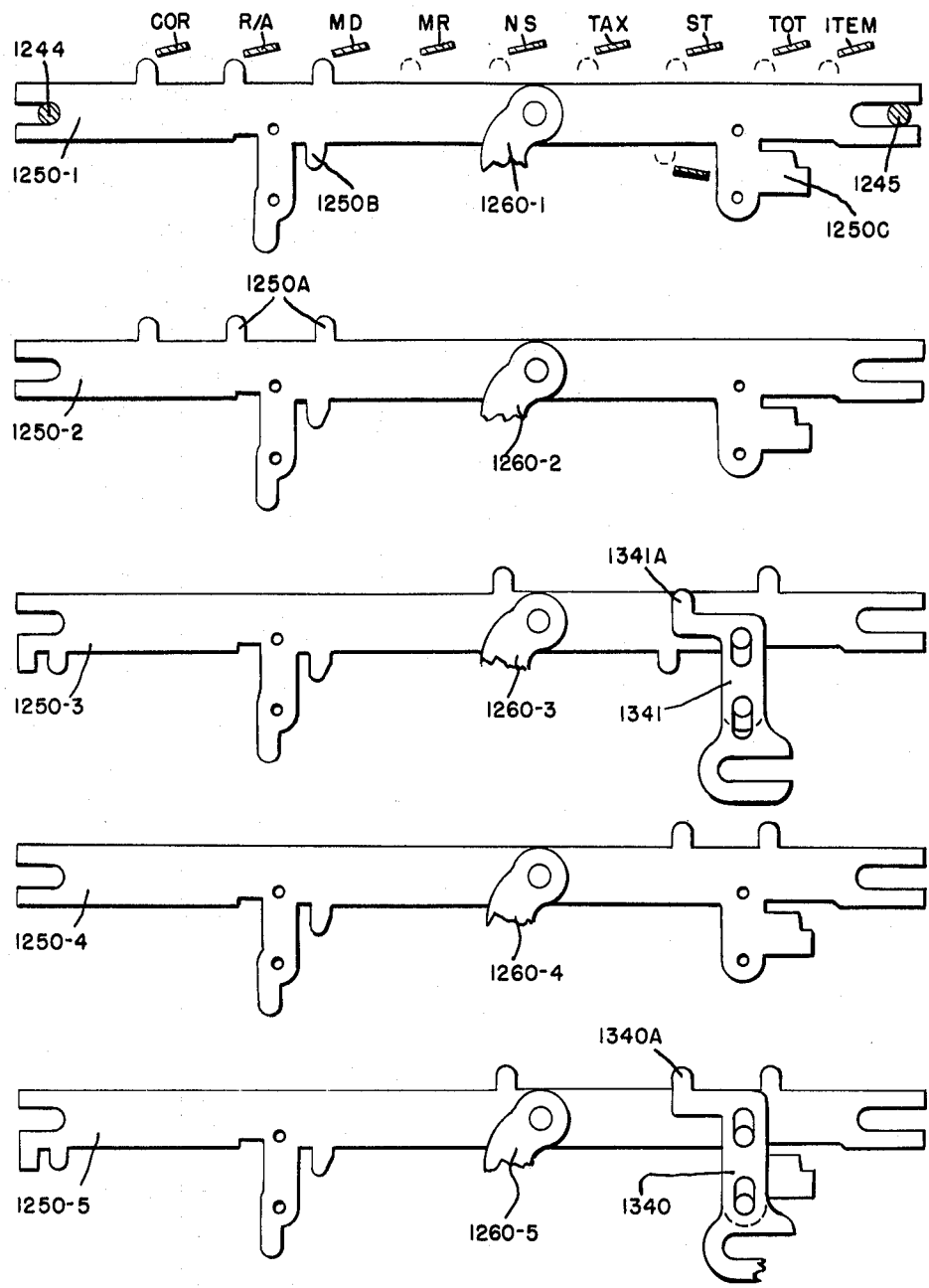
FIGS. 51, 51A and 51B are detail drawings of the function sensing slides as they are programmed in the illustrated embodiment of the machine to control the functions which will be performed in response to depression of an operation control key.
Figure 51A:
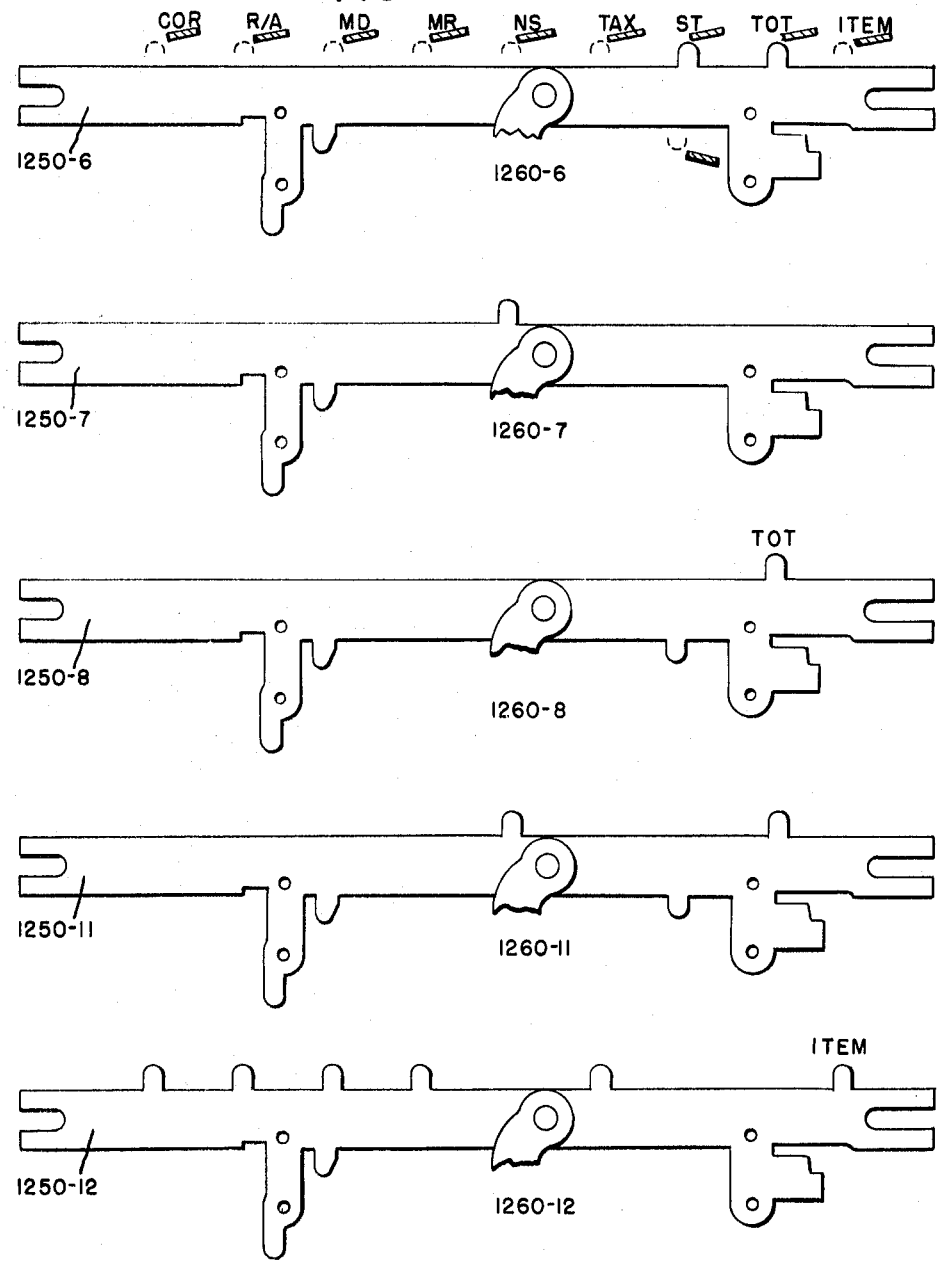

Thus any time an operation control key is depressed to bring a bail into the path of a lug 1250A or 1250B on the non-add sensing slide 1250–3 the power yoke 1260–3 associated therewith will move counterclockwise and hence drive the function control slide 1280–3 rearward to bring the rear end of said function control slide 1280–3 into engagement with the rightwardly extending stud 1313B on the add pawl to thereby rock said add pawl clockwise out of the path of the said stud 1303 on the power sector 1300. As seen in FIG. 51 the non-add slide 1250–3 has a vertical lug only beneath or immediately in front of the total, sale, and no sale bails 1238, 1422 and 1235, respectively, and hence as the present machine is programmed the upper register will be non-added during these types of machine operations. It is obvious that if it is desired to have a non-add operation for the upper register in response to the depression of any other operation control key it is merely necessary to provide a lug 1250A and 1250B on the non-add slide 1250–3 in the vicinity of the desired operation control bail.

In a similar manner the lower add pawl 1313' is normally engaged by the stud 1306 to engage the lower register during the last half of each cycle and is controlled by a second non-add function control slide 1280–5 seen in FIGS. 31 and 31A to be to the right of the first non-add function control slide and provided with a downwardly extending arm which is offset to the left (FIG. 31A) to present a surface which is engageable with the rightwardly extending stud 1313B' on the lower add pawl. The operation of the second non-add function sensing and control slides is identical to that of the first non-add control and sensing slide but it should be noted that as seen in FIG. 31A the second non-add function control slide for the lower accumulator is independent of the first non-add function sensing slide 1250-3 since it is controlled by the non-add sensing slide 1250-5.

As seen in FIG. 31 there is a total pawl latch 1322 pivoted on the right side of frame 40 at 1323 and urged clockwise by a spring 1324 to maintain a leftwardly extending lug 1322A which passes through the frame 40 in engagement with a rightwardly extending stud 1310A on the total pawl 1310. The spring 1324 which holds the latch 1322 clockwise is much heavier than the spring 1312 which tends to urge the total pawl 1310 clockwise and hence the latch 1322 is effective to maintain the total pawl 1310 in its most counterclockwise position with its lower notch disposed to the rear of the upper stud 1302 on the power actuator 1300. During a totaling operation the total control slide 1280–4 seen in FIG. 31 and 31A to be positioned between the two non-add slides is driven rearwardly and through the enlarged rear surface on said slide engaging the rightwardly extending stud 1322B on the latch 1322 the total pawl 1310 is enabled. That is, the latch 1322 is moved counterclockwise to permit spring 1312 to rock the total pawl 1310 clockwise to a position over the stud 1302 on the power actuator 1300. Therefore during the first half of the machine cycle the stud 1302 acting through the total pawl 1310, lever 1307, stud 1309A, and arm 1309 (FIG. 30) causes engagement of the accumulator with the amount actuators to provide a totaling operation. Since the levers 1307 and 1316 are connected by a stud and slot connection the engagement of the accumulator with the amount actuators during the first half cycle to perform a totaling function causes the lever 1316 to be rocked to its counterclockwise position early in the first half of such machine cycle. As the power sector nears the end of the first half cycle the stud 1303 engages the upper and most forward end of pawl 1313 and hence during the completion of the first half cycle serves to pull the lever 1316 clockwise to disengage the accumulator from the amount actuator near the end of the first half cycle.

The add pawl 1313 is normally in the path of stud 1303 and therefore even though the total pawl has been operative to engage the upper accumulator during the first half cycle the add pawl would be operative to engage the accumulator during the second half cycle. Hence a subtotal operation would be performed in the upper accumulator while the lower accumulator would receive the amount totaled out of the upper accumulator as a result of its add pawl 1313' being active. To prevent these things the two non-add sensing slides 1250–3 and 1250–5 each are held stationary by the total bail 1238 and hence the two accumulators are non-added during a total operation. The upper end of the pocket 1313A is seen to extend a greater distance toward the front of the machine than does the lower end and therefore is engaged by the stud 1303 during its upward travel even though non-add control slide 1280–3 is held in its rear position to disable the add pawl 1313. However, the rearward position of the non-add control slide 1280-3 does serve to maintain the add pawl 1313 sufficiently clockwise to prevent engagement of the stud 1303 with the lower surface of the pocket 1313A during the downward travel of said stud 1303 and hence the accumulator remains disengaged from the amount actuators during the second half of the machine cycle. In this manner a total is taken from the upper register.

As described in Serial No. 831,737 the machine is adapted to carry a seven-digit total but only to receive four digit numbers during listing operations and hence the actuator racks in orders #5 through #7 are normally not engageable with the accumulator pinions during listing operations but are engaged therewith during a totaling operation to cause correct printing. As seen in FIG. 17 of Serial No. 831,737 this coupling of the amount actuators in orders #5–#7 is controlled by the lugs 474A on the shaft 474. As seen in FIG. 31 of the present application the end of shaft 474 extends through frame 41 and has secured thereto a small arm 1326 which carries a rightwardly extending stud roller 1327 which is engageable by an arm 1328 carried on the left end of a shaft 1329 extending between the frames 39 and 40 with an extension protruding to the left of the frame 40. A second arm 1330 is also pinned to shaft 1329 on the right side of frame 40 and carries a rightwardly extending stud roller 1331 which is engageable by a downwardly extending tail on the total control slide 1280–4. A spring 1332 normally maintains the shaft 474 in its clockwise position to thereby maintain the geared racks in orders #5–#7 disconnected from the power sectors in those orders. During a totaling operation the rearward travel of the total control slide 1280–4 rocks the shaft 1329 clockwise and hence through the arm 1328 the shaft 474 counterclockwise to connect the geared sectors with the print bars in the #5, #6 and #7 orders and hence the amounts in the #5, #6 and #8 order accumulator pinions are backed off and printed.

Figure 37:
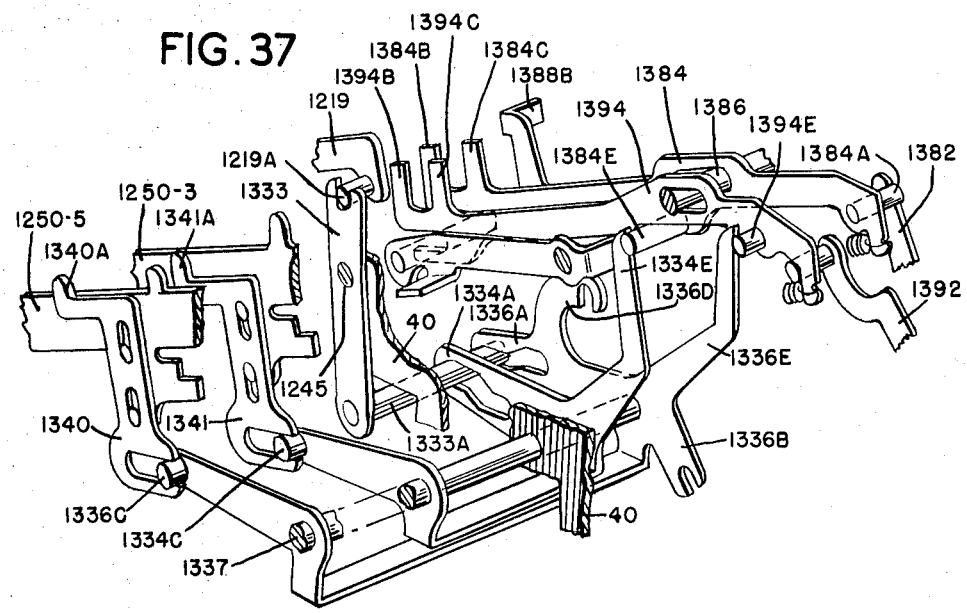
FIG. 37 is a perspective from the right rear showing the upper part of the credit balance and total mechanism controlled by the cylinder lock on the keyboard.

From the above it is seen how the total pawl for the upper accumulator is controlled and rendered non-active except during a total operation. Since the machine has a single total key but two registers it is obvious that means must be provided to control the total pawl for the lower register in a manner such that it can never be active during the same time that the total pawl for the upper register is active. Therefore the cylinder lock slide 1219 which is normally in its rear position with the cylinder lock in its "A–B" position and in its forward position only when the cylinder lock is in its "B" position is utilized to control the total pawl for the lower register. As seen in FIGS. 32 and 37 the rear end of the cylinder lock slide 1219 carries a rightwardly extending stud 1219A which is engaged in the upper forked end of a link 1333 pivoted on the shaft 1245 to the right of frame 40 and having a stud 1333A at its lower end extending to the left through an opening in the frame 40. This stud 1333A as seen in FIG. 37 passes through the cam slots provided in the forward arms on two bellcranks 1334 and 1336 pivoted on a shaft 1337 which extends between the frames 39 and 40 with a leftwardly extending portion protruding to the left of the frame 40 to carry the bellcranks 1334 and 1336 on the left side of frame 40. The bellcrank 1336 carries a downwardly and rearwardly extending arm 1336B which has a forked end engaged with a leftwardly extending stud 1338A (FIG. 32) on a second total pawl detent 1338 pivoted at 1339 to the left side of frame 40. This second total pawl detent 1338 has an upper end which is adaptable to the rightwardly extending stud 1310A on the upper pawl 1310 and a lower surface adaptable to the rightwardly extending stud 1310A' on the lower total pawl 1310'. With the cylinder lock in its usual "A–B" position the cylinder lock slide 1219 is maintained in its most rearward position and hence the total pawl detent 1338 is held in its counterclockwise position of FIG. 32 in which its lower end holds the lower total pawl to the rear of the stud 1304 on the power sector 1300 and hence the lower accumulator remains ineffective to produce a total function. With the detent 1338 in this position the upper total pawl is controlled in the previously described manner by function slide 1280–4. When the cylinder lock is rotated clockwise to its "B" position the slide 1219 is moved forward and rocks the link 1333 (FIG. 32) counterclockwise. Therefore the stud 1333A in the cam slot 1336A is effective to rock the bellcrank 1336 counterclockwise and hence the total detent 1338 clockwise. With the total detent 1338 thusly held in its clockwise position the upper total pawl 1310 is disabled and the lower total pawl 1310' is allowed to move into the path of the stud 1304 to produce a total function from the lower accumulator. With detent 1338 clockwise the upper total pawl is held non-operative even though slide 1280–4 moves rearward during a total operation to release the first detent 1322. It is thus seen that the cylinder lock is operative to determine which is of the two accumulators will be totaled in response to depression of the single total key.

From the above it is seen that with the operation control mechanism utilized in the present machine a total function is performed by one or the other of the registers by a single total key with the total operation consisting of engaging the selected register with the actuators during the first half of a machine cycle and maintaining the register disengaged during the second half of a machine cycle. The single total sensing slide 1250–4 serves to control the single total function control slide 1280–4 and cause it to engage the detent 1322 for the upper register during the first half cycle while the non-add sensing slides 1250–3 and 1250–5 control the non-add function control slides 1280–3 and 1280–5 to cause both registers to be non-added in response to operation of the single total key. The second detent 1338 determines which register will be effective to provide the total in accordance with the position of the cylinder lock slide 1219. A subtotal operation is performed by holding the total sensing slide 1250–4 and not the non-add sensing slide for the selected register. Thus it is seen that a subtotal operation requires a lug 1250A on the total sensing slide 1250–4 in the subtotal bail position, and there must also be a lug 1250A on one of the two-add sensing slides for the subtotal of one of the registers and a lug on the other of the two-add sensing slides during the subtotal of the other register. Therefore the lugs 1250A on the non-add sensing slides 1250–3 and 1250–5 in the subtotal bail position must be controlled in accordance with which accumulator is to provide the subtotal.

As previously mentioned the slide 1219 serves to control the bellcranks 1334 and 1336 for determining the position of the second total detent 1338 and it is therefore advantageous to use the positioning of the bellcranks 1334 and 1336 to control the lugs 1250A on the non-add sensing slides in the subtotal bail position. As seen in FIG. 37 bellcrank 1336 has a forwardly extending arm on its right side which carries a rightwardly extending stud 1336C which lies in the lower slotted end of an auxiliary lug slide 1340 slidably carried on the right side of the lower or "B" register non-add sensing slide 1250–5. In a similar manner the bellcrank 1334 has a second forwardly extending arm which carries a rightwardly extending stud 1334C which lies in the lower slotted end of an auxiliary lug slide 1341 slidably carried on the right side of the upper register non-add sensing slide 1250–3. The two auxiliary lug slides 1340–1341 each have an upstanding lug 1340A–1341A, respectively, which when the associated auxiliary slide is in its lowered position is out of the path of engagement with the subtotal bail 1237 but when in the elevated position is in the path of the subtotal bail 1237 as the non-add sensing slides are moved rearwardly during the machine cycle.

The cam slots in the forward arms 1334A and 1336A through which the leftwardly extending stud 1333A passes are so shaped that when the cylinder lock slide 1219 is in its normal rear position in response to the cylinder lock being in its "A–B" position the bellcrank 1336 is maintained clockwise and the bellcrank 1334 counterclockwise as seen in FIG. 37. With the parts in their FIG. 37 positions it is seen that lug 1340A associated with the lower accumulator non-add sensing slide 1250–5 is in its elevated position and hence the lower register non-add sensing slide 1250–5 is held stationary in response to depression of the subtotal key. Therefore the lower register will be held out of engagement from the amount actuators during the first half of a machine cycle by the total detent 1338 and held out of engagement from the amount actuators during the second half machine cycle through the operation of the non-add function sensing slide 1250–5 and control slide 1280–5. During such subtotal operation with the cylinder lock in its "A–B" position and the auxiliary lug slide 1341 depressed the upper register non-add slide 1250–3 will be free to move rearwardly as the cam 1270–3 rotates counterclockwise and hence the non-add function control slide 1280–3 will remain in its forward position to permit the upper add pawl 1313 to engage the upper register with the amount actuators during the second half of the subtotal machine cycle. The total function sensing slide 1250–4 also has a vertical lug 1250A in the subtotal bail position and hence operation of the subtotal key always holds the total sensing slide 1250–4 stationary. Thus the total power slide 1280–4 is driven rearwardly during a subtotal machine cycle to disable the first total detent latch 1322 and cause engagement of the upper register during the first half of the subtotal machine cycle. In this way the upper register is subtotaled when the subtotal key is depressed with the cylinder lock in its "A–B" position, such subtotal being effected as a result of total sensing slide being held stationary and the non-add sensing slide 1250–3 being allowed to move to thereby cause a total and an add operation to occur during the same cycle.

When the cylinder lock is rotated clockwise 90 degrees to its "B" position the cylinder lock slide 1219 is moved forward and thus the link 1333 through its stud 1333A in the cam slots of bellcranks 1334 and 1336 moves the bellcrank 1334 clockwise and bellcrank 1336 counterclockwise to depress the auxiliary lug slide 1340 and elevate the auxiliary lug slide 1341. As previously mentioned such forward movement of the cylinder lock slide 1219 moves the second total detent 1338 (FIG. 32) to its clockwise position where it is effective to disable the upper total pawl 1310 and enable the lower total pawl 1310'. With the auxiliary lug slide 1340 depressed the lower register non-add sensing slide 1250–5 is free to move rearwardly during a machine cycle caused by depression of the subtotal key and therefore the non-add power slide 1280–5 remains in its forward position. As a result the lower add pawl 1313' is operative during the left half of the subtotal cycle to engage the lower register with the amount actuators and provide a subtotal of the lower register. During this subtotal cycle the second auxiliary lug slide 1341 is elevated and hence the upper register is non-added. If a total is taken with the cylinder lock in its "B" position it is seen that both of the sensing slides 1250–3 and 1250–5 will be held stationary and hence both accumulator non-added during the last half cycle.

If it is desired to change the program of the machine to one in which it is impossible to clear out the lower register by a total operation with the cylinder lock in its "B" position it is merely necessary to remove the lug 1250A on the lower register non-add sensing slide in the total bail position and to add a second vertical lug 1340A on the auxiliary lug slide 1340 in the total bail position. Subtotals will then result from operation of either the total or subtotal key with the lock in "B" position.

The present embodiment of the machine is programmed in a manner such that the totals or amounts do not transfer from one register to the other but it should be noted from FIG. 37 that if it is desired to cause a transfer of amounts from one register to the other during a totaling of one register it is merely necessary to omit the lug on the appropriate non-add slide 1250–3 or 1250–5 in the total or subtotal bail positions. That is, if it is desired to transfer the amount from the upper register into the lower register when a subtotal is taken from the upper register it is merely necessary to remove the lug 1340A on the auxiliary lug slide 1340 in the subtotal bail position. If this is done the lower register will not be non-added during a subtotal of the upper register and therefore the amount in the upper register will be entered during the last half cycle of the subtotal operation into the lower register.

D. *Subtraction*

Figure 33:
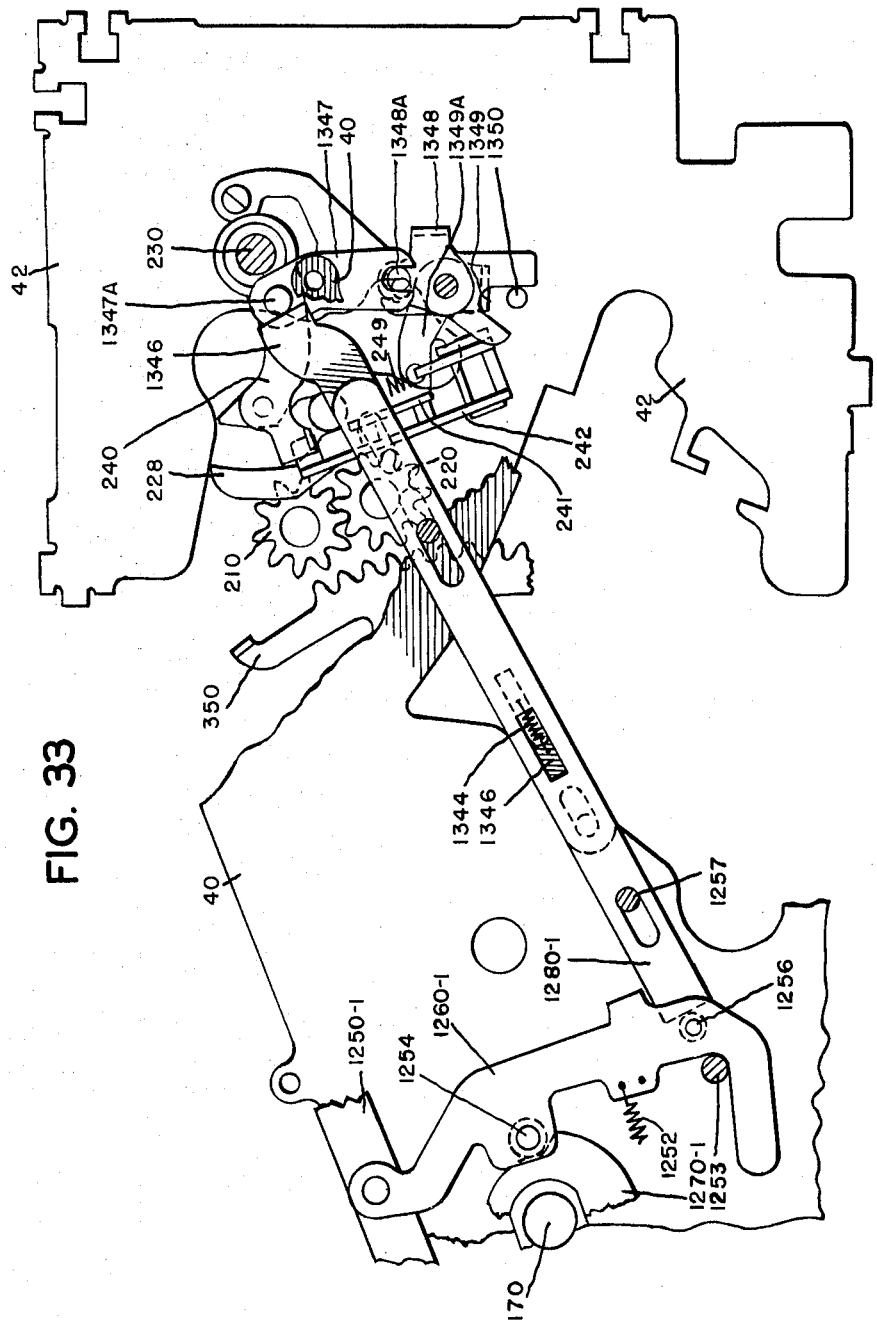
FIG. 33 is a right elevation of the operation control mechanism for controlling subtract operations in the upper register.

The function sensing slides 1250–1 and 1250–2 control the cross-sliding (as shown in detail in Serial No. 831,737) of the upper and lower accumulator pinions, respectively, for subtract operations and are each yieldingly driven rearward during each machine cycle in the same manner as are each of the other function sensing slides disposed beneath the operation control bails. If the subtract sensing slide is provided with a lug then the depression of a control bail into the path of said lug will hold the slide against rearward movement and cause a subtract operation through the mechanism illustrated in FIG. 33 for the upper or "A" register. Referring now to FIG. 33 it will be seen that the function control silde 1280–1 for the upper register has a stiff spring 1344 connected to the rear edge of a slot therein with said spring being further connected to an auxiliary slide 1346 which is carried by stud and slot connections on the left side of the subtract control slide 1280–1. The spring 1344 provides a yielding connection between slide 1280–1 and slide 1346 to accommodate any overthrow of the power yoke 1260–1 for purposes which will appear presently. The rear end of slide 1346 is engageable with a rightwardly extending stud 1347A on a level 1347 pinned to the right side of frame 40 and having a forked lower end which is engaged with a rightwardly extending stud 1348A on a bellcrank 1348 supported on the right side of the accumulator frame 42. The left vertical arm of bellcrank 1348 is in turn forked and is engaged with a rightwardly extending stud on a second bellcrank 1349 pivoted to the left side of frame 42 and having a forwardly extending arm 1349A which overlies the right portion of the control arm 242 (seen in FIGS. 9, 10, 11 of Serial No. 831,737) which carries the element 241 for controlling the shifting of the pinions in the upper register. The spring 249 normally maintains control arm 242 counterclockwise to cause the pinions 210 to be to the left and the pinions 220 to the right for addition operations.

When an operation control key is depressed which is to initiate a subtract operation the control bail associated therewith is positioned in the path of a lug 1250A on the sensing slide 1250–1 and as a result the power-driven function control slide 1280–1 is driven rearwardly at the beginning of the machine cycle and through the heavy spring 1344 the auxiliary slide 1346 is driven rearwardly to rock lever 1347 clockwise, bellcrank 1348 counterclockwise, bellcrank 1349 counterclockwise and hence the control arm 242 clockwise to position the element 241 to the right of the power shifting arm 240. Then, as the arm 240 moves counterclockwise it will shift the pinions 210 to the right and pinions 220 to the left for a subtract operation. The bellcrank 1348 is forked at its lower end to encompass a stud 1350 extending to the right from frame 42 and hence the amount of rotation of the lever 1347 and bellcrank 1348 is limited by stud 1350. The cam 1270–1 is provided with the usual high spots to insure sufficient rearward drive of the subtract control slide 1280–1 and therefore to prevent any damage which might occur as a result of an overdrive of the subtract shifting mechanism the yielding connection between the spring 1344 and auxiliary slide 1346 is provided. In this way the slide 1280–1 can be overdriven and the pinions shifted very early in the machine cycle. It is, of course, obvious that the cam 1270–1 and power yoke 1260–1 could easily be adapted to provide the exact amount of throw on the slide 1280–1 and hence remove the need for the auxiliary slide 1346.

Figure 34:
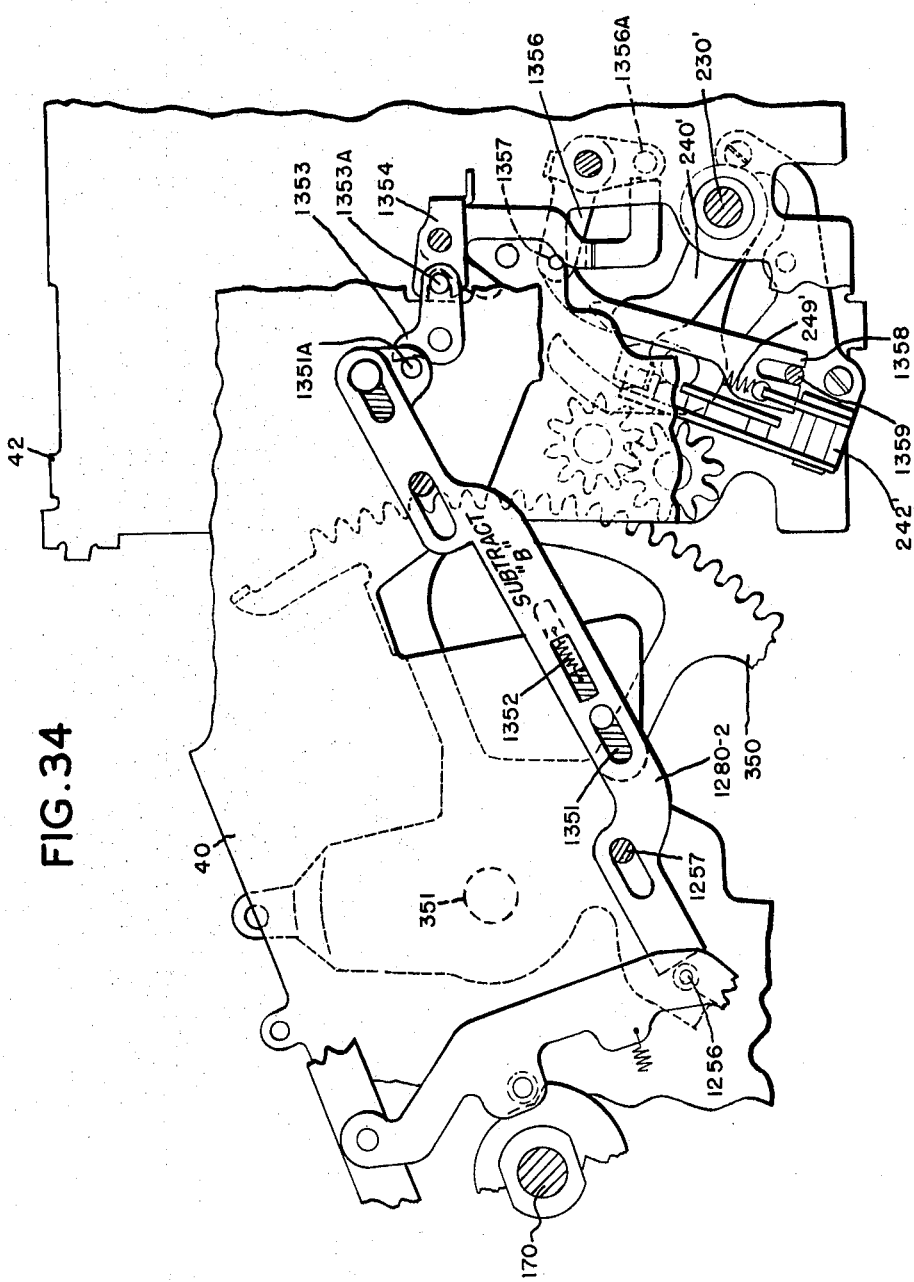
FIG. 34 is a right elevation of the operation control mechanism for controlling subtract operations in the lower register.

In a similar manner the function sensing slide 1250–2 controls the function control slide 1280–2 for the lower register. As seen in FIG. 34 the function control slide 1280–2 for the lower register carries a second auxiliary slide 1351 by means of the spring 1352 and appropriate stud and slot connections between the two slides and hence when the function control slide 1280–2 is driven rearwardly in response to the sensing slide 1250–2 being held stationary during a machine cycle the leftwardly extending stud 1351A carried at the rear end of slide 1351 engages the upper arm on a lever 1353 pivoted on the right side of frame 40 to rock lever 1353 clockwise. Said lever 1353 carries a stud 1353A which extends to the left through an opening in frame 40 and is engaged in the forked end of a bellcrank 1354 pivoted on the right side of frame 42 and which is bent to the left at its lower end to pass through an opening in frame 42 where its lower rear edge is engageable with the leftwardly extending stud 1356A on bellcrank 1356 which is pinned at 1357 to a lever 1358 guided at its lower end by means of a stud 1359 extending to the left from frame 40 to engage the lower forked end of lever 1358. The lower and forward surface of lever 1358 overlies the rightwardly extending portion of the lower control arm 242' and in a manner analogous to that described for the upper register the control arm 242' is rocked clockwise for a subtract operation. That is, the rearward travel of function control slide 1280–2 carries auxiliary slide 1351 rearward to rock lever 1353 clockwise, bellcrank 1354 counterclockwise, bellcrank 1356 counterclockwise, lever 1358 downward, and control arm 242' clockwise to cause cross-sliding of the lower accumulator pinions. Following each machine cycle the springs 249 and 249' return the control arms 242 and 242' to their counterclockwise home positions to cause the machine to be in a condition for an add operation in each of the registers during the next machine cycle.

The above-described function sensing and function control slides thus provides a system in which a subtract operation will be performed whenever an operation control bail is depressed which lies in the path of an upstanding lug on the respective function sensing slides 1250–1 and/or 1250–2. Thus a versatile control of the subtract functions for the registers is provided.

E. *Ribbon lift*

Figure 25:
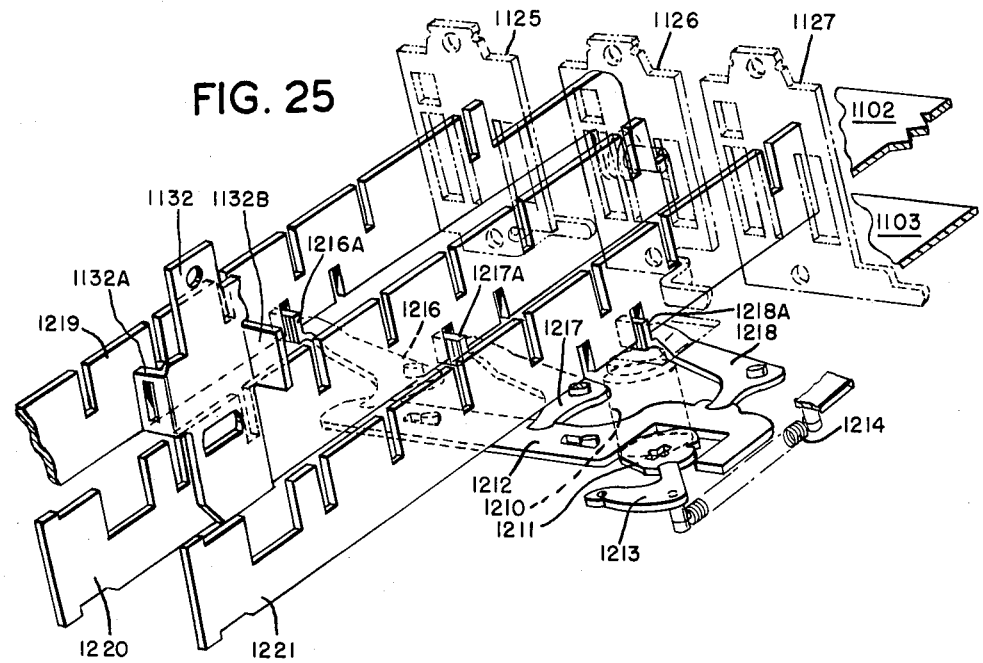
FIG. 25 is a perspective view of the three slides beneath the operation control keys which are controlled by one of the two cylinder locks seen in FIG. 1.
Figure 35:
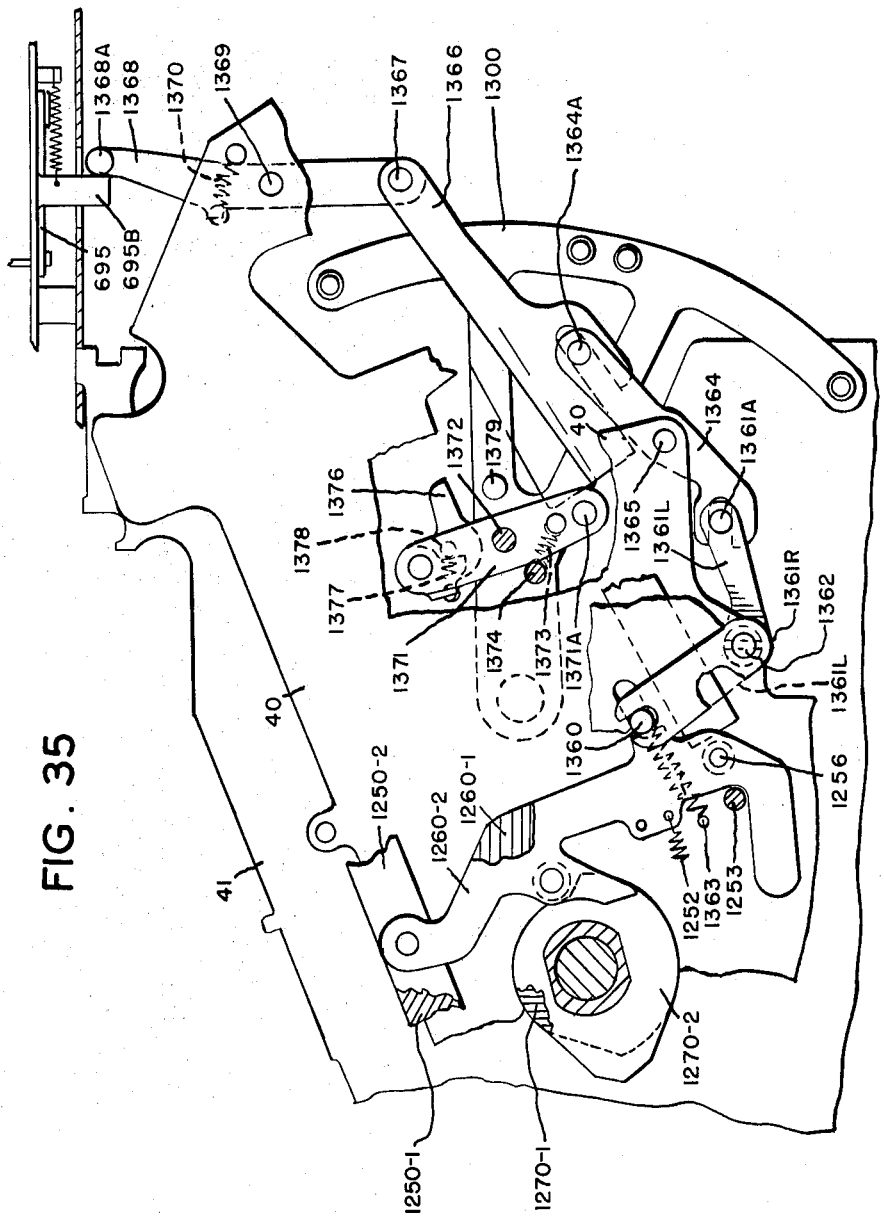
FIG. 35 is a right elevation of the control mechanism for causing energization of the ribbon lift mechanism.

As is common in the art the machine is adapted to print subtract items in red and the mechanism for actuating the ribbon lift device (seen in detail in FIGS. 25 and 27 of Serial No. 831,737) is shown in FIG. 35. The controls include the function sensing slides 1250–1 and 1250–2, power yokes 1260–1 and 1260–2, and cams 1270–1 and 1270–2 which operate in the manner as previously described. The power yokes 1260–1 and 1260–2 for the subtract operations thus also control the red ribbon feature and have abutting surfaces on their rear edges which are engageable with a cross shaft 1360 extending between the frames 39 and 40 and carried in the upper forked ends of the arms 1361R and 1361L supported on the shaft 1362 also extending between the frames 39 and 40. The arms 1361L and 1361R are urged by spring 1363 counterclockwise to maintain the shaft 1360 immediately adjacent the extensions on the rear edges of the power yokes 1260–1 and 1260–2. When the shaft 1360 is driven rearwardly the arms 1361 are moved clockwise and hence the rear extension of arm 1361L which carries a leftwardly extending stud 1361A moves downwardly to rock a lever 1364 pivoted at 1365 on the left side of frame 40 counterclockwise. Lever 1364 in turn has a leftwardly extending stud 1364A which is positioned in a slot of a link 1366 pinned at 1367 to the lower end of a lever 1368 carried at 1369 on the left side of frame 40 and urged clockwise by a spring 1370. The upper end of lever 1368 has a leftwardly extending stud 1368A which is positioned to the rear of the lug 695B on the ribbon lift bellcrank 695. As seen in FIG. 25 of Serial No. 831,737 the bellcrank 695 is pinned to the bottom of a plate and is adapted upon movement to cause the ribbon to be lifted. The rearward travel of the shaft 1360 serves to lift the forward end of link 1366 to a position shown in dashed lines in FIG. 35 where its forward edge is in the path of a rightwardly extending stud 1371A on the bellcrank 1371 pinned at 1372 to the left side of frame 40 and urged clockwise by spring 1373 against a limit stud 1374. The bellcrank 1371 carries a bypass pawl 1376 at its upper end and on the left side of said bellcrank with a spring 1377 urging the bypass pawl 1376 counterclockwise against a limit stud 1378 on the bellcrank.

The power sector 1300 has a rightwardly extending stud 1379 which engages the rear tail of the bypass pawl 1376 during each machine cycle to rock the bellcrank 1371 counterclockwise prior to the end of the first half of a machine cycle. As the power sector 1300 continues its counterclockwise movement the stud 1379 rides off the end of the bypass pawl permitting the spring 1373 to return the bellcrank 1371 to its clockwise position against the limit stud 1374 prior to the end of the first half cycle. Then as the power sector 1300 completes its counterclockwise movement and returns clockwise to its home position the stud 1379 merely rocks the bypass pawl 1376 clockwise without affecting the bellcrank 1371. As long as the link 1366 remains in its FIG. 35 position the rocking of bellcrank 1371 has no effect on the ribbon lift feature. However, when the function sensing slide 1250–1 or 1250–2 is held in its forward position by the engagement of an operation control bail with a vertical lug 1250A the power yoke 1260–1 or 1260–2 is operative to elevate the forward end of the link 1366 into the path of the stud 1371A on bellcrank 1371 and therefore the counterclockwise movement of the bellcrank 1371 drives the link 1366 rearward, lever 1368 counterclockwise, bellcrank 695 clockwise and hence as described in detail in the Bogan et al. application in connection with the red section of the ribbon is raised to printing position. Immediately following the firing of the hammers the bypass pawl 1376 falls off the stud 1379 and hence the ribbon returns rapidly to its lowered position prior to the ribbon feed operation.

In the present embodiment of the machine it is desirable only to print in red those operations involving a subtract function and therefore the subtract sensing slides 1250–1 and 1250–2 and power yokes 1260–1 and 1260–2 are used to control the ribbon lift mechanism. It is evident that a separate sensing slide, control cam, and power yoke identical to that seen in FIG. 35 can be utilized, for example in the number 10 position on the shafts 1244 and 1245 (FIG. 29), to provide a control system for the ribbon lift which is independent of subtract operations. If these additional parts are used it would of course only be necessary to provide lugs 1250A at the appropriate places to get a ribbon lift in response to operation of a selected key.

F. *Negative totals*

Figure 36:
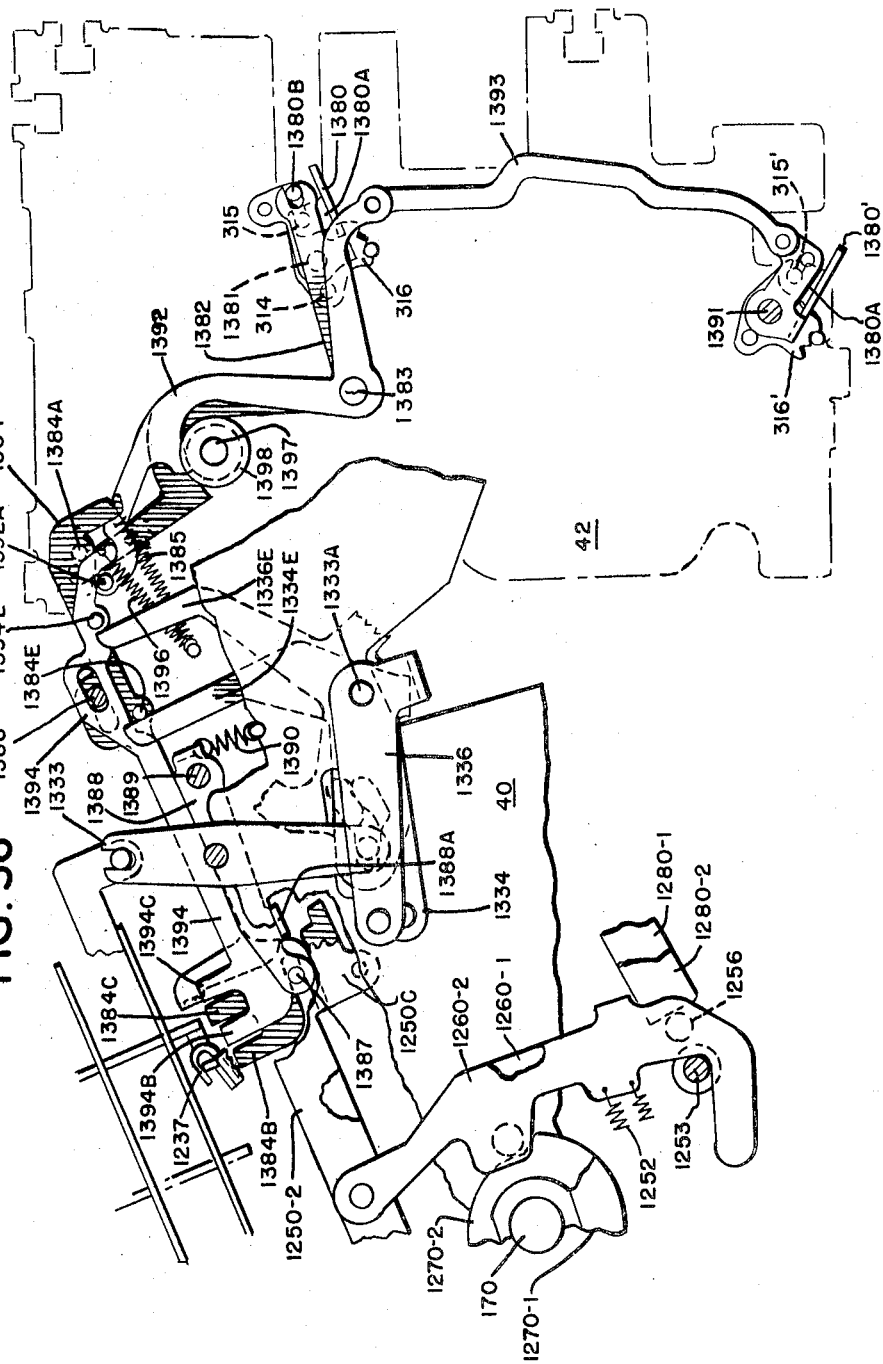
FIG. 36 is a right elevation of the linkage for providing a true negative total in response to the active register carrying a negative balance.

As is well known in the art and as described in connection with FIGS. 14 and 15 of Serial No. 831,737, the registers are adapted to carry true totals. As described therein, a control member 316 (FIG. 36 of this application) which carries the rightwardly extending stud 315 at its rear end is in its clockwise position when the accumulator contains a positive balance and in its counterclockwise position when the accumulator contains a negative balance. Therefore the position of the control member 316 is utilized to cause a cross-sliding of the accumulator pinions during a total operation in response to the accumulator containing a negative balance. As seen in FIG. 36 a lower control member 316' is illustrated in its clockwise position to show that the lower accumulator contains a positive balance while the control member 316 for the upper accumulator is in its counterclockwise position to indicate that a negative balance exists in the upper accumulator. A bellcrank 1380 pivoted at 1381 on the left side of frame 42 has a left vertical arm 1380A which is provided with a forked end and encompasses the right end of the stud 315 on control member 316 and hence the position of the bellcrank 1380 is controlled by the position of the control member 316. The bellcrank 1380 has a rightwardly extending stud 1380B which passes through an opening in frame 42 and is engaged in the forked end of a lever 1382 pivoted at 1383 on the right side of the frame 42. The upper end of lever 1382 is in front of a leftwardly extending stud 1384A on a slide 1384 carried at its rear end by a stud 1386 extending to the left from frame 40. Slide 1384 is provided with vertical lugs 1384B and 1384C at its forward end and is carried at its forward end by means of a slot in its lower forward edge which encompasses a stud 1387 carried by a bellcrank 1388 pivoted on a stud 1389 on the left side of frame 40. The bellcrank 1388 has a rightwardly extending lug 1388A which passes through the frame 40 to be engageable with each of the lower lugs 1250C on the subtract sensing slides 1250–1 and 1250–2. A spring 1390 connected to the rear edge of bellcrank 1388 serves to hold the forward end of slide 1384 upward and also to maintain bellcrank 1388 clockwise with the lug 1388A above the path of the lugs 1250C on subtract sensing slides 1250–1 and 1250–2.

When the upper register has a positive balance therein the control member 316 is clockwise and hence stud 315 holds lever 1382 clockwise. When lever 1382 is in its clockwise position it holds slide 1384 rearward in a position such that the vertical lugs 1384B and 1384C straddle the total keystem with lug 1384B to the rear of the subtotal control bail 1237 and the lug 1384C to the rear of the total keystem. Therefore the total keystem and the subtotal bail do not engage the lugs upon depression of the total or subtotal key. When the upper register carries a negative amount therein as illustrated in FIG. 36 the control member 316 is in its counterclockwise position and thus stud 315 through its control of bellcrank 1380 and lever 1382 allows spring 1385 connected to the rear end of slide 1384 to move slide 1384 forward where the lug 1384B is beneath the subtotal control bail 1237 and lug 1384C is beneath the lower end of the total keystem. Thus if the total or subtotal key is depressed the slide 1384 is rocked counterclockwise and through its stud and slot connection with the forward end of bellcrank 1388 lowers the lug 1388A on bellcrank 1388 into the path of the downwardly and rearwardly extending lugs 1250C on the subtract slides 1250–1 and 1250–2. Therefore as described in connection with the subtract machine operations the subtract sensing slides will be held stationary causing the subtract control slides to be driven rearwardly to cause cross-sliding of the pinions in the two accumulators so that the total or subtotal is taken from the subtract pinions rather than from the add pinions. This also will cause the result to be printed in red.

In a similar manner the control member 316' for the lower register through its rightwardly extending stud 315' controls a lower bellcrank 1380' pivoted at 1391 to the left side of frame 42 and connected by link 1393 to a second negative balance lever 1392 pivoted on stud 1383 adjacent the first negative balance lever 1382. Lever 1392 carries a rightwardly extending stud 1392A which lies in front of a downwardly extending end of a second negative balance slide 1394 carried by the stationary stud 1386 at its rear end and by the stud 1387 of bellcrank 1388 at its forward end. The second negative balance slide 1394 is urged by a spring 1396 to its most forward position where its vertical lugs 1394B and 1394C are positioned with respect to the total keystem and subtotal control bail in the same relationship as are the lugs on the first negative balance slide 1384. When the lower register contains a positive amount the control member 316' is in its clockwise position as seen in FIG. 36 and hence the stud 315' acting through the bellcrank 1380' and link 1393 holds lever 1392 clockwise with its stud 1392A holding the slide 1394 rearwardly where the vertical lugs 1394B and 1394C are not engageable by the total keystem or subtotal control bail. When the lower register contains a negative amount the control member 316' is moved to its counterclockwise position which would correspond to the position of the upper control member 316 as it is shown in FIG. 36 and hence the lever 1392 would be moved counterclockwise to allow spring 1396 to pull the slide 1394 forwardly and thereby bring the lugs 1394B and 1394C beneath the total keystem and subtotal control bail. With the slide 1394 in such forward position the depression of either the total or the subtotal key is effective to rock bellcrank 1388 counterclockwise to bring the lug 1388A into blocking engagement with the subtract sensing slides 1250–1 and 1250–2. Therefore the pinions of both registers would be cross-slided during the early part of the total or subtotal machine cycle and also the ribbon lift mechanism activated.

It is seen that if either of the registers contains a negative balance one or both of the slides 1384 or 1394 is allowed to move forward to cause rocking of bellcrank 1388 in response to depression of the total or subtotal key. It is, therefore, obvious that if the upper register is the register being totaled or subtotaled the control member 316' for the lower register must not be effective to control the bellcrank 1388 and similarly when the lower register is to be totaled or subtotaled the upper control member 316 must not be effective to control the position of bellcrank 1388.

As seen in FIG. 37 the cylinder lock slide 1219 when in its rearward position corresponding to the cylinder lock being in its "A-B" position serves to hold the bellcrank 1336 clockwise and the bellcrank 1334 counterclockwise while movement of the slide 1219 to its forward position reverses the positions of the two bellcranks to place the bellcrank 1334 in its clockwise position and bellcrank 1336 counterclockwise. The two bellcranks 1334 and 1336 have upwardly extending portions 1334E and 1336E respectively with the portion 1334E on bellcrank 1334 being positioned in front of a rightwardly extending stud 1384E on the first negative balance slide 1384 and the portion 1336E on bellcrank 1336 being positioned in front of a rightwardly extending stud 1394E on the second negative balance slide 1394. Thus with the cylinder lock in its "A-B" position the bellcrank 1336 through its upwardly extending portion 1336E serves to hold the negative balance slide 1394 in its rearmost position in a manner such that the control member 316' for the lower register is not effective to control the position of the negative balance slide 1394. With the cylinder lock in the "A-B" position the bellcrank 1334 is held counterclockwise in a position such that the end of lever 1382 through its engagement with the stud 1384A on the slide 1384 controls the position of the slide 1384. Therefore if a total or a subtotal is taken with the cylinder lock in the "A-B" position the control member 316 will be effective to determine which of the pinions in the upper accumulator will be engaged with the amount actuators 350.

Figure 38:
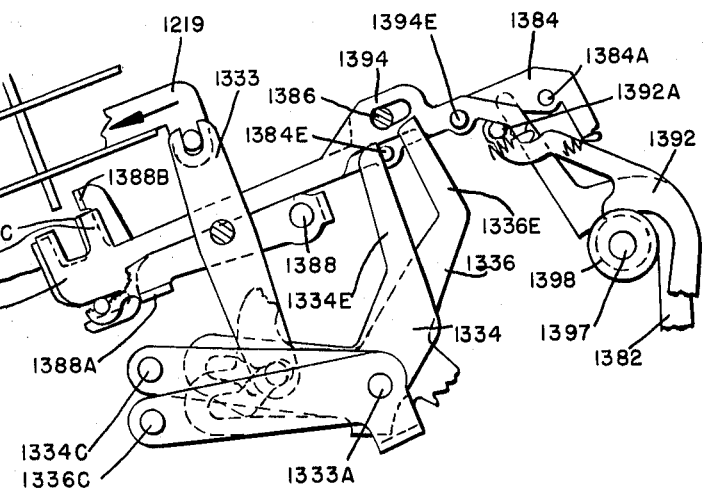
FIG. 38 is a right elevation of the parts shown in perspective of FIG. 37 but moved to a position in which the lower register is active.

When the cylinder lock is rotated to its "B" position the upper portion 1334E on bellcrank 1334 moves rearward to hold slide 1384 rearward and disable the control of slide 1384 from the control member 316 of the upper register. That is, even if the upper register contains a negative balance to thereby rock lever 1382 counterclockwise the spring 1385 will be unable to move the slide 1384 forward due to the engagement of the bellcrank 1334 with the stud 1384E. With the cylinder lock in said "B" position the bellcrank 1336 is held counterclockwise with the upper portion 1336E positioned away from the stud 1394E on the negative balance slide 1394 for the lower register and accordingly the slide 1394 is controlled by the control member 316' in the lower register. As seen in FIG. 38 where the parts are shown with slide 1219 forward, the levers 1382 and 1392 pass over a stud 1397 extending to the right from the frame 42 with the levers being engaged in annular grooves in a hub 1398 on the stud 1397 to thereby provide an arrangement in which the levers 1382 and 1392 are guided during their clockwise and counterclockwise movement in response to the positioning of the negative balance control members 316 and 316'.

It is thus seen that if a total or subtotal is taken from the upper register when said register contains a negative balance the subtract sensing slides 1250–1 and 1250–2 will be held stationary and hence both sets of pinions in the registers cross-slided as in a subtract operation. However, with the cylinder lock in the "A-B" position the total pawl for the lower register is held inactive as is the add pawl and hence the upper register is totaled. With the cylinder lock in "B" position the upper register is non-added and the total pawl for the upper register is disabled in the manner previously described and hence the lower register is totaled or subtotaled, the algebraic sign of such total or subtotal being determined by the position of the lower negative balance control member 316'. The fact that both of the registers have their pinions cross-slided when either of the two registers contains a negative balance and a total taken does not affect the inactive register since as previously described the control elements for the two registers are returned to their counterclockwise positions at the end of each machine cycle and hence on a subsequent machine cycle if the subtract function sensing slides are not held stationary for the indexing of a further subtract operation the pinions will be returned to their normal positions in preparation of an add operation. Since the holding of the subtract function sensing slides in their forward positions during a machine cycle causes a ribbon lift for printing in red it is seen that when a total or subtotal operation is performed with the active register containing a negative balance that the amount will be printed in red.

G. Symbol printing

The #14 order in the printing section is adapted to print the symbols which are shown on the rear surface of the print bar 400–14 in FIG. 43 (on the same sheet as FIG. 27) corresponding to the symbols representing the operation control keys in the #14, #15 and #16 orders. The #14 order print bar 400–14 is controlled by an amount actuator having a geared section thereon so that the print bar will be brought to accurate alignment by the aligning bail although the gear teeth on the #14 order actuator 350 do not engage the accumulator pinions. As set forth in detail in Serial No. 831,737 and as is well known in the art, the actuators 350 are driven counter-clockwise and then clockwise during the machine cycle by the cams 360 and 362 (FIG. 53) on the driveshaft 170. Since the machine is capable of providing totals and subtotals from two independent registers the #15 printing order is provided with a print bar 400-15 having the letters "A" and "B" on the rear surface thereof as seen in FIG. 43 with the #15 order print bar 400-15 being disposed immediately to the right of the #14 symbol print bar 400-14.

The present embodiment of the machine is so programmed that multiple listings during a single transaction are entered into both registers by the use of the item key. The lower register, however, is totaled only by the manager or other authorized personnel at the end of the day and therefore the lower register contains a running total of the day's business. In many applications of a machine such as that disclosed herein the operations performed include the entry of a single item such as, for example, the sale of a single item where there is no tax applicable. In such case it is seen that it is a waste of time to enter the amount on one machine cycle and then perform a total operation on the next. Accordingly, the present machine as illustrated herein is so programmed that single item entries are performed by the use of the sale key which is operative to non-add the upper register and enter the amount only in the lower register. In this way it is unnecessary to first enter the amounts into the upper register which serves as a cross-footer and then take a total for the validation of a customer's receipt. Since the sale key enters amounts directly into the lower "B" register it is desirable to print only the "B" symbol in the #15 print order without any additional symbol being printed in the #14 print order. Likewise the multiple item key serves merely as a motor bar for the entry of amounts and hence there is no symbol associated with the multiple item key on the #14 order symbol printing bar.

The print bar 400-14 in the #14 print order is provided with symbols thereon which are arranged in an order which is different from the order of the operation control keys on the keyboard and therefore the index strip 1400 for the #14 print order as seen in FIGS. 39 and 41 is provided with vertical lugs which are positioned on the strip in a manner different from that in which the vertical lugs are the numerical index strips 353 are positioned. The lugs are engageable with the bottoms of the keystems which are illustrated in FIG. 40 in their positions as seen if the keystems were placed in a horizontal plane with the bottoms of the keystems toward the rear of the machine. To facilitate the understanding of the relationship of the lugs on the index strip 1400 with respect to the symbol on the print bar controlled thereby the position of each symbol on the print bar 400-14 is numbered in FIG. 43 in accordance with the number of units of vertical displacement of the bar beyond the cipher position required to bring the symbol to printing position. The lugs on the index strip 1400 are numbered in a similar manner to show which lug controls a given symbol. For example, lug 1400-1 controls the symbol in the number one position on the print bar. Although in the present embodiment the specific printing apparatus is not part of the invention, sufficient details thereof are included to illustrate the manner in which the various symbols are printed.

The error key is previously described is not a "live" key and therefore does not control the forward movement of the index strip. The sale correction keystem is engageable with the most forward lug 1400-1 on the index strip for limiting the forward movement of index strip 1400 to cause printing of the correction symbol "COR" when the sale correction key is depressed, and in a similar manner the return keystem is contacted by the lug 1400-2 on the index strip to cause printing of a return allowance symbol "R/A" when the return operation control key is depressed. The miscellaneous disbursement keystem engages the lug 1400-6 on the index strip 1400 which is positioned to the rear of the miscellaneous receipts key and therefore the miscellaneous receipts keystem as seen in FIG. 40 is shortened on its left side to allow the lug 1400-6 to pass along the left side thereof to engage the miscellaneous disbursement keystem. The lug 1400-7 is disposed to the rear of the no sale keystem and is engageable with the miscellaneous receipts keystem by being allowed to pass through a rectangular cut in the lower left surface of the no sale keystem. The lower left edge of the no sale keystem is engageable with the 1400-9 lug on the index strip which passes to the left of the tax keystem. The 1400-8 lug engages the keystem of the tax key and as seen in FIG. 39 the 1400-8 lug is positioned to the rear of the total keystem. Thus the lower left corner of the total keystem is cut away to allow passage of the 1400-8 lug. The total keystem itself when depressed engages the 1400-4 lug on the index strip, which is the most rearward lug on the strip, to cause printing of the total symbol in the number 4 position on the print bar. The next to the rearmost upstanding lug 1400-5 is bent laterally to the left and is engageable with the subtotal operation control bail 1237 upon depression of the subtotal key, said subtotal bail 1237 being provided with a leftwardly extending arm 1237A welded to the top of the bail 1237 and having a downwardly extending portion on its left end to engage the 1400-5 lug.

The multiple item key does not cause the printing of a symbol and therefore the multiple item control bail is provided with an extension 1239A seen in the top view of FIG. 39 to be adaptable upon depression of the multiple item key with the rearmost lug 1400-4 on the index strip to hold the index strip against forward movement and hence prevent printing of a symbol. The number 3 position on the symbol print bar 400-14 as seen in FIG. 43 is provided with a credit balance symbol and is to be printed when the register providing a total or subtotal contains a negative balance. As described in connection with the credit balance mechanism seen in FIG. 36 bellcrank 1388 is rocked counterclockwise by the total or subtotal key when a credit balance occurs in the active register to bring a rightwardly extending lug 1388A into engagement with the subtract sensing slides. Upon such counterclockwise movement of bellcrank 1388 in response to depression of a total or subtotal key when a credit balance exists in the active register, a leftwardly extending lug 1388B (FIG. 39) on an upstanding arm of the bellcrank 1388 is lowered to engage lug 1400-4 on the index strip after the lug has moved 3 units forward to cause printing of the negative balance symbol seen in the number 3 position of the print bar in FIG. 43.

The #15 order in the printing section prints either an "A" or a "B" during total and subtotal operations and is controlled by an index strip 1401 seen in FIG. 42 which has vertical lugs thereon immediately adjacent each of the operation control keys in the #14 keyboard order except the total key and adjacent the item bail. The lugs are so positioned that upon depression of the item key or any operation control key in the #14 order except the total key the index strip 1401 is held stationary and therefore there is no printing in the #15 print order. When the total or subtotal key is depressed the end of the slot in the front end of index strip 1401 engages the stationary guide plate 1405 after the index strip has moved forward by a distance corresponding to three units of upward travel beyond zero position of the print bar thereby causing the symbol "A" to be printed. This occurs throughout the day as the machine is utilized with the cylinder lock 1210 in the "A-B" position. At the end of the day or at any other time that the manager desires a total or subtotal of the lower register the key is inserted in the cylinder lock 1210 and turned to "B" position causing the previously described bellcrank 1336 (FIG. 37) to be rocked counterclockwise. The bellcrank 1336 has an upstanding arm 1336D with a forked end which is engaged with a rightwardly extending stud 1402A (FIG. 42) of a bellcrank 1402 pivoted on the left side of frame 40 on stud 1389 and carrying a leftwardly extending lug 1402B. Upon counterclockwise rotation of the bellcrank 1336 bellcrank 1402 is rocked clockwise to place lug 1402B in front of a downwardly extending lug 1401–1 on the index strip 1401, thereby limiting the forward travel of the index strip 1401 and causing indexing of the print bar 400–15 to the number 1 position corresponding to the "B" symbol. Therefore a "B" will be printed whenever a total or subtotal is taken from the "B" register.

The sale key is operative to enter amounts directly in the lower register and thus the depression of the sale key causes printing of the symbol "B" in the #15 printing order and causes a nonprint in the #14 order. This control of the #14 and #15 print orders is provided through a leftwardly extending stud 1420A (FIG. 42) extending to the left through the frame 40 to engage the rear forked end of a bellcrank 1423 pivoted on frame 41 and having a leftwardly extending lug 1423A which upon upward movement in response to depression of the sale key is positioned in front of a lower section of the index strip 1401 by an appropriate distance to limit the travel thereof and cause printing of the "B" symbol in the #15 order and to be positioned immediately in front of the index strip 1400 to prevent movement of the index strip in the #14 order. It is therefore seen that the sale bar is operative to cause selected machine functions in accordance with the program of lugs 1250B on the function sensing slides which are engageable with the control bail 1422 and also to control the printing of symbols in print orders #14 and #15.

As described in detail in the Bogan et al. application Serial No. 831,737 the machine is provided with a rotary date and connective numbering apparatus as well as an apparatus for selectively causing "split-printing." Therefore as seen in FIGS. 29 and 50, 51A and 51B, the function sensing slides 1250–6 and 1250–8 as well as the associated cams and control slides (for example slide 1280–6) are provided for controlling such operations. In a similar manner the sensing slides 1250–11 and 1250–19 are provided for the cash drawer and non-punch controls. Since these controls perform in a manner substantially the same as do those described above, further details are not included herein, reference to Serial No. 831,737 being made for such details.

H. *Enforced key depression*

Figure 45:
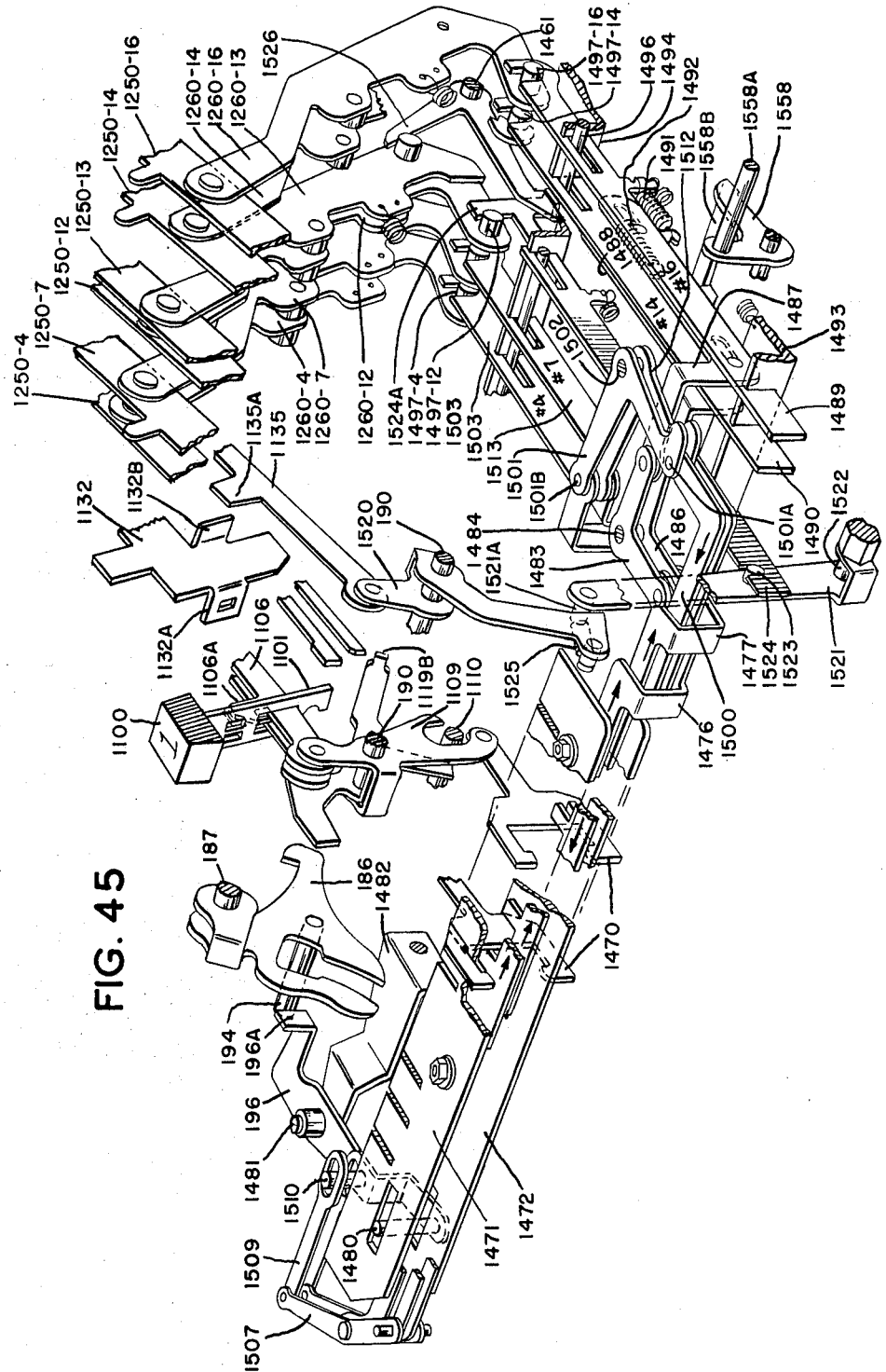
FIG. 45 is a perspective view illustrating the manner in which the right ends of the enforced key depression slides are controlled by the operation control mechanism.

The machine is provided with a feature whereby a machine cycle is prevented unless the operator has depressed keys in each of the preselected column in the amount entering section and therefore there is an assurance that the desired information for each transaction will be entered on the keyboard. As previously described there is a lockdown slide 1106 associated with each row of amount keys which is moved to its extreme forward position during each machine cycle only if there has been no key depressed in the associated column. If there has been a key depressed the lug 1106A through its engagement with the depressed keystem serves to limit the forward travel of the slide 1106. Thus the yokes 1109 associated with the slides 1106 are allowed to move to their extreme counterclockwise positions as the cross bail shaft 1110 moves rearwardly only if the associated slide is allowed to move to its extreme forward position. If a key has been depressed in a given column the yoke 1109 associated therewith will be held in its clockwise position. As seen in FIGS. 44, 45 and 9 each of the yokes 1109 has a forked latch 1470 pinned to the lower forward end thereof with the latches 1470 being engaged in the slots provided in the guide plates 1471 and 1472 seen in FIGS. 44 and 45 which are supported by brackets on the front of the frame 38. From the above-described movement of the yokes 1109 it is seen that the latches 1470 are moved rearwardly during each machine cycle if there has not been a key depressed in the column associated with the latch but are held forward if there has been a key depressed in the associated column. It is these latches 1470 which serve to control a pair of clutch control slides 1476 and 1477 slidably supported between the plates 1471 and 1472 on the bolts 1478 and 1479 which hold the plates 1471 and 1472 in fixed positions. The plates 1471 and 1472 are themselves secured by brackets to the front frame 38. The slides are provided with rearwardly extending lugs 1476A and 1477A, respectively (FIGS. 46 and 47), and are each provided with a slot in their left ends which encompass a stud 1480 carried on the forward end of the clutch control bar or lever 196 pivoted at 1481 to a bracket 1482 extending to the left from the frame 43. The right ends of slides 1476 and 1477 are forked with the forked end of slide 1476 being engaged with a downwardly extending stud on a bellcrank 1483 pivoted on a shaft 1484 (FIG. 45) carried by a bracket between the frames 39 and 40, and the forked end of slide 1477 being engaged with a downwardly extending stud in the forward arm of a bellcrank 1486 pivoted on the shaft 1484. Bellcranks 1483 and 1486 each have rightwardly extending arms which carry downwardly extending studs which are engaged in the forked ends of two slides 1487 and 1488 carried by stud and slot connections on a pair of slides 1489 and 1490, respectively. The slides 1487 and 1488 are urged rearwardly by means of springs 1491 and 1492 which interconnect downwardly extending lugs on the slides 1489 and 1487, and the lugs on slides 1488 and 1490. The slides 1490 and 1489 are carried on the combs 1493 and 1494 extending between the frames 39 and 40 with a pair of springs serving to pull the slides 1490 and 1489 to their forward positions. Each of the slides 1489 and 1490 has a slot in its rear portion which encompasses a cross shaft 1496 entending between the frames 39 and 40 to thereby hold the slides in their positions in the machine. The rear ends of slides 1489 and 1490 are provided with vertical slots which are engaged with rightwardly extending studs 1497–14 and 1497–16 carried on the lower forward ends of the power yokes 1260–14 and 1260–16. This connection of slides 1489 and 1490 with the power yokes causes the slides 1489 and 1490 to be controlled in a manner substantially the same as that in which the previously described function control slides are controlled. That is, there is a function sensing slide 1250–14 and 1250–16, power yoke 1260–14 and 1260–16, and cam 1270–14 and 1270–16 for controlling the slides 1489 and 1490.

The lugs 1476A and 1477A on the clutch control slides 1476 and 1477 are normally positioned to the left of the vertical surfaces on selected latches 1470 with the stud 1480 in the lever 196 being positioned in the left end of the slots provided in the slides 1476 and 1477. If the function sensing slide 1250–14 is held stationary during a machine cycle through the engagement of a lug 1250A or 1250B with an operation control bail the lower end of the power yoke 1260–14 will be moved rearwardly, slide 1490 will be pulled rearwardly, slide 1488 will be pulled rearwardly, bellcrank 1486 will be rocked counterclockwise, and slide 1477 will be pulled to the right to thereby move the lever 196 counterclockwise bringing the vertical lug 196A into engagement with the stud 194 on the latch 186 to thereby disengage the motor-driven shaft from the main machine shaft and prevent normal machine cycles. That is, the latch 186 will be rocked counterclockwise into the path of the lug 188 on the power hook 169 to thereby disconnect the power hook 169 from the power-driven sleeve 167. This would be the result obtained if the slide 1477 were allowed to move to the right. However, if the latch 1470 adjacent one of the rearwardly extending lugs 1477A is maintained in its forward position in response to the depression of a key in the associated numerical column then the latch 1470 will be effective to hold the slide 1477 against any rightward movement and therefore the main machine clutch will not be disengaged. When the slide 1477 is thus held against rightward movement the spring 1492 which interconnects the slides 1488 and 1490 is merely stretched allowing the slide 1490 to move rearward under the power of yoke 1260–14 while slide 1488 remains stationary. Near the end of the machine cycle the power yoke 1260–14 returns to its home position and therefore the rightward urged on the slide 1477 is removed to prevent any bind between the lugs 1477A and the links 1470. It is thus seen that by selecting the positions of the lugs 1477A on the slide 1477 that a machine cycle will be prevented unless a key has been depressed in one of the numerical columns corresponding to the position of a lug 1477A. As illustrated in FIG. 47 the present machine is so programmed that there must be a key depressed in at least one of the keyboard orders #8–#13 when the slide 1477 is pulled to the right or a machine cycle will not take place. The rightward movement of the slide 1477 is controlled in accordance with the location of the vertical lugs 1250A or 1250B on the function sensing slide 1250–14 in the same manner as are the previously described functions controlled by the function sensing slides.

The operation of the slide 1476 to cause a disengagement of the motor drive from the main shaft unless there has been a key depressed in selected columns is identical to that of the slide 1477 but of course the slide 1476 is controlled by the function sensing slide 1250–16. As seen in FIG. 46 the slide 1476 is provided with rearwardly extending lugs 1476A in the #1–#4 orders and therefore if the slide 1476 is pulled to the right as a result of the function sensing slide 1250–16 being held stationary during a machine cycle a clutch disengagement will occur unless there has been a key depressed in at least one of the #1–#4 keyboard orders. It is obvious that the programming for enforcing the depression of keys in selected columns can be varied merely by the arrangement of the lugs on the slides 1476 and 1477, and also that additional slides and controls therefore could be used. The program for controlling which of the operation control keys will be effective to pull the slides 1476 and 1477 to the right during a machine cycle is of course established through the lugs 1250A and 1250B on the function sensing slides 1250–14 and 1250–16 in the same manner as the program for the previously mentioned machine functions, such programming being described more thoroughly in connection with the description of the program for which the present embodiment of the machine is established. It is thus seen that an extremely versatile system is provided for preventing a machine cycle unless the operator has depressed a key in selected columns on the keyboard prior to depression of an operation control key.

The machine will not of course produce a correct total or subtotal if the total or subtotal operation is performed with a numerical key depressed and therefore means must be provided to prevent a machine operation in response to depression of the total or subtotal key when there is a key depressed in the numerical orders #1–#7. Therefore a slide 1500 is disposed between the plates 1471 and 1472 for controlling machine cycling in response to depression of the total and subtotal keys in the following manner. Slide 1500 has a rearwardly extending portion at its right end which is forked and is engaged with a downwardly extending stud 1501A (FIG. 45) on a bellcrank 1501 pivoted on a stud 1502 supported by brackets between the frames 39 and 40 with the left arm of bellcrank 1501 carrying a second downwardly extending stud 1501B which is engaged in the forked arm of slide 1503 carried by the combs 1493 and 1494 and the shaft 1496. The rear end of slide 1503 is forked and is engaged with the rightwardly extending stud 1497–4 on the previously described power yoke 1260–4 which controls the function control slide 1280–4.

Slide 1500 is disposed beneath a slide 1504 (FIG. 48) which is carried by the bolts 1478 and 1479 between the plates 1471 and 1472 with a spring 1506 serving to interconnect slides 1500 and 1504 in a manner such that movement of the slide 1500 tends to cause movement of the slides 1504. The slides 1500 and 1504 each have an enlarged slot in their left end which encompass the stud 1480 on the lever 196 with the said slots being sufficiently elongated to prevent engagement of either of the two slides 1500 and 1504 therewith when they are moved from their extreme left to their extreme right positions as limited by bolts 1478 and 1479. As seen in FIG. 45 the bellcrank 1501 is rocked clockwise when the slide 1503 is pulled rearward by the power yoke 1260–4 and hence such clockwise movement of the bellcrank 1501 drives the slide 1500 to the left. The slide 1500 carries an arm 1507 which is pinned to the left end of said slide and also pinned at 1508 to a rearward extension on the left end of slide 1504. Arm 1507 in turn carries a link 1509 having an opening 1509A in its right end which encompasses a second vertical stud 1510 on the lever 196. As seen in FIG. 48 slide 1504 is provided with a plurality of rearwardly extending lugs 1504A which are normally positioned to the right of the latches 1470 carried by yokes 1109.

As seen in FIG. 51 the function sensing slide 1250–4 has vertical lugs 1250A engageable with the total and subtotal bails and therefore depression of the total or the subtotal key holds the slide 1250–4 stationary to cause power yoke 1260–4 to be pivoted counterclockwise and pull slide 1503 rearward. As a result the bellcrank 1501 moves clockwise and slide 1500 is driven to the left. As seen in FIG. 48 if slide 1504 is held against leftward movement as a result of a key having been depressed to hold a latch 1470 in its forward position the leftward movement of slide 1500 will cause lever 1507 to rotate clockwise about the pivot point 1508 and hence through the rightward movement of link 1509 rock the clutch control lever 196 counterclockwise and prevent a cycle of main shaft 170. If there has been no key depressed in the orders #1–#13 all of the latches 1470 move rearward at the beginning of a machine cycle prior to the leftward urge of slide 1504 and therefore as the slide 1500 is driven to the left the slide 1504 is also pulled leftward by the spring coupling of spring 1506. Hence the pivot point 1508 for the lever 1507 moves to the left with the slides 1500 and 1504 and therefore lever 1507 is translated leftwardly without undergoing clockwise rotation. Link 1509 is thus pulled to the left instead of to the right and does not affect lever 196. It is thus seen that if there is a numerical key depressed when either the total or subtotal key is operated that lever 196 will move counterclockwise to prevent a machine cycle whereas if there is no numerical key depressed the machine will be allowed to complete its cycle. In the present embodiment of the machine the accumulators are adapted to provide a seven-digit total and hence the lugs 1504A to the left of the #7 order on the slide 1504 could be removed in the event that the machine owner should desire to print additional information in orders #8–#13 during the total or the subtotal operations.

When the no sale key is operated it is important that there be no numerical key depressed and therefore the machine is provided with a slide 1511 identical to slide 1500 but coupled at its right end by means of a stud and slot connection with the forward arm of bellcrank 1512 (FIG. 45) pivoted on the stud 1502 and coupled by means of a stud and slot connection with the bent-over portion at the forward end of a slide 1513. Slide 1513 is carried by the combs 1493 and 1494 and shaft 1496 in the same manner as slide 1503 and is coupled at its rear end with the rightwardly extending stud 1497-7 on the power yoke 1260-7. The sensing slide 1250-7 which determines the movement of the power yoke 1260-7 is provided with a vertical lug 1250A in the no sale bail position and therefore when the no sale key is depressed the function sensing slide 1250-7 is held stationary and the power yoke 1260-7 is driven counterclockwise to pull slide 1513 rearwardly and drive slide 1511 to the left.

Slide 1511 is coupled by a spring 1516 (FIG. 49) with a slide 1514 disposed between the plates 1471 and 1472 in the same manner as the slide 1504 is coupled with the slide 1500. Slide 1511 also carries a lever 1517 at its left end which is pivoted on a downwardly extending stud 1518 carried by the left end of slide 1514 with the rear end of lever 1517 controlling a link 1519 identical to the link 1509 and similarly encompassing the stud 1510 on the lever 196. Thus when the no sale key is depressed the slide 1511 is driven to the left and therefore since the rearwardly extending lugs 1514A on the slide 1514 are normally disposed to the right of the latches 1470 in the same manner as are the lugs on slide 1504 a machine cycle will be prevented if there is any numerical key depressed. It is to be noted that although the sensing slide 1250-7 has only one vertical lug 1250A which is in the no sale position, additional lugs could be provided to prevent a machine cycle in response to the depression of any selected operation control key when there were amount keys depressed.

Various other combinations of slides similar to those illustrated in FIGS. 46–48 for controlling the enforced depression of numerical keys could be included in the machine to provide a number of programs. It has been found to be advantageous to provide the slides 1476, 1477, 1504 and 1514 with a full complement of rearwardly extending lugs and then selectively remove the necessary lugs for the desired program. Additional slides and controls could of course be included to increase the number of individually controlled groups, and also the lugs on the slides could be made in a manner such that they could be removed and replaced on the slides to increase the ease of changing programs of enforced key depression.

It should be noted that the cam 1270-4 which drives the total function control slide 1280-4 and the total function sensing slide 1250-4 is provided with two steps thereon. The reason for this is that the rearward movement of the lower end of the power yoke 1270-4 must be delayed to provide enough time for the latches 1470 to move rearward before the power is applied for driving the slides to the left. The rise on the cam 1270-7 for the enforced key depression slide 1511 is also disposed counterclockwise from the rise on the other cams to allow for movement of the latches 1470 prior to leftward movement of the slide 1511.

I. *Sale key interlock*

The sale key is used only for entering single items as for example when the complete transaction consists only of the sale of a single item which does not include any tax or further entry on the keyboard. In such case the machine is programmed to enter the amount directly in the lower register, print the amount of the customer's receipt and also activate the rotary printing cylinders to print a clerk or store number, transaction number, and date in the same manner as if a total were taken from the "A" register. In this way the extra step which would be involved if the single entry had to first entered in the upper register and then totaled is eliminated. Therefore it is seen that means must be provided to prevent the operator from depressing the sale key in a transaction where previous amounts have been entered in the upper and lower registers through the use of the multiple item operation control key. If the sale key were depressed after other amounts had been entered through the use of the other operation control keys the total derived at the end of the operation from the upper register would be minus the amount entered with the sale key since the sale key enters amounts only in the lower register.

Figure 51B:
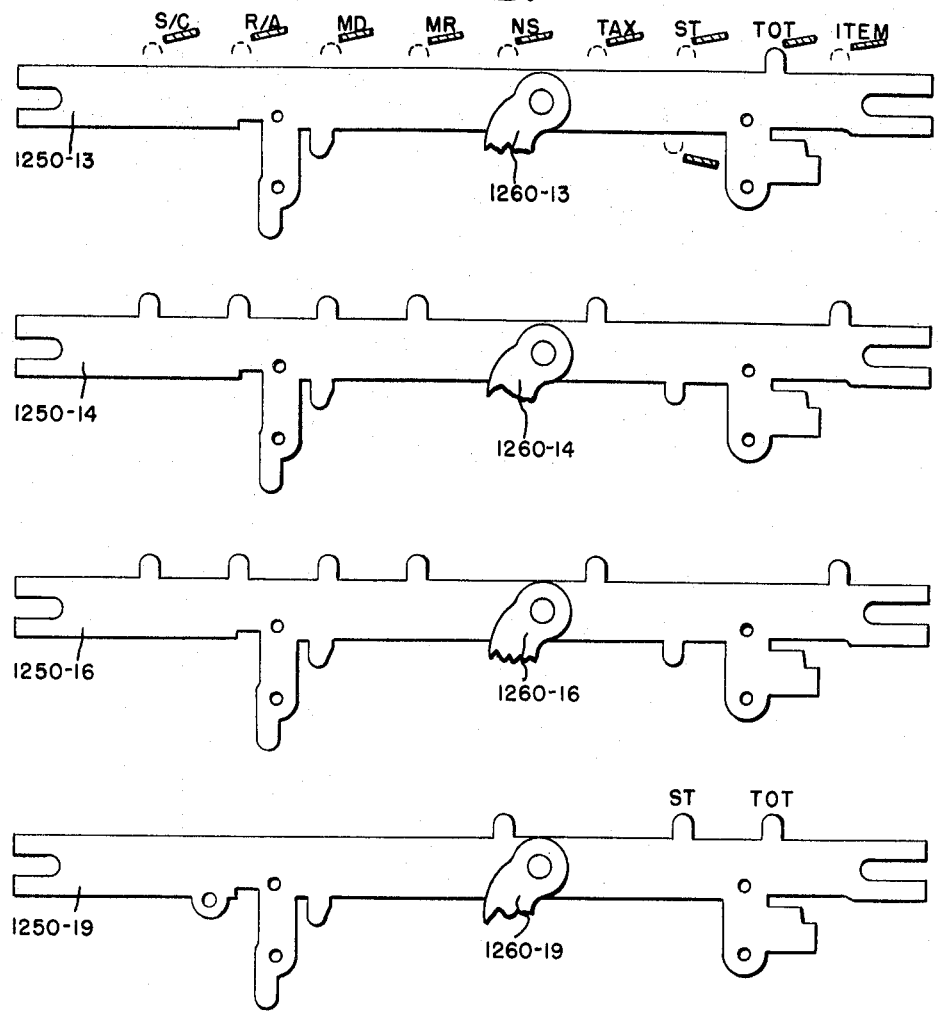

As seen in FIG. 20 the keystem 1126 for the subtotal key is provided with a slot for receiving a slide 1135 which passes beneath the rightwardly extending lugs on the sale keystem, through the guide member at the front of the #15 keyboard order, and to the front of the keyboard where it is supported by a yoke 1520 (FIG. 45) carried on the shaft 190. This slide 1135 has a pair of vertical lugs 1135A which are normally disposed to the rear of the rightwardly extending lugs on the sale keystem so that they do not interfere with depression of the sale key. The lower end of the yoke 1520 is disposed in front of and connected by a spring 1525 to a leftwardly extending stud 1521A on a lever 1521 pivoted at 1522 to the left side of frame 39 and coupled by a stud and slot connection 1523 to a slide 1524 which is carried by the combs 1493 and 1494 as well as by the shaft 1496. Slide 1524 is spring urged forward and is provided at its rear end with a vertical lug 1524A which is positioned to the rear of the rightwardly extending stud 1497-12 on the lower forward arm of the power yoke 1260-12. The function sensing slide 1250-12 has lugs 1250A adaptable to the sale correction, return, miscellaneous disbursement, miscellaneous receipts, tax, and item operation control bails and hence any time one of the operation control keys associated therewith is depressed the power yoke 1260-12 will be moved counterclockwise during the machine cycle to thereby pull slide 1524 rearwardly and through yoke 1520 and lever 1521 pull slide 1135 forwardly to a position for blocking depression of the sale key. Latch 1526 pivoted on shaft 1461 has a forwardly extending arm which rests upon a rightwardly extending lug of the slide 1524 in a manner such that when the yoke 1260-12 pulls the slide 1524 rearwardly the latch 1526 falls counterclockwise to latching engagement with the rightwardly extending lug on said slide and therefore holds the slide in its rearward position even though the power yoke 1260-12 returns to its home position. Thus once any of the operation control keys other than the sale key has been depressed the slide 1135 is moved to its forward position where it remains to prevent depression of the sale key. The latch 1526 further has an upwardly extending arm which is positioned to the rear of the rightwardly extending stud 1256 on the power yoke 1260-13 and therefore when the lower end of the power yoke 1260-13 is moved rearwardly the latch 1526 is rocked clockwise to release the slide 1524 and hence slide 1135. The power yoke 1260-13 is controlled by the function sensing slide 1250-13 and therefore whenever the slide 1250-13 is held stationary during a machine cycling the lower end of the power yoke 1260-13 will be driven rearwardly by the cam 1270-13. As seen in FIG. 51B the function sensing slide 1250-13 has a single vertical lug 1250A which is engageable with the total operation control bail 1238 and therefore the latch 1526 releases the slide 1524 upon each total operation. It is thus seen that after an amount has been entered through the use of an operation control key other than the sale key that the sale key is blocked against depression until a total is taken.

J. *Modifications*

Figure 55:
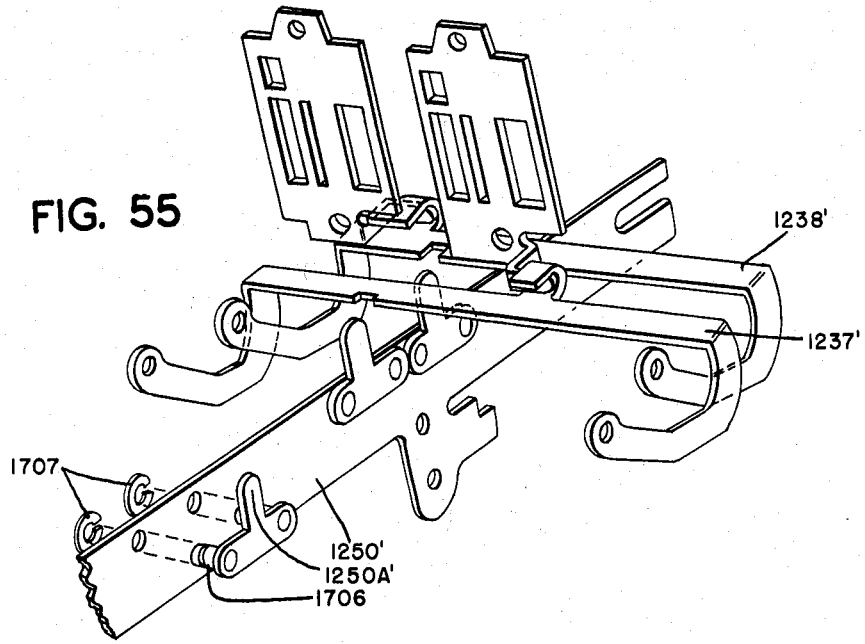
FIG. 55 is a perspective view from the right front of two modified operation control bails and of a modified function sensing slide disposed therebeneath having removable lugs thereon.

In some applications, as for example as suggested in Serial No. 831,737, it may be desirable to obtain differing amounts of rearward drive for the function control slides. Therefore, as seen in FIG. 55 the various operation control bails can be provided with cuts or notches therein of varying depths to allow the function sensing slides to move varying distances rearward before being stopped by a bail, and hence the amount of rearward travel of the function control slides can be controlled.

Figure 56:
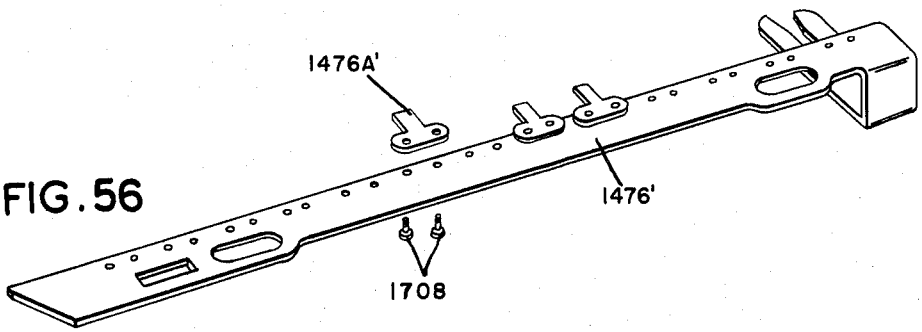
FIG. 56 is a perspective view from the left front of a modified enforced key depression control slide having removable lugs thereon.

The function sensing slides 1250 may be advantageously produced with the full complement of lugs 1250A thereon and then the various lugs which are not used for a particular program could be cut off. As seen in FIG. 55 a modified slide 1250′ having removable lugs 1250A′ selectively positionable thereon by means of the studs 1706 on the lugs 1250A′ which pass to the left through holes in the slide and held in position thereon by spring clips 1707 can be used to facilitate changing of the program of function sensing slides. In a similar manner the modified slide 1476′ seen in FIG. 56 for the enforced key depression mechanism is utilized to provide an easy method of changing the machine program. Since the slides 1476 would be compactly arranged between the plates 1471 and 1472 the lugs 1476A′ are advantageously held in position on the slide 1476′ by means of a pair of flathead screws 1708 which pass through the slide and into the threaded holes in the lugs. It is obvious that various other means for holding the lugs 1476A′ on the slide 1476 or the lugs 1250A′ on the slide 1250′ could be utilized.

There has thus been disclosed an improved operation control mechanism for a calculating or accounting machine. The apparatus has been illustrated in the form of a preferred embodiment, but it is intended that the following claims include those modifications which are apparent to one skilled in the art.

What is claimed is:

1. A control mechanism for a calculating machine having a plurality of columns of amount entering keys comprising in combination: a power section; a control key operative upon depression to energize said power section; a driveshaft operative upon rotation to cause a machine cycle; a clutch member having a first position for connecting said section to said shaft and a second position for disconnecting said section from said shaft; means urging said member toward its first position; a first clutch control slide having first and second positions; means controlled by selected ones of said amount keys to hold said slide in its first position during rotation of said shaft; a first sensing slide disposed beneath said control key and having first and second positions; means holding said sensing slide in its first position in response to operation of said control key; power-driven means operative to urge said sensing slide toward its second position and to urge said control slide toward its second position in response to said sensing slide being held in its first position; and means operative to position said clutch member in its second position in response to movement of said control slide to its second position.

2. A control mechanism as defined in claim 1 and including a second control key; a second clutch control slide having first and second positions; means operative to hold said second control slide in its first position during rotation of said shaft in response to depression of selected ones of said amount keys; means driven by said shaft and controlled by said second control key to yieldingly urge said second control slide toward its second position; and means positioning said clutch member in its second position in response to said second control slide being held in its first position while being yieldingly urged toward its second position.

3. In a calculating machine having first and second columns of amount keys, a power section, and a plurality of operation control keys, a control mechanism comprising in combination: a main driveshaft operable upon rotation to drive the machine through a cycle of operation; clutch means having first and second positions and operative only when in said first position to transmit power from said power section to said shaft; means urging said clutch means toward its first position; first and second slides each having first and second positions; means urging said slides toward their second positions; means operative to maintain said first slide in its first position in response to operation of an amount key in said first column; means operative to hold said second slide in its first position in response to operation of an amount key in said second column; first and second clutch control members each having first and second positions; means holding said first control member in its first position in response to said first slide being held in its first position; means holding said second control member in its first position in response to said second slide being held in its first position; power-driven means operative in response to the operation of at least one operation control key to yieldingly urge said first control member toward its second position; power-driven means operative in response to the operation of at least one operation control key to yieldingly urge said second control member toward its second position; and means connected to said clutch means and to said control members operative to move said clutch means to its second position in response to one of said members moving to its second position.

4. In a calculating machine having a plurality of columns of amount keys, a motor, and a driveshaft operative upon rotation to drive the machine through a cycle of operation, the combination comprising: a plurality of first slides each associated with one of said columns of keys and each having a first and a second position; means urging each of said slides toward its second position during a machine cycle; means holding each slide in its first position in response to depression of a key in its associated column; clutch means intermediate said motor and said shaft having a first position for transmitting power from said motor to said shaft and a second position for preventing the transmission of power from said motor to said shaft; a clutch control slide having a first and a second position; a sensing slide having a first and a second position; spring means interconnecting said clutch control slide and said sensing slide; means connected to said clutch means operative to move said clutch means to its second position in response to relative movement between said control slide and said sensing slide; means associated with said sensing slide and said first slides operative to hold said sensing slide in its first position in response to one of said first slides being held in its first position; and power-driven means operative to move said control slide to its second position and to simultaneously urge said sensing slide toward its second position.

5. Function control means for an accounting machine comprising: a plurality of selectively operable keys, means operable to cause a machine cycle, a plurality of function control elements each having a first position and operable upon movement therefrom to control a machine function, a plurality of function sensing elements each associated with a control element and movable from a first position to a second position, a plurality of bails each associated with one of said keys and operative upon operation of the associated key to maintain at least one of said sensing elements in its first position, power means operative during a machine cycle, and means engageable by said power means to urge each of said sensing elements toward their said second positions and to move from their said first positions those function control elements associated with a sensing element maintained in its first position.

6. An operation control mechanism for a calculating machine comprising in combination: a plurality of manually operable keys; a plurality of bails each associated with one of said keys and movable from a first to a second position in response to operation of the associated key; a plurality of function sensing slides disposed beneath said bails and movable from a first to a second position; a plurality of operation control slides disposed beneath said sensing slides having a first position and operative upon movement to a second position to control a selected machine function; a plurality of yokes each associated with one of said sensing slides and one of said control slides; means engaged by selected bails when in their second position to hold selected sensing slides in their first position; and power means engageable with each of said yokes operative to yieldingly urge each of said sensing slides toward their said second position and to move each control slide associated with a sensing slide held in its first position to its second position.

7. An operation control mechanism as defined in claim 6 wherein each of said yokes has one end coupled with a sensing slide and another end engageable with a control slide.

8. An operation control mechanism as defined in claim 7 wherein said power means includes a plurality of rotatable cams each engageable with one of said yokes and operative to rotate a yoke in one direction when its associated sensing slide is held by a bail and in an opposite direction when its associated sensing slide is free to move to its said second position.

9. In a calculating machine having a plurality of operation control keys the combination comprising: a first sensing element disposed beneath said keys having a first and a second position; a first control element associated with said sensing element having a first position and operative when in a second position to prevent depression of one of said keys; means operative during a machine cycle to urge said sensing element from its first toward its second position and to move said control element from its first to its second position in response to said sensing element being held in its first position; means responsive to the operation of at least one of said keys to hold said sensing element in its first position; latch means operative upon movement of said control element to its second position to hold said control element in its second position; and means operative in response to operation of at least one of said keys to release said latch means from said control element.

10. The combination as defined in claim 9 wherein said sensing element includes a slide having at least one lug extending therefrom and wherein said means responsive to the operation of at least one key includes a bail movable to blocking engagement with said lug.

11. In a calculating machine having a plurality of operation control keys each operative to initiate a machine cycle the combination comprising: first and second sensing slides disposed beneath said keys; means responsive to the operation of at least one of said operation control keys to hold said first slide in a first position during a machine cycle; means responsive to the operation of at least one of said operation control keys to hold said second slide in a first position during a machine cycle; key blocking means having a first position and operative when in a second position to prevent depression of a selected key; power means operative during a machine cycle to urge said first slide away from its first position and to move said blocking means to its second position in response to said first slide being held in its first position; latch means engageable with said blocking means upon movement of said blocking means to its second position; and power means operative during a machine cycle to urge said second slide away from its first position and to release said latch means from engagement with said blocking means in response to said second slide being held in its first position.

12. In a calculating machine having first, second, and third manually operable keys the combination comprising: first and second sensing slides disposed beneath said keys; a blocking member having a first position and operative when in a second position to prevent depression of said third key; a first control element associated with said first slide and said blocking member having a first position and operative when in a second position to move said blocking member to its said second position; means responsive to the operation of said first key to hold said first slide in its first position during a machine cycle; power means operative during a machine cycle to yieldingly urge said first slide toward its second position and to move said element to its second position in response to said first slide being held in its first position; latch means engageable with said element upon movement of said element to its second position to hold said element in its second position; a second control element associated with said second slide having a first position and operative upon movement to a second position to release said latch means; means responsive to the operation of said second key to hold sad second slide in its first position during a machine cycle; and power means operative during a machine cycle to yieldingly urge said second slide toward its second position and to move said second control element to its second position in response to said second slide being held in its first position.

13. The combination as defined in claim 12 wherein said blocking member includes a slide movably supported beneath said third key and having a lug extending therefrom.

References Cited by the Examiner
UNITED STATES PATENTS

| | | | |
|---|---|---|---|
| 2,861,746 | 11/1958 | Anderson | 235—145 X |
| 2,872,115 | 2/1959 | Ellerbeck | 235—63 |
| 2,902,124 | 9/1959 | Capellaro | 235—62 X |
| 3,093,304 | 6/1963 | Starrett | 235—60 |

LEO SMILOW, *Primary Examiner.*

L. M. MARTIN, *Examiner.*

M. P. HOFFMAN, W. HOBBY, *Assistant Examiners.*